United States Patent
Ren et al.

(10) Patent No.: US 7,294,417 B2
(45) Date of Patent: Nov. 13, 2007

(54) METAL OXIDE NANOSTRUCTURES WITH HIERARCHICAL MORPHOLOGY

(75) Inventors: Zhifeng Ren, Newton, MA (US); Jing Yu Lao, Saline, MI (US); Debasish Banerjee, Ann Arbor, MI (US)

(73) Assignee: The Trustees of Boston College, Chestnut Hill, MA (US)

( * ) Notice: Subject to any disclaimer, the term of this patent is extended or adjusted under 35 U.S.C. 154(b) by 271 days.

(21) Appl. No.: 10/660,348

(22) Filed: Sep. 11, 2003

(65) Prior Publication Data

US 2004/0105810 A1    Jun. 3, 2004

Related U.S. Application Data

(60) Provisional application No. 60/410,322, filed on Sep. 12, 2002.

(51) Int. Cl.
 *D02G 3/02* (2006.01)
(52) U.S. Cl. .................................................. 428/701
(58) Field of Classification Search ............... 428/697, 428/699, 701, 702, 336, 37, 98, 408, 698; 977/DIG. 1, 742; 423/592.1, 594.14, 624
See application file for complete search history.

(56) References Cited

U.S. PATENT DOCUMENTS

| | | | |
|---|---|---|---|
| 6,162,530 A * | 12/2000 | Xiao et al. ............... | 428/292.1 |
| 6,586,095 B2 * | 7/2003 | Wang et al. ............... | 428/397 |
| 6,855,202 B2 * | 2/2005 | Alivisatos et al. ........... | 117/68 |
| 6,863,943 B2 * | 3/2005 | Wang et al. ............... | 428/37 |
| 6,996,147 B2 * | 2/2006 | Majumdar et al. ........... | 438/22 |
| 2003/0059742 A1 * | 3/2003 | Webster et al. ........... | 433/201.1 |
| 2004/0131537 A1 * | 7/2004 | Yang et al. ............... | 423/592.1 |

OTHER PUBLICATIONS

Park, W.I. et al., *Metalorganic Vapor-Phase Epitaxial Growth of Vertically Well-Aligned ZnO Nanorods*, Applied Physics Letters, 2002, vol. 80, No. 22, pp. 4232-4234.
Park, W.I. et al., *ZnO Nanoneedles Grown Vertically on Si Substrates by Non-Catalytic Vapor-Phase Epitaxy*, Advanced Materials, 2002, vol. 14, No. 24, pp. 1841-1843.
Suscavage, M. et al., *High Quality Hydrothermal ZnO Crystals*, MRS Internet J. Nitride Semicond. Res. 4S1, G3.40 (1999), 6 pgs.

* cited by examiner

*Primary Examiner*—Jennifer C. McNeil
*Assistant Examiner*—Daniel Miller
(74) *Attorney, Agent, or Firm*—Greenberg Traurig, LLP; David J. Dykeman

(57) ABSTRACT

The present invention relates generally to metal oxide materials with varied symmetrical nanostructure morphologies. In particular, the present invention provides metal oxide materials comprising one or more metallic oxides with three-dimensionally ordered nanostructural morphologies, including hierarchical morphologies. The present invention also provides methods for producing such metal oxide materials.

53 Claims, 45 Drawing Sheets

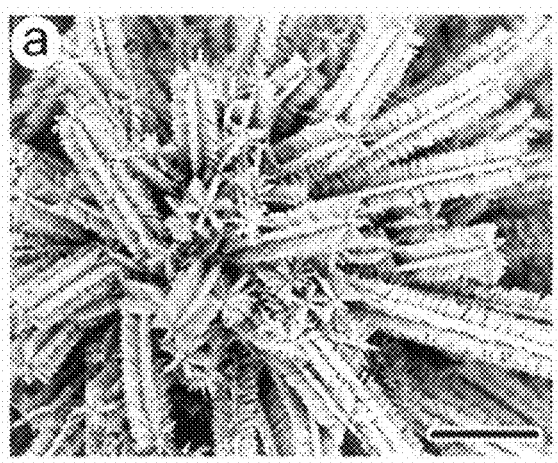
FIG. 2A
FIG. 2B
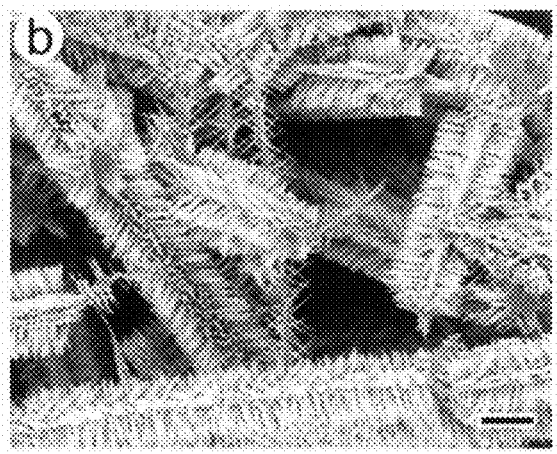
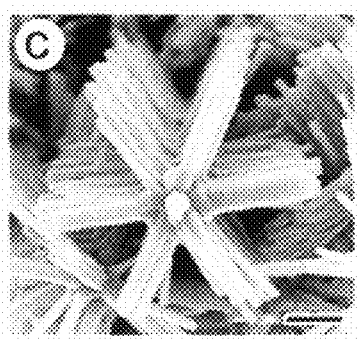
FIG. 2C
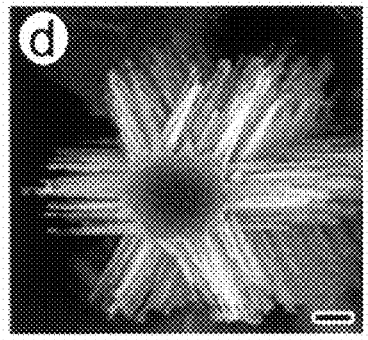
FIG. 2D
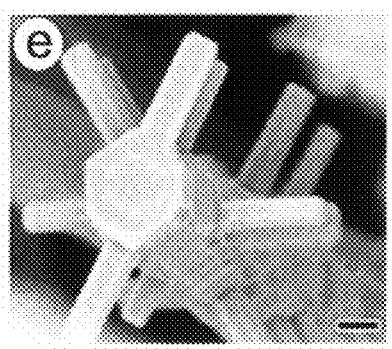
FIG. 2E
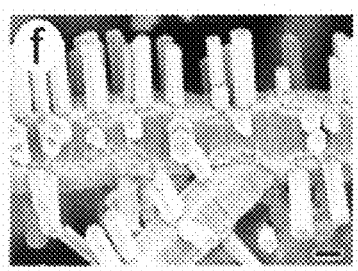
FIG. 2F

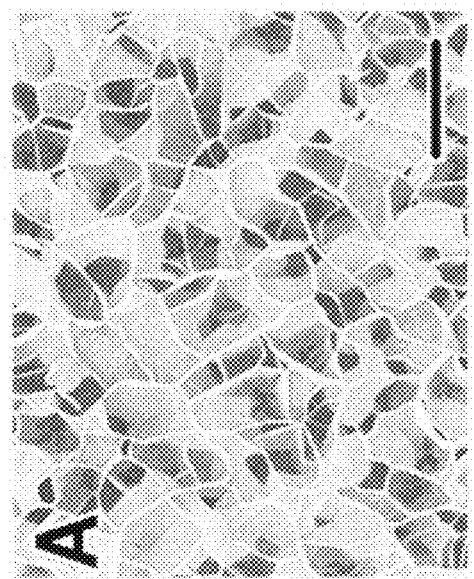
FIG. 14B
FIG. 15A
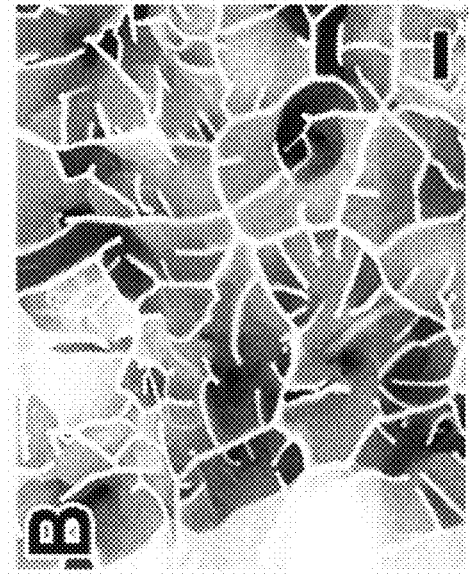
FIG. 14C
FIG. 15B
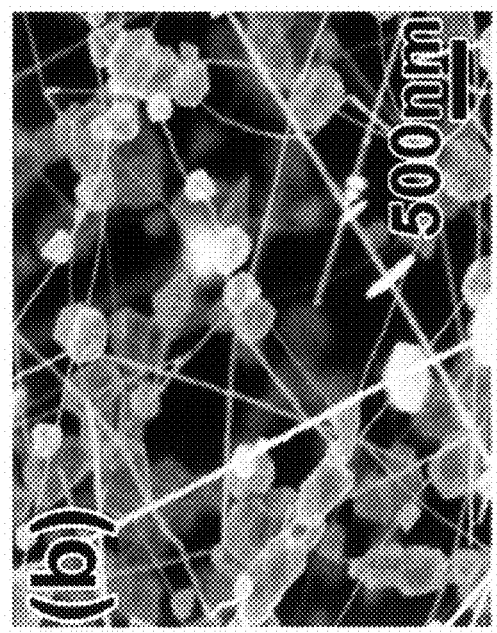
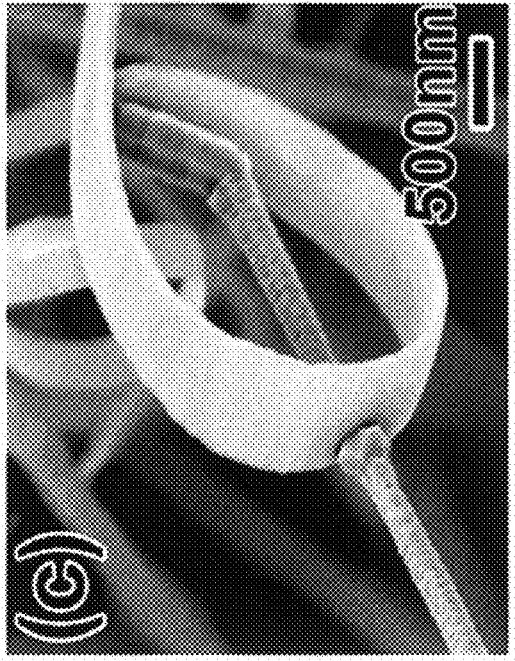

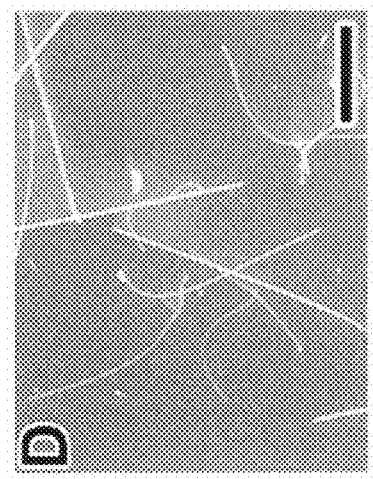
FIG. 21D
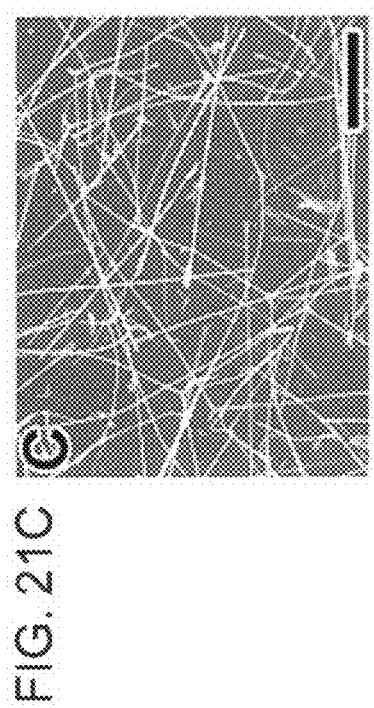
FIG. 21C
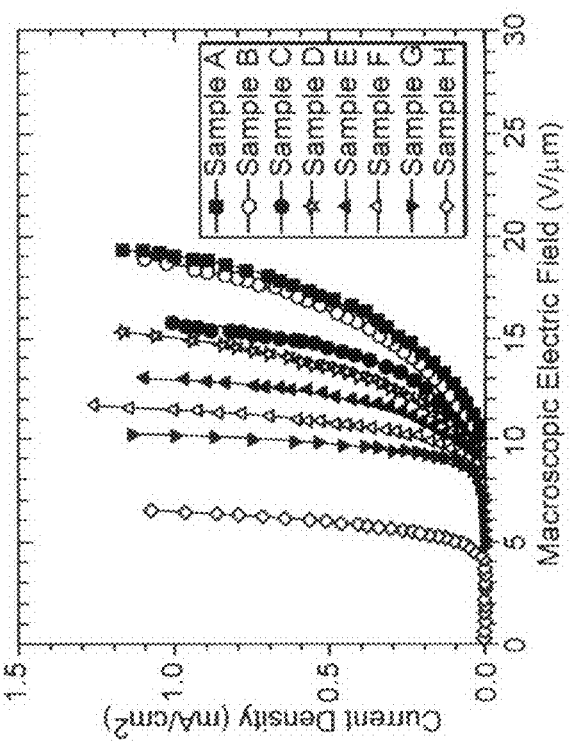
FIG. 21F
| Sample ID | Areal density (/cm²) |
|---|---|
| A | Continuous |
| B | Continuous |
| C | 5.6 X 10⁶ |
| D | 5.6 X 10⁶ |
| E | 1.2 X 10⁶ |
| F | 1.2 X 10⁶ |
| G | 0.7 X 10⁶ |
| H | 0.4 X 10⁶ |
FIG. 21E

METAL OXIDE NANOSTRUCTURES WITH HIERARCHICAL MORPHOLOGY

RELATED APPLICATION

This application claims the benefit of U.S. Provisional Application No. 60/410,322, filed on Sep. 12, 2002. The entire teachings of the above application is incorporated herein by reference.

GOVERNMENT SUPPORT

The present invention was made with partial support from The US Army Natick Soldier Systems Center (Grant Numbers DAAD 16-00-C-9227, DAAD 16-02-C-0037 and DAAD 16-03-C-0052), Department of Energy Grant Number DE-FG02-00ER45805) and The National Science Foundation (Grant Numbers ECS-0103012 and CMS-0219836). The United States Government retains certain rights to the invention.

FIELD OF THE INVENTION

The present invention relates generally to metal oxide materials with varied nanostructure morphologies, and in particular, to metal oxides with ordered nanostructural morphologies, including hierarchical morphologies.

BACKGROUND OF THE INVENTION

The optoelectronic properties of metal oxides, especially zinc oxide (ZnO) have been studied with respect to their semi-conduction, light emission and photo-catalytic properties. ZnO has been demonstrated to function as efficient light-emitting diodes and laser diodes in the UV-visible range, which ZnO p-n homojunctions have been obtained by the synthesis of p-type ZnO thin films. Metal oxides, in particular ZnO and indium oxide ($In_2O_3$), in their pure form, have been obtained having nanostructural morphology. ZnO and $In_2O_3$ have a binding energy which is relatively higher than that of typical semiconductor materials, and therefore have potential applicability in electronic devices. ZnO is also a promising material for optoelectronic applications because of its wide band gap (3.37 eV) and large exciton binding energy (60 meV), which is considerably greater than conventional semiconductor materials such as silicon (Si, 15 meV), germanium (Ge, 4.2 meV), Zinc sulfide (ZnS, 20 meV), gallium nitride (GaN, 21 meV), gallium arsenide (GaAs, 4.9 meV) and indium arsenide (InAs, 2.11 meV). In addition, $In_2O_3$ is a promising material for optoelectronic applications because of its direct band gap around 3.6 eV.

Although metal oxides, including ZnO are predicted to be useful in a variety of applications such as in solar cells, sensors and photocatalysis, their practical realization has been largely limited by the need for economically viable synthetic processes that are capable of producing free-standing varied morphology materials in good yield that are required for their incorporation in the fabrication of such devices.

With the advent of carbon nanotubes (CNT) and their use, albeit in a limited way, in electronic device fabrication, attempts to utilize metal oxides, including ZnO and $In_2O_3$ in a similar manner has been made. Such attempts include efforts to synthesize ZnO materials, with varied nanostructural morphology, by utilizing a number of methods such as metal organic chemical vapor deposition (MOCVD), chemical vapor deposition (CVD), physical vapor deposition (PVD), thermal evaporation. Such attempts also include efforts to synthesize $In_2O_3$ materials with varied nanostructural morphology by electrodeposition, heating of indium grains without catalyst, reduction of $In_2O_3$ by hydrogen, and heating of indium phosphide (InP) coated with a gold (Au) layer have been used. However these methods mostly require substrates upon which the metal oxide material is grown, and produce materials in relatively small yields. The prior art methods are therefore not optimal for producing free-standing materials in gram quantities.

SUMMARY OF THE INVENTION

The present invention relates to metal oxide materials with varied nanostructural morphologies, and methods for obtaining such metal oxide materials comprising either a single type of metal or a combination of two or more metals in their oxide form. In particular, the present invention relates to single or mixed metal oxide materials of metals from the Zinc Group (Zn, Cd) and Group-III (In, Ga, Al) elements, having controllable nanostructural morphologies that confer optoelectronic properties desirable for incorporation of such materials into nanocircuit devices.

The present invention also relates to the synthesis of metal oxide materials, in particular, metal oxide materials comprising one or more metallic oxides including, but not limited to, ZnO, $In_2O_3$ and ZnO/$In_2O_3$ with varied nanostructure morphologies, such as nanowire, nanocircuit, nanobelt, tetrapod, nanobridge, nanopin, nanonail, nanowall and hierarchical nanostructures. The present invention also relates to synthetic methods and processes for obtaining such metal oxide materials.

In one aspect, the present invention provides hierarchical ZnO nanostructures in the form of nanobrushes comprising a first metallic oxide and a second metallic oxide, wherein said first metallic oxide forms a central nanostructural spine comprising a linear axis in a three-dimensional orientation, whereupon said second metallic oxide forms terminally attached three-dimensional periodically oriented nanostructural rods, the linear axes of said nanostructural rods being oriented substantially non-parallel to the linear axis of said nanostructural spine formed by said first metallic oxide. In one embodiment, the nanobrushes have a central nanostructural spine comprising $In_2O_3$, terminally attached three-dimensional periodically oriented nanostructural rods comprising ZnO, and have a nanostructure morphology that has a basic 6-fold, 4-fold, and 2-fold structural symmetry.

In another aspect, the present invention provides ZnO nanobridge structures with various sizes and morphologies, comprising a nanobelt having one or more rows of nanorods extending from the nanobelt.

In yet another aspect, the present invention provides ZnO nanonail structures. In one embodiment, a metal oxide nanonail comprises a metal oxide nanorod shaft and nanorod cap, wherein the diameter of the nanonail shaft gradually reduces from the cap at the top of the shaft, to the bottom of the shaft, at the epitaxial attachment between the nanonail and the substrate.

In yet another aspect, the present invention provides ZnO nanostructures comprising nanowalls, and having a morphology close to that of previously known carbon nanowall structures wherein ZnO crystals are epitaxially grown on a substrate material are used as templates for forming additional nanowall structures using either coating methods, or by nanoshell formation over coatings using thermal evaporation or reduction techniques.

In yet another aspect, the present invention provides the synthesis of ZnO nanowires in the form of free-standing gram quantities by vaporization and condensation, and in the form of aligned arrays of ZnO nanowires by vaporization and condensation of ZnO on Au—Zn alloy microparticles on the substrate surface.

In yet another aspect, the present invention provides the synthesis and characterization of self-assembled circuits comprising $In_2O_3$ nanocrystal chains and nanowires by a vapor transport and condensation process. The self-assembled circuits comprise nanostructural crystalline nodes of $In_2O_3$ to become connected by three-dimensional periodically aligned nanowire structures comprising $In_2O_3$.

In yet another aspect, the invention provides Zn—In—O nanostructures having secondary ZnO nanorods grown on core nanowires/nanobelts synthesised by thermal vaporization and condensation. In particular, 2-fold, and 6-fold ZnO nanonail hierarchical nanostructures can also been synthesized by reducing the synthesis pressure of the thermal vaporization and condensation.

In yet another aspect, the invention provides substantially pure 2-fold hierarchical ZnO nanostructures where multiple rows of ZnO nanorods grow on the nanobelt surface. Substantially pure 2-fold hierarchical ZnO nanostructures wherein multiple rows of ZnO nanorods grow on a nanobelt surface when the amount of the $In_2O_3$ in the metal oxide source mixture is reduced.

In yet another aspect, the invention provides hierarchical nanostructures synthesized using a ZnO, $SnO_2$ and graphite powder mixture as the metallic oxide source to provide ZnO nanostructures that are doped with tin (Sn). The majority of the materials are straight or twisted nanobelts wherein individual nanorods are alternatively either perpendicular to the linear axis of the nanobelt growth direction, or form non-perpendicular angles to the linear axis of the nanobelt.

In yet another aspect, the present invention also provides hierarchical nanostructures having a ternary composition wherein the symmetric metal oxide material is formed form three or more metallic oxides. For example, ZnO, $GeO_2$, $In_2O_3$ and graphite powder mixture are used as the metallic oxide source.

In yet another aspect, the present invention provides symmetric metal oxide materials having a morphology of a comb-like structure. Such comb-like structures can be synthesized using ZnO without another metallic oxide in the source. By utilizing high-temperature during thermal vaporization and condensation methods, comb-like ZnO nanostructure are obtained.

In yet another aspect, the present invention provides symmetric metal oxide materials formed from a MgO metallic oxide source. The symmetric metal oxide materials formed with MgO as the metallic oxide source have at least one row of nanorods that is substantially perpendicular to the linear axis of the core nanobelt.

The nanostructural metal oxide materials of the present invention offer advantages of chemical stability and structural rigidity, for example, in a nanowire form compared to carbon nanotubes (CNTs), wherein a stable field emission electron source can be obtained when they are configured as nanowire thin films.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention.

FIG. 1 shows scanning electron microscope (SEM) images of the ZnO nanostructures synthesized by vapour transport and condensation technique.

FIG. 2 shows SEM and transmission electron microscope (TEM) images, selected area diffraction patterns, and the schematic growth models of the 6-fold ZnO nanostructures. FIG. 2(a) shows a SEM image illustrating the abundance of the 6S-fold symmetry (Scale bar=10 μm). FIG. 2(b) shows a SEM image illustrating 6M-fold symmetry. FIG. 2(c) shows a high magnification SEM image of a 6S-fold symmetry. FIG. 2(d) shows a high magnification SEM image of a 6M-fold symmetry. FIG. 2(e) shows a head-on look of a 6S-fold symmetry to illustrate the hexagonal nature of the major core nanowire. FIG. 2(f) shows a side view of the structure in FIG. 2(e) to illustrate the hexagonal nature of all the secondary ZnO nanorods and their same growth orientations with the major $In_2O_3$ core nanowire.

FIG. 3 shows SEM and TEM images, selected area diffraction patterns, and the schematic growth models of 4-fold ZnO nanostructures.

FIG. 4 shows SEM images of 2-fold ZnO nanostructures.

FIG. 5 shows a SEM image and a XRD 2-theta scan of nanobrushes.

FIG. 6 shows various views of nanobrushes.

FIG. 7 shows several views of ZnO hierarchical nanostructures. FIG. 7(b) is 2 μm (The scale bar for FIG. 7(c) and FIG. 7 (d) is 500 nm).

FIG. 9 shows images of nanobridge and nanonails.

FIG. 10 shows SEM images and a Schematic diagram of the ZnO nanobridges synthesized by vapor transport and condensation method.

FIG. 12 shows SEM images of the ZnO nanonails.

FIG. 13 shows SEM images of several different ZnO nanonail structures.

FIG. 14 shows images of nanorods, nanowires and nanobelts. FIG. 14(a) and FIG. 14(b) show ZnO nanocrystals decorated nanorods and nanowires. FIG. 14(c) showa a nanobelt penetrated by a ZnO nanorod. The scale bar for FIG. 14(a) is 1 μm (The scale bar for FIGS. 14(b) and 14(c) is 500 nm).

FIG. 15 shows images of nanowalls. FIG. 15(a) shows a typical ZnO nanowall structure on α-plane sapphire single crystal substrate. FIG. 15(b) shows a ZnO nanowall with some flakes not enclosed.

FIG. 16 shows SEM images of the ZnO nanowalls synthesized by vapor transport and condensation method.

FIG. 18 shows TEM micrographs of the nanowalls structure.

FIG. 20 shows aligned ZnO nanowires

FIG. 21 shows SEM images and measured current densities of 2.09 nanowires. FIGS. 21(a)-(d) show SEM images of ZnO nanowires on Si substrate with continuous Au film and 3 nm Au nanoparticles at a density of $5.6 \times 10^6$, $1.2 \times 10^6$, and $0.4 \times 10^6 /cm^2$, respectively. FIG. 21(e) shows a Table of Au nanoparticle density. FIG. 21(f) shows the measured current densities as a function of the macroscopic electric field for 8 samples (Scale bars=5 μm).

FIG. 22 shows SEM images of small ZnO nanowires.

FIG. 26 shows TEM images of the ZnO nanowires.

FIG. 28 shows images of Sn-doped ZnO nanobelts.

FIG. 30 shows SEM and TEM microscopic images of the $In_2O_3$ nanowire and nanocrystal chain circuits. Big crystals are part of the circuit.

FIG. 31 shows SEM images of the $In_2O_3$ nanowire circuits grown at a pressure of 0.3 Torr.

FIG. 32 shows SEM images of wavy $In_2O_3$ nanowires grown without Au catalyst.

FIG. 34 shows SEM images of $In_2O_3$ nanocrystal networks.

FIG. 36 shows electron microscopy images of metal oxide materials.

FIG. 37 shows an electron microscopy images of a 2-fold Zn—In—O nanostructure with multiple rows of secondary nanorods.

FIG. 38 shows SEM images of the hierarchical Zn—Sn—O nanostructures.

FIG. 39 shows microscopy images of a Zn—Ge—In—O hierarchical nanostructure.

FIG. 40 shows microscopy images of ZnO comb-like nanostructures.

FIG. 41 shows SEM images of metal oxide materials.

Figure 1A:
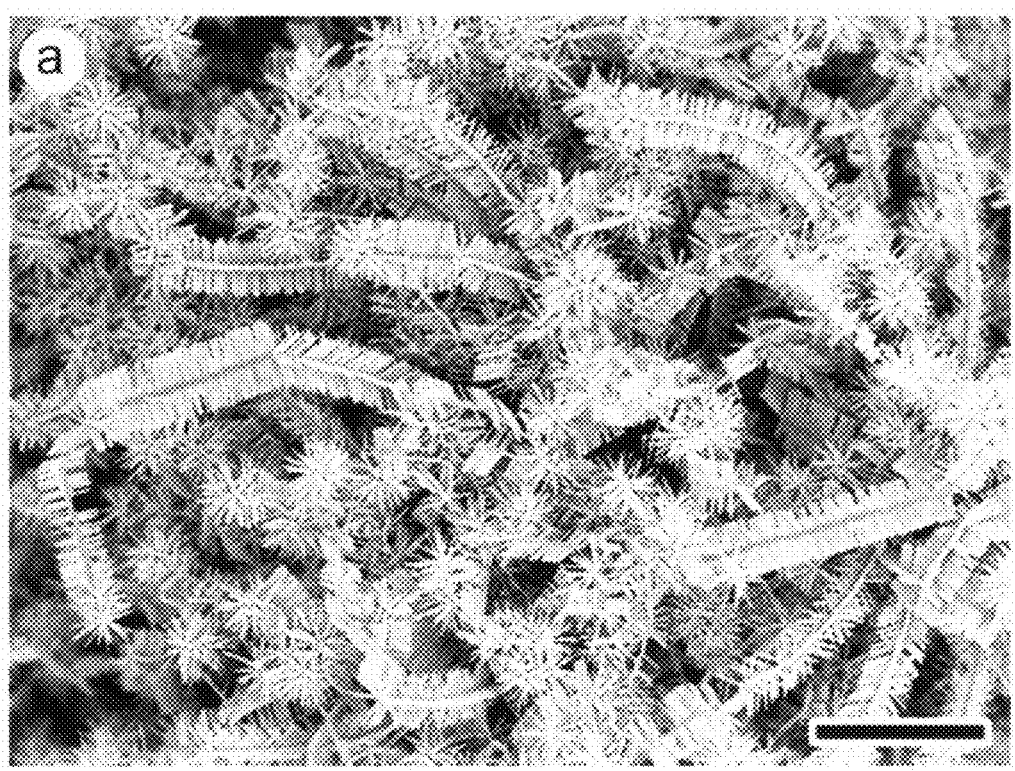
FIG. 1(a) shows a low magnification SEM image of the ZnO nanostructures illustrate abundance. Scale bar=10 μm.

While the above-identified drawings set forth preferred embodiments of the present invention, other embodiments of the present invention are also contemplated, as noted in the discussion. This disclosure presents illustrative embodiments of the present invention by way of representation and not limitation. Numerous other modifications and embodiments can be devised by those skilled in the art which fall within the scope and spirit of the principles of the present invention.

DETAILED DESCRIPTION OF THE INVENTION

Definitions:

Definition of the symmetry symbols: In the description of symmetry symbols such as, for example, $4S^{*1}$, are described herein. The numeral, 4, refers to a 4-fold crystal symmetry of the metallic oxide forming a central nanostructural spine.

The letter, S (or M), refers to single (S) or multiple (M) rows of the secondary metallic oxide nanorods such as for example ZnO. The absence of any symbol or numerals after the letter S (or M), is indicative of all secondary nanorods being perpendicular to the linear axis of the central nanostructural spine. The symbol * after the letter S (or M), is indicative of secondary nanorods forming a finite non-perpendicular angle with the central nanostructural spine. The numeral 1 or 2 after the symbol * indicates that not all secondary nanorod branches form a finite non-perpendicular angle with the central nanostructural spine.

The term "hierarchical metal oxide" material refers to microscale ordered structure of metallic oxides having a three-dimensional periodic orientation. Metal oxide materials having a nanostructural morphology including but not limited to nanobrushes, nanobridges, nanonails, naowalls, nanobelts nanowires, nanocrystal chains and nanocircuits are alternativley refered to as "hierarchical metal oxide" materials The terms "nanobrush" and "nanocomb" refer to metal oxide materials comprising a "nanostructural spine", and "secondary nanostructural rods", that are attached to the nanostructural spine, such that the secondary nanostructural rods are extended linearly from the core crystal and are substantially non-parallel to to the nanowire backbone axis. The term, nanostructural spine, is alternatively referred to as a "core crystal" or "nanowire". The term, secondary nanostructural rods, is alternatively referred to as "secondary crystals", "secondary nanorods" or "secondary nanonails".

The term "nanonail" refers to a metal oxide microscopic structure on a nanoscale level, bearing a resemblance to a nail. In one embodiment, a nanonail comprises a metal oxide nanorod shaft and nanorod head, alternativle referred to as a nanorod cap. Typically, the nanonail shaft diameter decreases gradually from the cap at one end of the shaft, to the opposite end, where it is attached to the substrate.

The term "nanobelt" refers to a metal oxide microscopic structure on a nanoscale level, bearing a resemblance to a belt, strip or ribbon. Alternatively, a nanobelt is referred to as a "nanoribbon". For example, an Sn-doped nanobelt of the invention comprises an array of multiple parallel nanorodsadhered to one another.

The term "nanobridge" refers to a metal oxide microscopic structure on a nanoscale level, bearing a resemblance to a bridge. Typically a nanobridge comprises a nanobelt having one or more rows of nanorods extending from the nanobelt. Typically the nanorods are perpendicular to the plane of the nanobelt. The rows of nanorods are optionally on one or both faces of the nanobelt. The rows of nanorods are optionally on one or both edges of the nanobelt. For example, a metal oxide nanobridge of the present invention has two rows of c-axis nanorods epitaxially grown perpendicularly on the edges of the {0001} plane of a ZnO nanobelt.

The term "roller coaster like nanobridge" refers to a nanobridge in that the nanobelt forms one or more loops or a ring around the center of the nanobridge.

The term "heteroepitaxial" as referred to herein, is afforded the meaning typically provided for in the art. Typically, the term heteroepitaxial, refers to an epitaxial relationship between two or more metallic oxides in which the composition of each metallic oxide is different from the metallic oxide adjacent to itself. An example of a heteroepitaxial metal oxide composite is that of a hierarchical metal oxide composite in which the core crystal is major $In_2O_3$ or pure $In_2O_3$, and the secondary crystal is major ZnO or pure ZnO.

The term "homoepitaxial" as referred to herein, is afforded the meaning typically provided for in the art. Typically, the term homoepitaxial, refers to an epitaxial relationship between two or more metallic oxides in which the composition of each metallic oxide is the same or similar to the composition of the metallic oxide adjacent to itself. An example of a homoepitaxial metal oxide composite is that of a hierarchical metal oxide composite in which the core crystal is major ZnO or pure ZnO, and the secondary crystal is major ZnO or pure ZnO.

The term "nanocrystal chain" as referred to herein, is afforded the meaning typically provided for in the art. In particular, a nanocrystal chain refers to a metal oxide microscale structure comprising a plurality of metal oxide microcrystals linked together to form a linear or one-dimensional (1D) array. In one embodiment, a nanocrystal chain comprises interconnected individual nanocrystals epitaxial with each other. In a currently preferred embodiment, the nanocrystal chain form with a growth direction of [001].

The term "nanowire circuit" as referred to herein, is afforded the meaning typically provided for in the art. The term nanowire circuit, typically refers to a metal oxide microscale structure comprising a network of metal oxide network junctions and connected by metal oxide nanowires or metal oxide nanocrystal chains. Metal oxide network junctions are typically nanocrystals or bigger microcrystals, alternatively referred to as "big crystals". Alternative embodiments of either nanowire and nanocrystal chains are formed by varying the growth temperature gradient of the thermal evaporation and condensation. The term "nanowire circuit" is alternatively referred to as a "nanowire network circuit" or a "nanowire network".

A "metal oxide source material" as used herein, is a mixture of one or more metallic oxides that one used as metal oxide vapor source in the thermal evaporation and condensation methods of invention. The metal oxide source material alternatively includes non-metal oxide source material, including but not limited to, graphite. The metal oxide source material can have any suitable morphology. In one embodiment, the metal oxide source material comprises a metal oxide source powder.

The present invention including metal oxide materials, specific embodiments thereof, specific attributes thereof and advantages of thereof, as well as methods for their preparation, are described below with reference to the relevant figures.

The present invention provides a metal oxide material comprising at least one metallic oxide wherein said metallic oxide is arranged in a three-dimensionally periodic orientation so as to confer nanostructural morphology to said metal oxide material. Preferably, the metal oxide material has a pre-determined symmetry.

In one embodiment, the present invention provides a metal oxide material comprising a first metallic oxide and a second metallic oxide, wherein said first metallic oxide forms a central nanostructural spine comprising a linear axis in a three-dimensional orientation, whereupon said second metallic oxide forms terminally attached three-dimensional periodically oriented nanostructural rods, the linear axes of said nanostructural rods being orientedsubstantially non-parallel to the linear axis of said nanostructural spine formed by said first metallic oxide.

In another embodiment, the central nanostructural spine is a nanowire. The term "nanowire" as referred to herein, is afforded the meaning typically provided for in the art. In one embodiment, the nanowire is a single crystal metal oxide. In another embodiment, the nanowire single crystal metal oxide in an indium oxide. In a currently preferred embodiment, the indium oxide is $In_2O_3$. In yet another embodiment, the nanowire single crystal metal oxide comprises zinc oxide. In another currently preferred embodiment, the zinc oxide is ZnO. A nanowire alternatively comprises a "nanocrystal chain." Nanowires of the present invention can be grown to different lengths. In one embodiment, the nanowires have an average diameter of ranging from about 10 nanometers (nm) to about 1000 nm (1 μm). In another embodiment, the nanowires have a diameter ranging from about 50 to about 500 nm. In one embodiment, the nanowires have an average length of about 0.01 micrometers (μm) to about 100 μm. In another embodiment, the nanowires have a length ranging from about 1 μm to about 20 μm.

The central nanostructural spine in the metal oxide materials of the invention can have a variety of morphologies including but not limited to, cylindrical, rod, barrel-shaped, conical, rectangular cross-sectional, square cross-sectional and hexagonal cross-sectional morphologies. The central nanostructural spine of the invention can have a plurality of facets. The term "facet" as referred to herein, is afforded the meaning typically provided for in the art. Typically a facet refers to a planar external surface of the crystal structure of the nanowires. In one embodiment, the central nanostructural spine of the invention can have 2, 4 or 6 facets. The central nanostructural spine of has a structural symmetry. Typically the central nanostructural spine of the invention can have 2-fold, 4-fold or 6-fold symmetry, wherein the geometries are rectangular cross- sectional, square cross-sectional or hexagonal cross-sectional respectively.

The periodically oriented nanostructural rods in the metal oxide materials of the invention can also have a plurality of facets. In one embodiment, the number of facets comprised by the secondary crystals corresponds to the number of facets of the core crystal. In onather embodiment the periodically oriented nanostructural rods are nanonails.

The term "nanorod" refers to a nanoscale crystalline metal oxide. In a currently preferred embodiment, the nanorod is a single crystal metal oxide. Typically the nanorod comprises a zinc oxide. In a currently preferred embodiment, the zinc oxide is ZnO.

In one embodiment of the invention, the nanorods have an average diameter ranging from about 10 to about 1000 nm (1 μm). In another embodiment of the invention, the nanorods have a diameter of about 20 to about 200 nanometers (nm). The nanorods of the invention typically have an average length of about 0.01 to about 100 μm. Preferably, the nanorods have a length ranging from about 0.2 μm to about 5 μm.

The periodically oriented nanostructural rods of the invention have proximal and distal ends such that the nanostructural rods of the invention are attached to the core crystal at the distal ends as to extend laterally form the central nanostructural spine.

The periodically oriented nanostructural rods of the invention are aligned to the nanostructural spine either in single rows or in multiple rows on the nanostructural spine. The nanostructural rods also are aligned in a direction either perpendicular to the linear axis of the nanostructural spine or at a finite non-perpendicular angle to (slanted). In one embodiment, the nanostructural rods grow at an angle ranging from about 45° to about 160° to the nanostructural spine. In a currently preferred embodiment, the secondary crystals grow perpendicular to the core crystal. In another currently preferred embodiment, the secondary crystals grow at an angle rangeing from about 60° or about 120° to the core crystal.

Figure 1B:
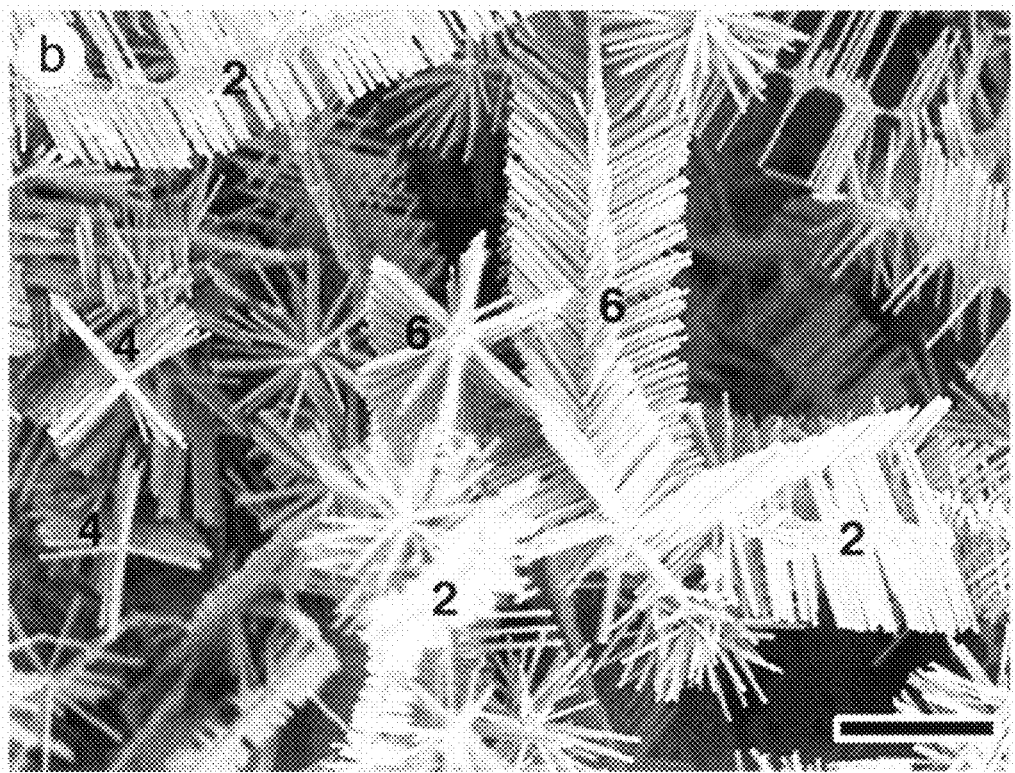
FIG. 1(b) shows a medium magnification SEM image of ZnO nanostructures illustrating the various structural symmetries. Scale bar=3 μm. Three major basic symmetries of 6-fold, 4-fold and 2-fold, are respectively shown.

FIG. 1 shows the typical scanning electron microscopy (SEM) images of the ZnO nanostructures of the invention at low and medium magnifications, respectively. The low magnification image in FIG. 1(a) shows the large quantity of such nanostructures. The medium magnification in FIG. 1(b) shows that there are 3 major structural symmetries, 6-fold, 4-fold, and 2-fold and additionally shows a plurality of sub-symmetries associated with each major symmetry. For 6-fold symmetry, 3 sub-symmetries are identified as 6S-fold, 6M-fold, and 6M*-fold. For 4-fold symmetry, 5 sub-symmetries as $4S^{*1}$-fold, $4S^{*2}$-fold, $4S^{*2}$fold, 4M-fold, and 4M*-fold are identified. For 2-fold symmetry, 3 sub-symmetries as 2S-fold, 2S*-fold, and 2M-fold are identified. The length of the $In_2O_3$ core nanowires along the axis can be as long as tens of micrometers as shown in FIG. 1(a). The diameter of the $In_2O_3$ core nanowire ranges from about 50 to about 500 nm. The length of the secondary ZnO nanorods grown on the major $In_2O_3$ core nanowire ranges from about 0.2 to a few micrometers, with diameters ranging from about 20 to about 200 nm. Powder X-ray diffraction (XRD) measurements show that the samples are mixtures of hexagonal ZnO (wurtzite) and cubic $In_2O_3$. From the XRD spectra, lattice constants for ZnO are derived as a=3.249 Å and c=5.206 Å, consistent with the standard values for bulk ZnO. The lattice constant for the cubic $In_2O_3$ is a=10.118 Å which is in good agreement with the reported bulk value. For standard bulk values, see, for example, *Powder Diffraction File Release* 2000, *PDF Maintenance* 6.0 (International Center for Diffraction Data, Pennsylvania).

Figure 2G:
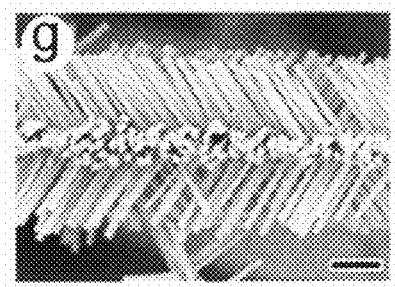
FIG. 2(g) shows a 6M*-fold symmetry, where the nanorods are not perpendicular to the major core.
Figure 2I:
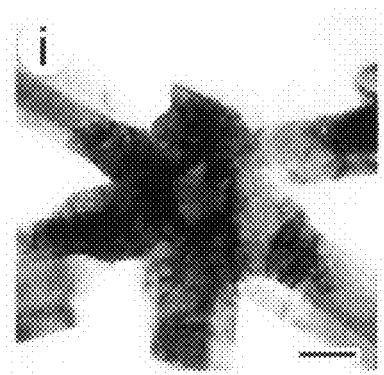
FIG. 2(i) shows a cross-sectional bright-field TEM image of 6-fold symmetry to illustrate the six facets of the central core.

During SEM examination, observed are areas with particular symmetry as the majority. In FIG. 2, SEM and transmission electron microscopy (TEM) images are presented in medium and high magnifications to show the 6-fold nanostructures in details. FIG. 2(a) is a medium magnification of the area with the basic 6S-fold nanostructure symmetry as the majority and FIG. 2(b) is a medium magnification of the area with the basic 6M-fold nanostructure symmetry as the majority. When the major core nanowire is small, the secondary nanorods grow in a single row as shown in FIG. 2(a) and FIG. 2(c). When the major core nanowire is large enough, multiple rows of secondary nanorods form on the major nanowire as shown in FIG. 2(b) and FIG. 2(d). The secondary nanorods grow into 6-fold symmetry because of the hexagonal symmetry of the major core as shown in FIG. 2(e) and FIG. 2(f). It is shown that not only the major core is hexagonal, but also the secondary nanorods are hexagonal and aligned in the same direction with each other as shown in FIG. 2(f). FIG. 2(g) is the SEM image of 6M* -fold nanostructure symmetry, in which the nanorods are not perpendicular to the major core. The TEM contrast image shown in FIG. 2(i) indicates the hexagonal nature of the $In_2O_3$ nanocore (lighter contrast in the center). Energy dispersive X-ray spectroscopy (EDS) composition analysis shows that all the secondary nanorods are pure ZnO and the major core nanowire is $In_2O_3$. Structural studies by electron diffraction indicate that the major core nanowire is cubic $In_2O_3$ with lattice parameter of a=10.1 Å. Selected-area electron diffraction patterns shown in FIG. 20), point out that the major cores are along [110] or [001] zone axes of $In_2O_3$. Secondary nanorods grow along the [0001] direction of ZnO.

As shown in FIG. 3, 4-fold nanostructures are observed as the majority. FIG. 3(a) is the medium magnification SEM image showing the abundance of 4-fold nanostructures. Under close examination of high magnification, at least 5 variations are found for the 4-fold symmetry. FIG. 3(b) is a high magnification SEM image of the basic 4S-fold to show the single row of the secondary ZnO nanorods perpendicular to the major In$_2$O$_3$ core nanowire. When the major In$_2$O$_3$ core nanowire is large enough, multiple rows of ZnO nanorods are observed perpendicular to the major In$_2$O$_3$ core nanowire. This sub-symmetry, having 4-fold symmetry with multiple rows of ZnO nanorods, is identified as 4M-fold as shown in FIG. 3(c.) In addition, the secondary ZnO nanorods are observed to be not always perpendicular to the major In$_2$O$_3$ core nanowire, but grow at finite non-perpendicular angles with respect to the linear axis of the In$_2$O$_3$ core nanowire. Again, when the major In$_2$O$_3$ core nanowire is small, the secondary ZnO nanorods grow in a single row as shown in FIG. 3(d) and FIG. 3(e). In FIG. 3(e), the same angle exists on all 4 directions, whereas in FIG. 3(d), the same angle only exists in the 2 opposite directions (parallel to the page), and the other 2 opposite directions are perpendicular to the linear axis of major In$_2$O$_3$ core nanowire (in-to and out-of the page). These two nanostructures are defined as 4S$^{*1}$-fold and 4S$^{*2}$-fold, respectively. When the major In$_2$O$_3$ core nanowire is large enough, multiple rows of ZnO nanorods grow with an angle in all 4 directions as shown in FIG. 3(f). This nanostructure is defined as 4M*-fold symmetry. FIG. 3(g) is the growth model. FIG. 3(h) and FIG. 3(i) are the TEM bright field image and selected area diffraction patterns, respectively.

In addition to the 6-fold and 4-fold symmetrical nanostructures, the basic 2-fold nanostructures are observed as shown in FIG. 4. FIG. 4(a) is a medium magnification SEM image to show the abundance of the basic 2S-fold symmetry. FIG. 4(b) is a high magnification SEM that shows that the secondary ZnO nanorods are perpendicular to the linear axis of the major core nanowire. 2S-fold symmetry variations have been observed and identified so far as 2S*-fold and 2M-fold. FIG. 4(c) and FIG. 4(d) show the SEM images in low and high magnifications of the 2M-fold symmetry, respectively. FIG. 4(e) and FIG. 4(f) are the low and high magnification SEM images showing the abundance and close up look of the 2S*-fold, respectively.

Figure 2J:
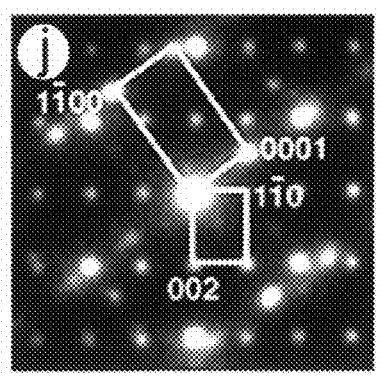
FIG. 2(j) shows a selected-area electron diffraction pattern of FIG. 2(i) corresponding to the major $In_2O_3$ core and the secondary ZnO nanorods. The scale bar for FIGS. 2(b), (c) and (g) is 1 μm, (The scale bar for FIGS. 2(d-f), and (i) is 200 nm).
Figure 3A:
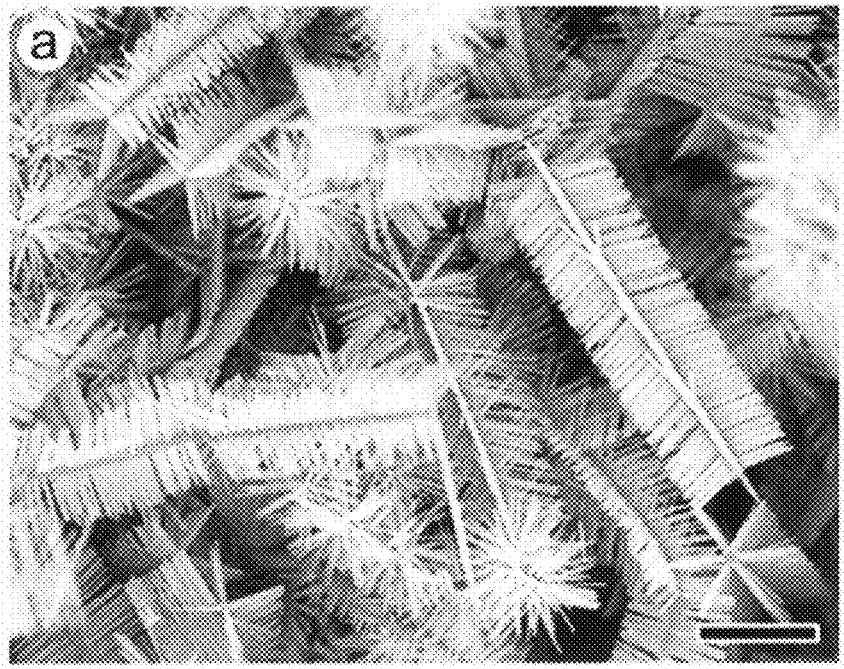
FIG. 3(a) shows a medium magnification SEM image illustrating the abundance of the 4-fold nanostructures (Scale bar =5 μm)
Figure 3B:
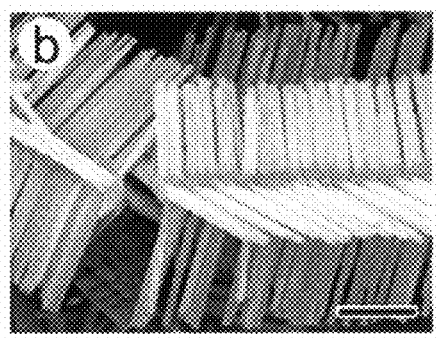
FIG. 3(b) shows a high magnification SEM image illustrating the 4S-fold symmetry.
Figure 3C:
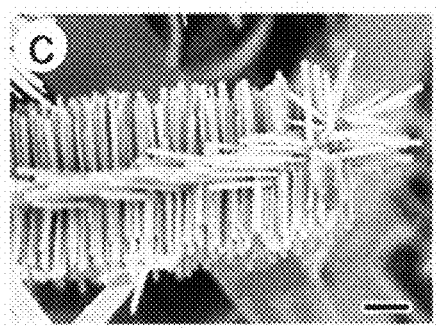
FIG. 3(c) shows a high magnification SEM image illustrating the 4M-fold symmetry.
Figure 3D:
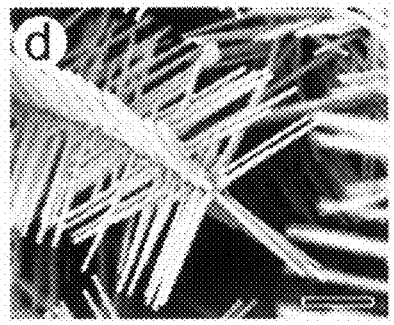
FIG. 3(d) shows a high magnification SEM image of a $4S^{*1}$-fold symmetry.
Figure 3E:
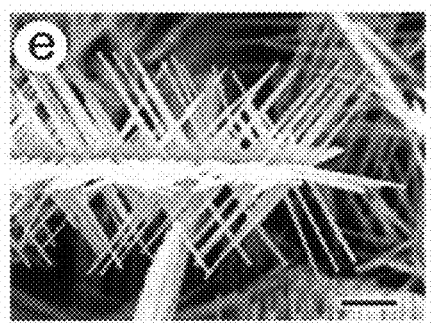
FIG. 3(e) shows a high magnification SEM image of a $4S^{*2}$fold symmetry.
Figure 3F:
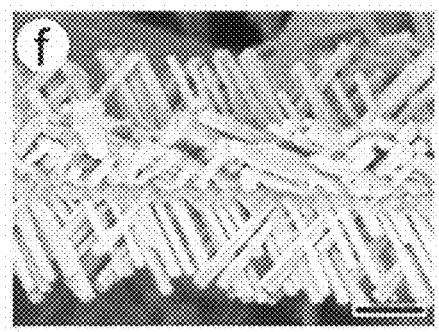
FIG. 3(f) shows a high magnification SEM image of the 4M*-fold symmetry.

Additional variations of the 6-, 4-, and 2-fold symmetries are contemplated. Orientation relationships between the major In$_2$O$_3$ core nanowire and the secondary ZnO nanorods are obtained from selected-area diffraction patterns shown in FIG. 2(j) for the 6-fold symmetry and FIG. 3(i) for the 4-fold symmetry. In each diffraction pattern, two sets of diffraction spots are observed; one from the major In$_2$O$_3$ core nanowire and the other from the secondary ZnO nanorods. The diffraction pattern in FIG. 2(j) is indexed using the [110] zone axis of In$_2$O$_3$ and the [11$\bar{2}$0] zone axis of ZnO. Therefore, the crystallographic relationship is [110]$_{In_2O_3}$//[11$\bar{2}$0]$_{ZnO}$ for the 6-fold symmetry. In FIG. 3(i), the diffraction pattern is indexed using the [001] zone axis of In$_2$O$_3$ and the [63$\bar{9}$2] zone axis of ZnO. Therefore, the [001] zone axis of In$_2$O$_3$ nanowire is parallel to the [63$\bar{9}$2] zone axis of the ZnO nanorods.

When In$_2$O$_3$ nanowire is along the [001] direction, the core nanowire is enclosed by ±(100) and ±(010) facets (FIG. 3(i)). ZnO nanorods grow on each facet of the In$_2$O$_3$ nanowire according to the orientation relationships as listed in Table 1. There are two major orientation relationships, corresponding to the observed 4-fold and 4*-fold symmetries, respectively. The orientation relationship in the 4-fold symmetry is: [001]$_{In_2O_3}$//[10$\bar{1}$0]$_{ZnO}$, [100]$_{In_2O_3}$//[$\bar{1}$2$\bar{1}$0]$_{ZnO}$. In this case, [001]$_{In_2O_3}$⊥[0001]$_{ZnO}$, therefore, ZnO nanorods in the four arms grow perpendicular to the core nanowire as shown in FIG. 3(b) since ZnO nanorods grow along [0001] direction. In the case of 4*-fold symmetry, [001]$_{In_2O_3}$//[63$\bar{9}$2]$_{ZnO}$, so that the angle between ZnO nanorod and core nanowire is equal to the angle between [63$\bar{9}$2]$_{ZnO}$ and [0001]$_{ZnO}$, which is about 60°, explaining why a tilted 4*-fold symmetry is often observed in SEM images. Since there is no difference between ±[63$\bar{9}$2]$_{ZnO}$ for the growth of a nanorod on a [001] core In$_2$O$_3$ nanowire, nanorods can grow with an angle of either 60 or 120 degree, which result in all the variations of the tilted growth as shown in FIG. 3(d) and FIG. 3(e).

When In$_2$O$_3$ is along [110] directions, the core nanowire is enclosed by ±(1$\bar{1}$2), ±(1$\bar{1}\bar{2}$), and ±(1$\bar{1}$0) facets. The angle between each of these adjacent facets is about 60°. Therefore, a quasi 6-fold symmetry is observed when an In$_2$O$_3$ nanowire grows along the [110] direction. In addition to the [001] and [110] directions, In$_2$O$_3$ nanowires also grow along the [111] direction, as shown in FIG. 2(e) and FIG. 2(f). Hexagon end planes at the ends of the core nanowire (FIG. 2(e)) are identified in the SEM images, showing that the core nanowire grows along the [111] zone axis of In$_2$O$_3$. When this type of nanostructure lies in the observation plane, hexagon end planes are observed at the end of nanorods (FIG. 2(f)). The observation indicates that the nanorods grow along the [0001] zone axis of ZnO. The orientation relationship determined by the facets appeared in FIG. 2(e) and FIG. 2(f) is also listed in Table 1.

TABLE 1

Observed orientation relationships between the major In$_2$O$_3$ core nanowire and the secondary ZnO nanorods.

Figure 2H:
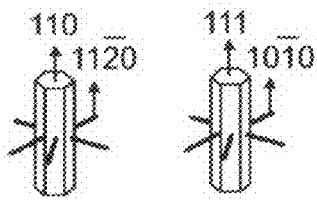
FIG. 2(h) shows a schematic diagram of orientation relationships between the major $In_2O_3$ core nanowire and the secondary ZnO nanorods with the core along [110] direction FIG. 2(h) left, and along [111] direction FIG. 2(h) right.
Figure 3G:
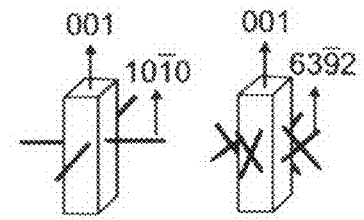
FIG. 3(g) shows a schematic model of the 4S- and 4S*-fold symmetry.
Figure 3H:
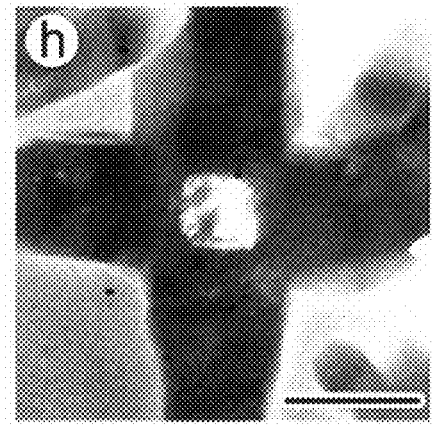
FIG. 3(h) shows a cross-sectional bright-field TEM image of 4-fold symmetry to illustrate the four facets of the central core.
Figure 3I:
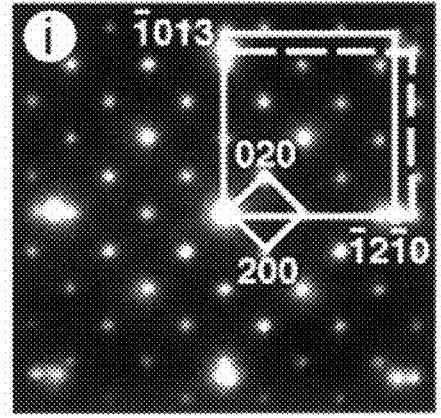
FIG. 3(i) shows a selected-area electron diffraction pattern of FIG. 3(h) corresponding to the major $In_2O_3$ core and the secondary ZnO nanorods. The diffraction consists of two sets of patterns; the small rectangle corresponds to [001] zone axis of $In_2O_3$. The large solid rectangle corresponds to [63$\bar{9}$2] zone axis of ZnO. The dashed rectangle is from another arm perpendicular to the solid rectangle. The scale bar for FIGS. 3(b-e) is 1 μm. The scale bar for FIG. 3(f) is 500 nm, (The scale bar for FIG. 3(h) is 200 nm).

| Core axis | Orientation relationship |
| --- | --- |
| [110]$_{In2O3}$ (FIG. 2(h)) | [110]$_{In2O3}$ // [11$\bar{2}$0]$_{ZnO}$ |
|  | [222]$_{In2O3}$ // [0001]$_{ZnO}$ |
| [111]$_{In2O3}$ (FIG. 2(h)) | [111]$_{In2O3}$ // [10$\bar{1}$0]$_{ZnO}$ |
|  | [11$\bar{2}$]$_{In2O3}$ // [1$\bar{2}$10]$_{ZnO}$ |
|  | [1$\bar{1}$0]$_{In2O3}$ // [0001]$_{ZnO}$ |
| [001]$_{In2O3}$ (FIG. 3(g)) | [001]$_{In2O3}$ ⊥ [10$\bar{1}$0]$_{ZnO}$ |
|  | [100]$_{In2O3}$ ⊥ [$\bar{1}$2$\bar{1}$0]$_{ZnO}$ |
|  | [001]$_{In2O3}$ ⊥ [0001]$_{ZnO}$ |
| [001]$_{In2O3}$ (FIG. 3(g)) | [001]$_{In2O3}$ // [63$\bar{9}$2]$_{ZnO}$ |
|  | [110]$_{In2O3}$ // [$\bar{1}$2$\bar{1}$0]$_{ZnO}$ |
|  | [$\bar{1}$10]$_{In2O3}$ // [$\bar{1}$013]$_{ZnO}$ |

Several orientation relationships between ZnO nanorods and In$_2$O$_3$ nanowire are found. The orientation relationships, as schematically shown in FIG. 2(h) and FIG. 3(g) as listed in Table 1 are understood using the theory of the near coincidence-site lattice. For example, the In$_2$O$_3$ a plane is 4-fold symmetry with a=10.18 Å and the ZnO c plane is 6-fold symmetry with a=3.24 Å, which results in a lattice mismatch to about 3.7% (a factor of 3 for In$_2$O$_3$ a axis to ZnO a axis), a reasonable value for epitaxial growth.

The heteroepitaxial nature of ZnO nanorods from In$_2$O$_3$ cores gives several possible crystal orientation relations between the cores and nanorods, thus resulting in several different ZnO nanorods orientations with respect to the core. Therefore, the symmetry of these hierarchical nanostructures is dependent on the crystallographic orientation of the In$_2$O$_3$ core nanowires. The orientation of the In$_2$O$_3$ nanowire along the [110] or [111] direction creates 6-fold symmetries, whereas the orientation of the In$_2$O$_3$ nanowire along the [001] direction produced 4-fold symmetries. No catalyst is used in this system. Therefore, the In$_2$O$_3$ nanowire growth is based on the vapor-solid mechanism. Compared to the aligned ZnO grown by vapor-liquid-solid mechanism with source temperature of about 900° C., the metal and/or metal oxide vapor pressure here is much higher. This high vapor pressure is optimal for the growth of the hierarchical structures. The growth conditions such as temperature, pressure and source component ratios are correlated to affect the supersaturation rate and the structure formed.

In yet another embodiment, the invention provides Zn—In—O nanostructures having secondary ZnO nanorods grown on core nanowires/nanobelts. Zn—In—O nanostructures having secondary ZnO nanorods grown on core nanowires/nanobelts, are synthesises by thermal vaporization and condensation. In particular, 2-fold, and 6-fold ZnO nanonail hierarchical nanostructures can also been synthesized by reducing the synthesis pressure of the thermal vaporization and condensation. FIG. 36(*a*) shows the large amount of 2-fold, and 6-fold ZnO nanonail hierarchical nanostructures on graphite foil. The structures are in length of tens of microns and width in about 1-2 microns. FIG. 36(*b*) is the SEM image of a 2-fold structure in which the nanonails grow on both sides of the core nanobelt. The nanonails have a tip diameter of about 200 nm and length of about 0.5 micron to one micron. FIG. 36(*c*) shows another embodiment of the 2-fold structure in which the nanonails grow on one side of the core nanobelt. Factors such as surface nucleation and vapor access to the surface effect formation of such structures. From the geometry of the structures, it is shown that the 2-fold structure grows along the [11$\bar{2}$0] direction and the nanonails grow epitaxially from the (0001) surface of the major core nanobelt along the [0001] direction. FIG. 36(*d*) shows the 6-fold nanostructure with nanonails as the secondary branches. FIG. 36(*e*) shows the low magnification TEM image of the 2-fold structure in which the branched nanonails are dense. FIG. 36(*f*) shows the high magnification TEM image of the core nanobelt with a contrast in the center caused by the indium rich composition.

In yet another embodiment, the invention provides substantially pure 2-fold hierarchical ZnO nanostructures wherein multiple rows of ZnO nanorods grow on the nanobelt surface. Substantially pure 2-fold hierarchical ZnO nanostructures where multiple rows of ZnO nanorods grow on the nanobelt surface when the amount of the $In_2O_3$ in the metal oxide source mixture is reduced. FIG. 37(*a*) shows a SEM image of large amount of such structures. The structure is tens of micron long and microns in width. FIG. 37(*b*) shows the high magnification SEM image of such structures, wherein the ZnO nanorods have a diameter from about 50 nm to about 1000 nm and have a length from about 100 nanometers to several micrometers. FIG. 37(*c*) shows the TEM bright field image of such structures The dark contrast dots represent the secondary nanorods. The associated SAD pattern [0001] direction illustrates nanobelts grown along the [0$\bar{1}$10] direction. The associated SAD pattern that the secondary nanorods are epitaxial with the core nanobelts.

In yet another embodiment, the invention provides hierarchical nanostructures synthesized using a ZnO, $SnO_2$ and graphite powder mixture as the metallic oxide source. Such structures are Sn-doped ZnO structures. FIG. 38(*a*) shows the SEM image of the structures typically obtained. The majority of the materials are nanobelts. Such nanobelts comprise nanorods welded together, and are alternatively straight or twisted. The individual nanorods are alternatively either perpendicular to the linear axis of the nanobelt growth direction as shown in FIG. 38(*b*) or form non-perpendicular angles to the linear axis of the nanobelt. FIG. 38(*c*) shows a nanobelt with three rows of nanorods growing on one side of the nanobelt surface. The middle row of the secondary nanorods is perpendicular to the nanobelt surface and the other two rows form an angle of about 45 degrees to the linear axis of the nanobelt. FIG. 38(*d*) shows a nanobelt with only one row of ZnO nanorods perpendicular to the to the linear axis of the nanobelt surface, Such a structure is a four fold structure. The nanorods in FIG. 38(*c*) and FIG. 38(*d*) are grown from the core line of the nanobelt which is also the junction of the individual nanorods. FIG. 38(*e*) shows the 2-fold structure wherein only one side of the core nanorod has secondary nanorods. FIG. 38(*e*) shows tree leaf-like structure.

Figure 39A:
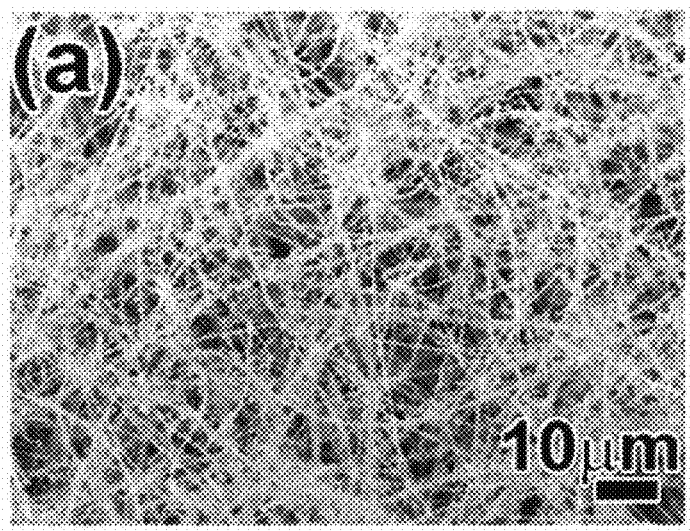
FIG. 39(a) shows a low magnification SEM image.
Figure 39B:
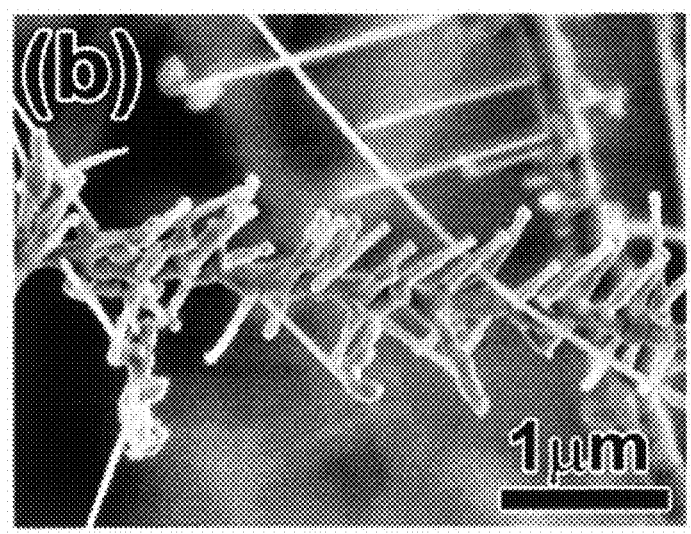
FIG. 39(b) shows a high magnification SEM image.

The present invention also provides hierarchical nanostructures having a ternary composition wherein the symmetric metal oxide material is formed form three metallic oxides. In one embodiment, ZnO, $GeO_2$, $In_2O_3$ and graphite powder mixture are used as the metallic oxide source. FIG. 39(*a*) shows a large amount of random hierarchical nanostructures obtained from the ZnO, $GeO_2$, $In_2O_3$ and graphite powder mixture. The secondary nanorods grow on the major core nanorod without any order. FIG. 39(*b*) is the higher magnification image of the structure. Typically the structures have a length of tens of microns. Typically, the core nanorods have a diameter of about 100 nm. The secondary nanorods are in smaller diameter and the length varies from about 100 nm to about 100 μm.

Figure 40A:
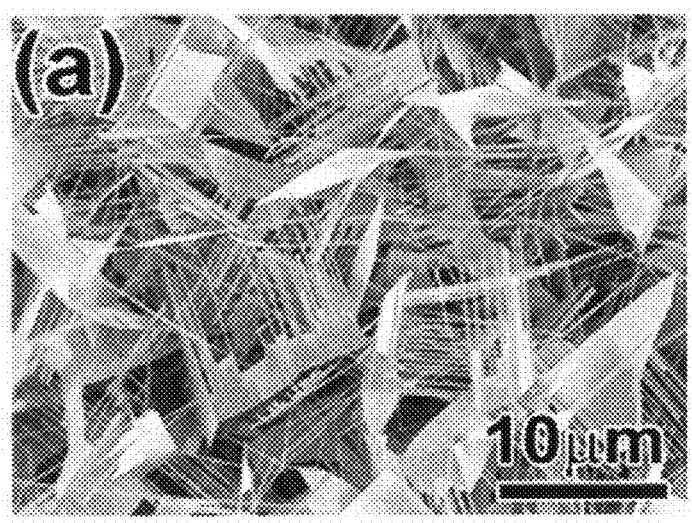
FIG. 40(a) shows a low magnification SEM image.
Figure 40B:
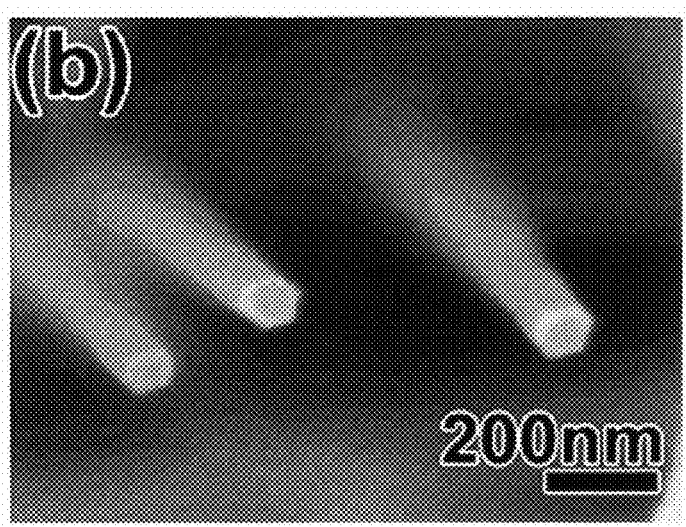
FIG. 40(b) shows a high magnification SEM image.

FIG. 40(*a*) shows the large amount of such structures and FIG. 40(*b*) shows a high magnification image of such structures. The comb-like nanostructure grows along the [11$\bar{2}$0] direction, which is different from the [01$\bar{1}$0] direction which is common in the hierarchical structure formed from binary sources.

Figure 41A:
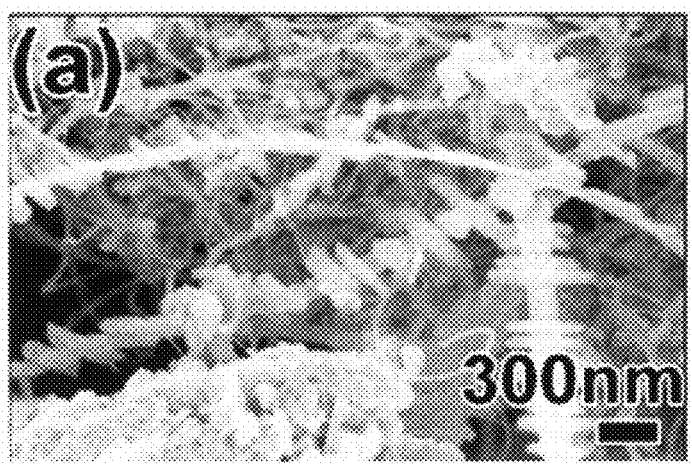
FIG. 41(a) shows a 2-fold MgO nanostructure.
Figure 41B:
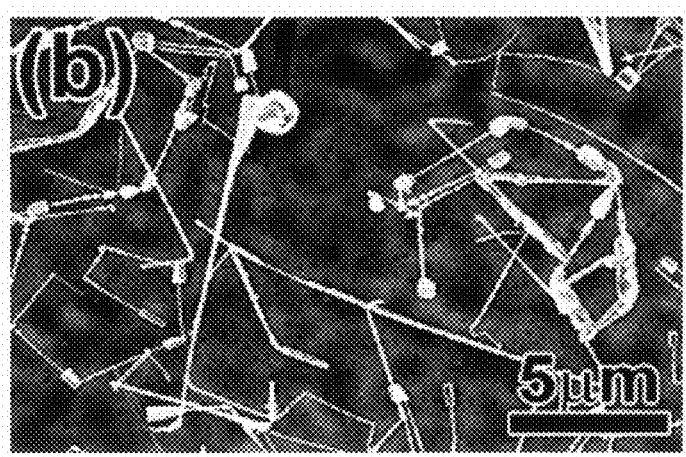
FIG. 41(b) shows a $In_2O_3$ nanocrystal chain and nanowire networks.

In yet another embodiment, the present invention provides symmetric metal oxide materials formed from a MgO metallic oxide source. FIG. 41(*a*) shows an image of MgO 2-fold hierarchical nanostructures, wherein a row of nanorods is substantially perpendicular to the core nanobelt.

The Zn—Sn—O and Zn—Sn—Ge—O nanostructures are also formed in two steps. The Zn—Sn—O core nanobelt forms first as shown in FIG. 38(*a*-*d*) (core nanowire for FIG. 38(*e*-*f*)), then the secondary nanorods grow on the nanobelt epitaxailly. The same two-step growth also applies to the MgO 2-fold structure.

Figure 10A:
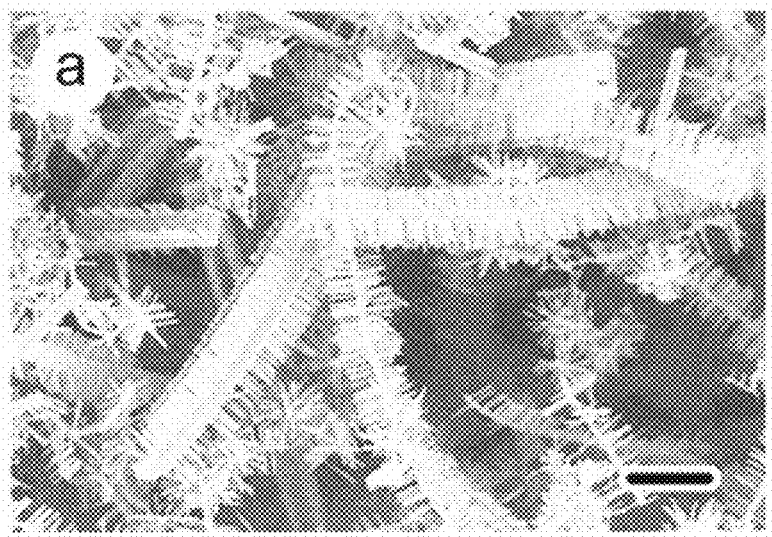
FIG. 10(a) shows a low magnification image illustrating the abundance of the nanobridges. Scale bar=4 μm.
Figure 10B:
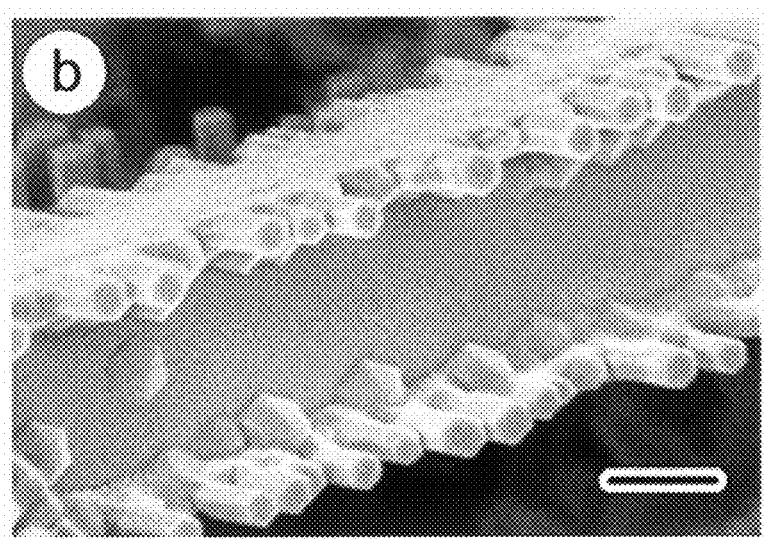
FIG. 10(b) shows a medium magnification image side view of a nanobridge. Scale bar=500 nm.
Figure 10C:
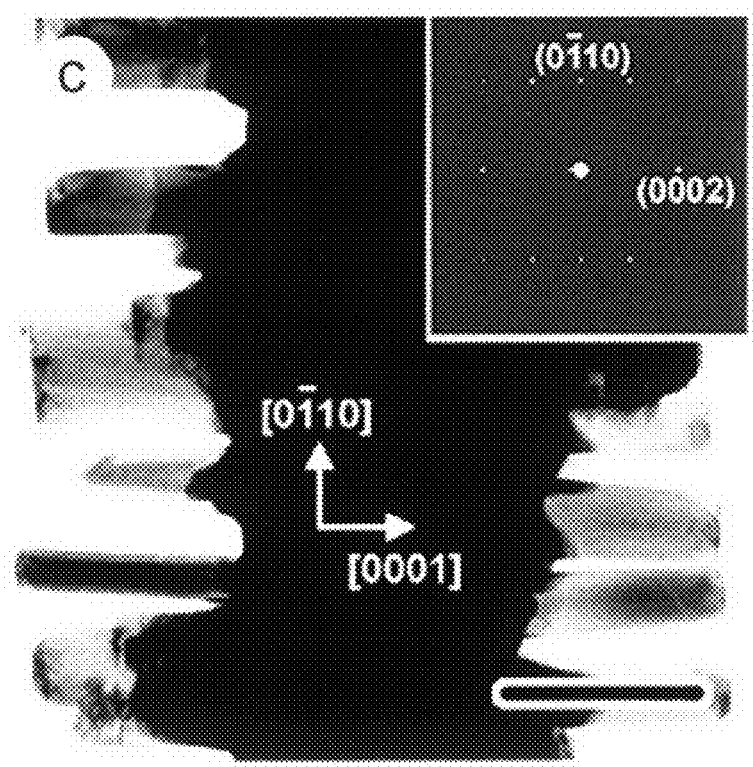
FIG. 10(c) shows a TEM image of the side view of a nanobridge. The inset is the electron diffraction pattern of a nanorod, with zone axis of [$\bar{2}$110] direction. Scale bar=200 nm.
Figure 10D:
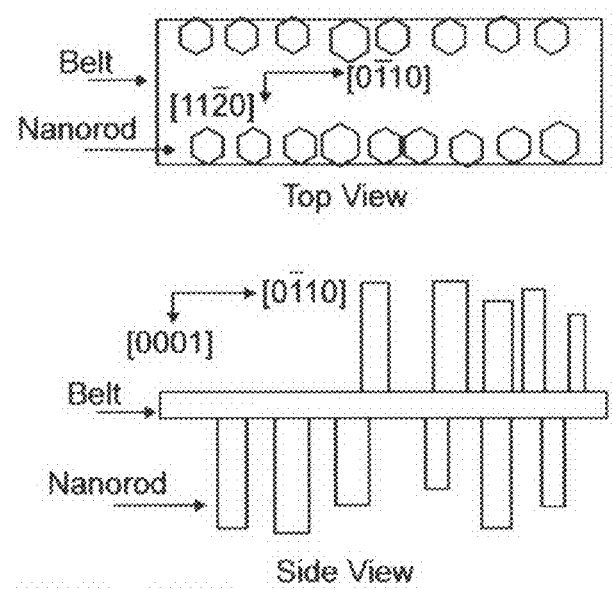
FIG. 10(d) shows a schematic drawing of a top and side view of part of a nanobridge. The page planes for the top view and side view are (0001) and (11$\bar{2}$0), respectively (Scale bar=1 μm).
Figure 11A:
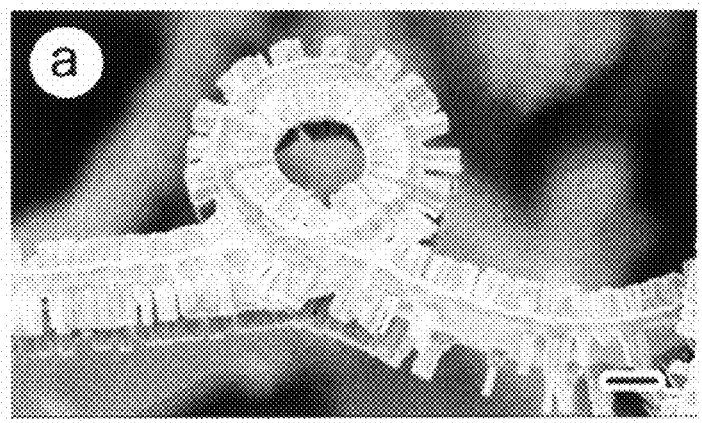
FIG. 11(a) shows a roller coaster-like nanobridge and FIG. 11(b) shows joined twin-like nanobridges.
Figure 11B:
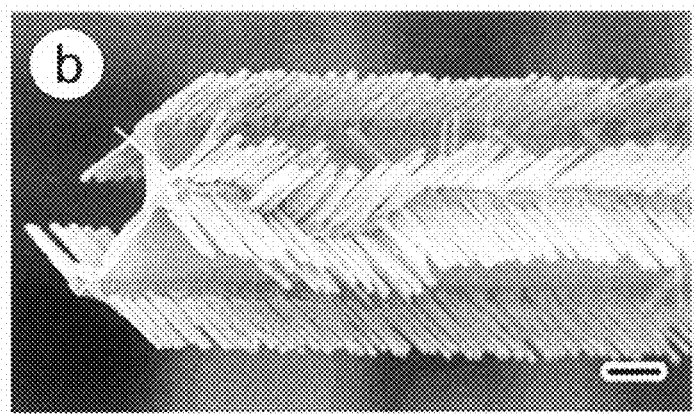
Figure 11C:
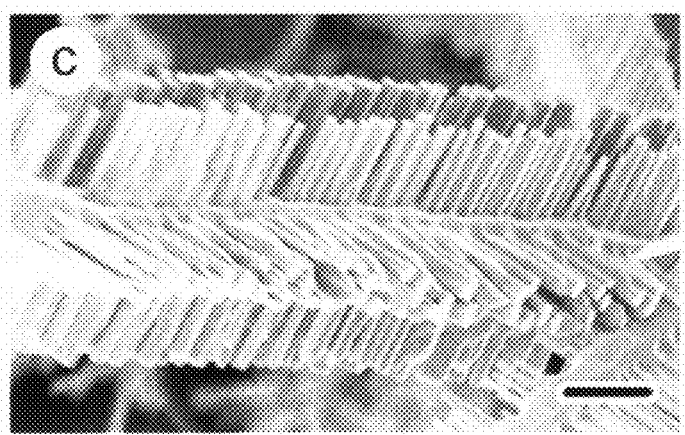
FIGS. 11(c) and (d) show a combination of nanobridge and 4-fold symmetry (Scale bars=1 μm).
Figure 11D:
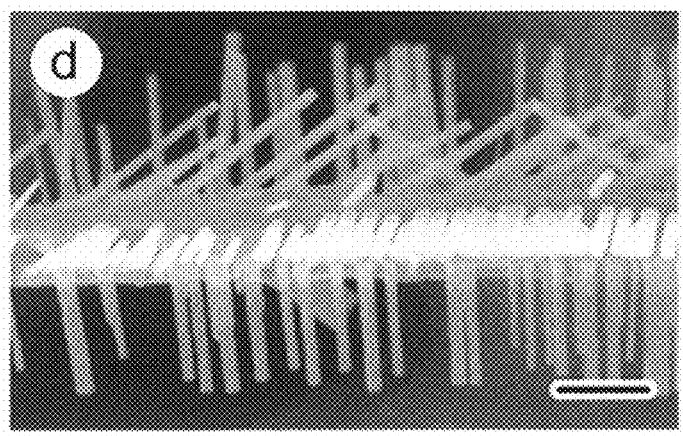
FIG. 11 shows SEM images of the ZnO nanobridge variations.

In yet another embodiment, the invention provides metal oxide materials having a nanobridge or nanonail nanostructural morphology. FIG. 10(*a*) shows the SEM image of the ZnO nanobridges rich area. Random 3D ZnO nanostructures are observed in the same area. The typical nanobridges can be tens of microns long, and up to microns in width and height. Two rows of nanorods grow at the edge of the belt along the belt growth direction and the nanorods are typically substantially perpendicular to the belt surface. The nanorods can grow on either one side of the belt, or both sides of the belt. Nanorods have diameters ranging from about 50 to about 200 nm and lengths ranging from several hundred nanometers to about 2 μm. The density of nanorods on the belt varies. FIG. 10(*b*) is the side view of part of a nanobridge. The nanobelt is several hundred nanometers thick and the nanorods are uniform in length and diameter. FIG. 10(*c*) is a TEM image of the side view of part of a nanobridge, with the associated selected area diffraction (SAD) pattern of the nanorods as the inset. The nanobelt has the similar diffraction pattern to the nanorods. Due to the micron size width of the nanobridge, the center of the side-view TEM image is dark. However, the hundred-nanometer size nanorod is seen from the TEM image. From the SAD pattern in FIG. 10(*c*), it is determined that the individual hexagonal nanorod grows epitaxially along [0001] direction on the (0001) plane and/or along the [000$\bar{1}$] direction on the (000$\bar{1}$) plane of the belt. The nanorod rows are parallel to the [0$\bar{1}$10] direction of the belt. The zone axis of the inserted diffraction pattern is [$\bar{2}$110]. From energy dispersive x-ray spectroscopy (EDS), the main composition of the nanobridges is shown to be ZnO. FIG. 10(d) is a schematic drawing of part of a nanobridge from a top view and side view. The belt and nanorods growth directions are indexed. The typical nanobridge is tens of microns in length.

FIG. 11 shows variations of the nanobridge structures. FIG. 11(a) shows a roller coaster-like nanobridge. The belt forms into ring in the center, and the nanorods grow along the belt edges perpendicular to the belt surface due to the strong epitaxial relation between the nanobelt and nanorods. FIG. 11(b) shows two belts joined together and perpendicular to each other. The associated nanorods grow according to their original direction perpendicular to their own belt. FIG. 11(c) shows a nanobridge with nanorods on all the four sides of the belt. On the belt side surface, besides the original two rows of nanorods on the opposite surface, another 2 or 3 rows of nanorods grow on the other perpendicular side of the nanobelt. FIG. 11(d) is another variation. The density of the nanorods (perpendicular to the page) on the belts varies. One edge has high density, whereas the other edge has low density. In addition, there is another row of nanorods that grow parallel to the belt surface plus an angle of about 36 degree to the belt growth direction. Further examination of the nanorod cap geometry shows that $[\bar{2}110]$ direction instead of $[0\bar{1}10]$ direction is parallel to the belt growth direction.

In this embodiment graphite is not critical as collector for the formation of nanobridge structure. Nanobridges can also form on other materials such as Si and $SrTiO_3$ single crystal substrates. The process includes, but is not limted to, the reduction of oxides, vapor transportation, vapor oxidation and condensation at a low temperature collector. During the growth, the vapor is forced to impinge on the collector center and pass out through the graphite foil edge, so the vapor kinetic process also affects the nanostructures formed. The formation of Zn—In—O eutectic phase also contributes to the growth of nanobridge structures. Without the addition of $In_2O_3$ in the source, the evaporation rate is slower, and only ZnO nanobelt and nanowire can be obtained.

In one embodiment, nanorods are pure ZnO and nanobelts are ZnO dominated. Therefore, the growth of ZnO nanorod from nanobelt is homo-epitaxial. The belt has about 0-3 atm % indium.

Figure 12A:
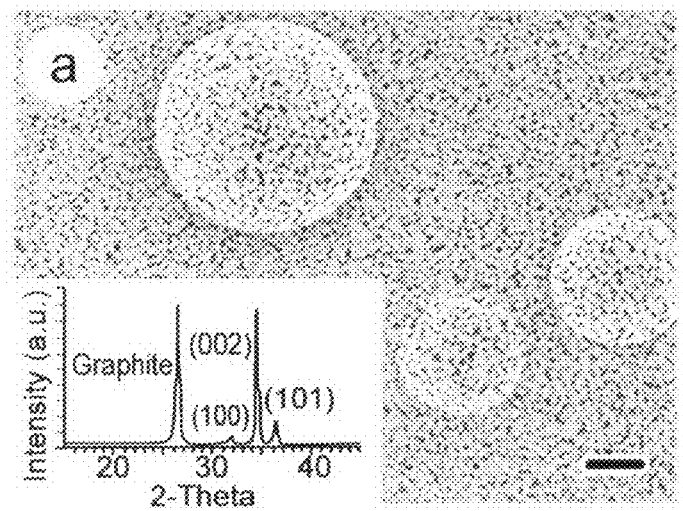
FIG. 12(a) shows a low magnification SEM image of the ZnO nanonails synthesized by vapor transport and condensation method showing the aligned growth of nanonails and the nanonail flowers. Inset is the x-ray diffraction pattern (Scale bar=10 μm).
Figure 12B:
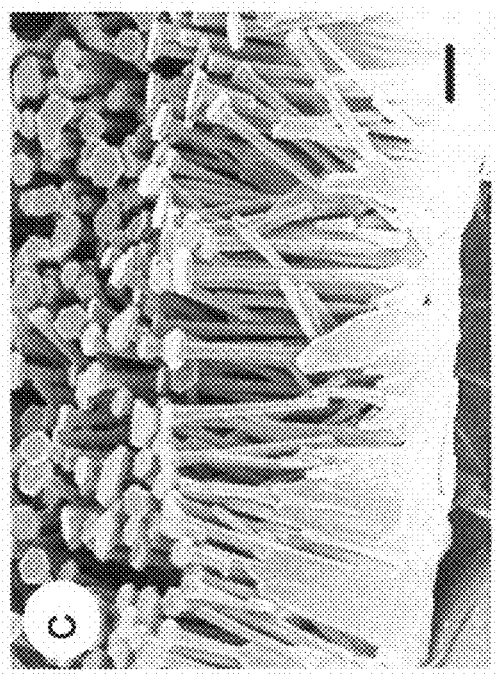
FIG. 12(b) shows a medium magnification top view of nanonail flower (Scale bar=5 μm).
Figure 12C:
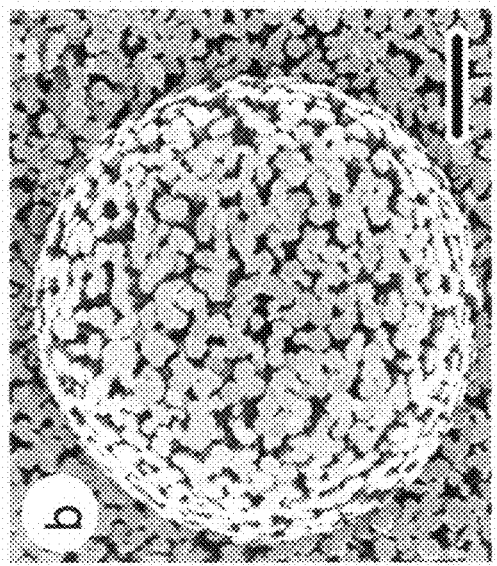
FIG. 12(c) shows a side view illustrating the vertical growth of nanonails. Scale bar=1 μm.
Figure 12D:
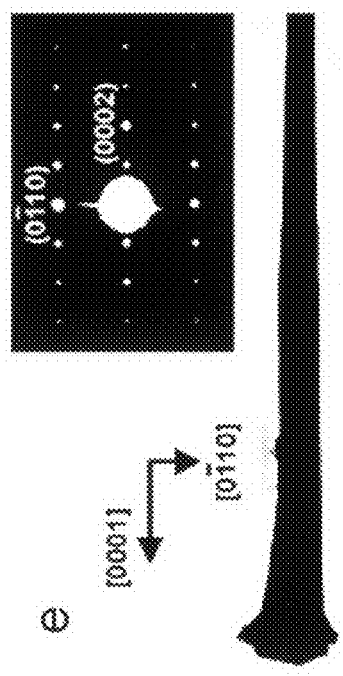
FIG. 12(d) shows a high magnification SEM side-view image of a nanonail. Scale bar=200 nm.
Figure 12E:
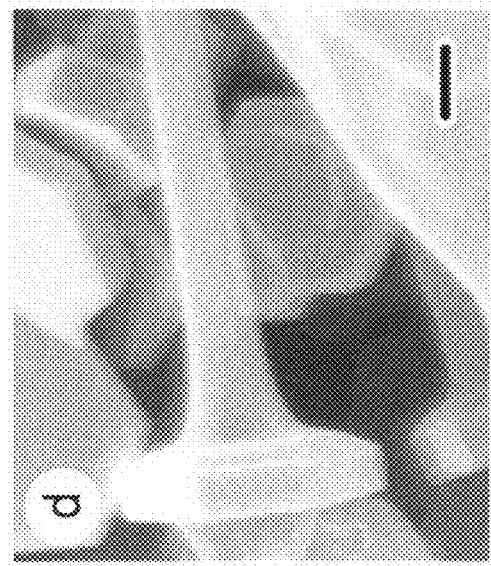
FIG. 12(e) shows a TEM image of the nanonail. The inset is the electron diffraction pattern, with zone axis of [$\bar{2}$110] (Scale bar=200 nm)
Figure 12F:
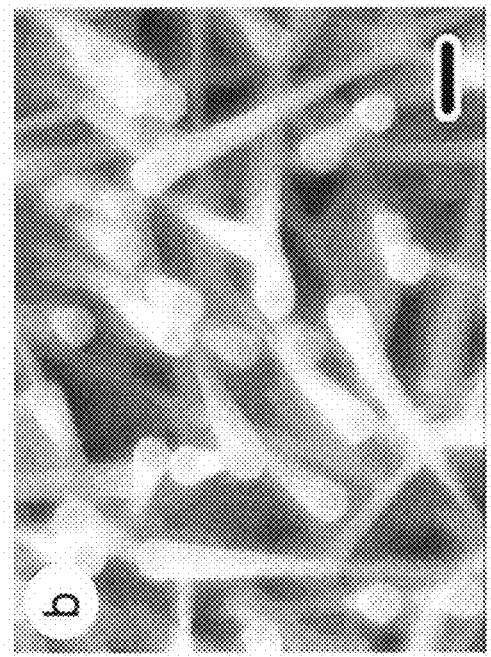
FIG. 12(f) shows an HRTEM image taken from the cap of the nanonail along [$\bar{2}$110] direction (Scale bar=2 nm).

ZnO nanonail structures are successfully grown by varying the growth conditions. FIG. 12 shows the SEM images of the typical ZnO nanonails on graphite foil. FIG. 12(a) shows a low magnification view of the aligned nanonails together with some nanonail flowers. The inset XRD shows a (002) peak of wurtzite ZnO structure and (100) and (101) peaks. FIG. 12(b) shows the medium magnification top view of the flowers to show the hemisphere shape. FIG. 12(c) shows the medium magnification side view of the aligned nanonails. The nanonails grow substantially perpendicular to the linear axis of a common base. The high magnification view of the nanonail caps is shown in FIG. 12(d). These nanonails are several microns in length, with the shaft of about 150 to about 200 nm in diameter. The hexagonal cap is about 1 μm in diameter and about 50 to about 100 nm thick. The change of diameter from shaft to cap is abrupt. The density of nanonails is high, and the nanonails are quasi-perpendicular to the substrate. The EDS spectrum shows that the nanonails are composed completely of Zn and oxygen, no In is detected. FIG. 12(e) shows a TEM side view image of a nanonail. The inset SAD pattern confirms that the nanonail grows along the c-axis direction. FIG. 12(f) shows an HRTEM image taken from the cap of the nanonail, which shows the perfect lattice structure of the nanonail and confirms that the nanonail is a wurtzite-type structure.

Figure 13B:
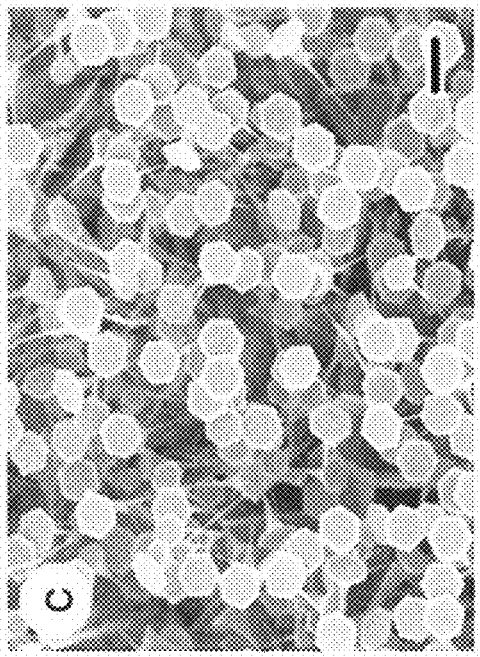
FIG. 13(a) shows low magnification images and FIG. 13(b) shows medium magnification images of small nanonails.
Figure 13A:
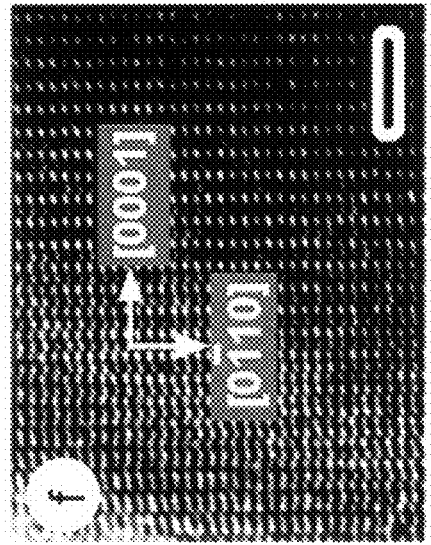
Figure 13C:
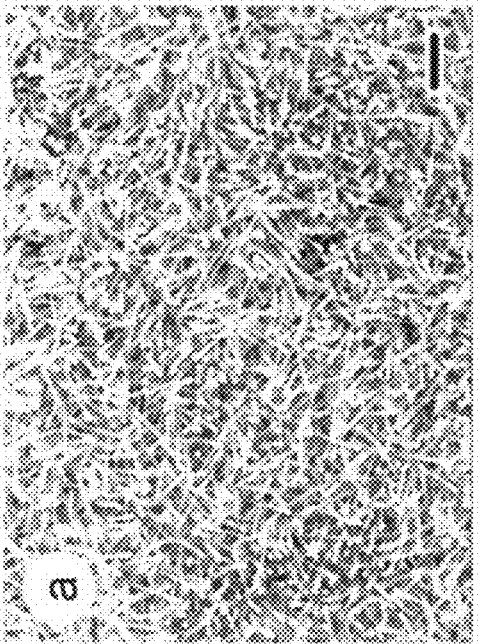
FIG. 13(c) shows medium magnification images and FIG. 13(d) shows high magnification images of thin shaft nanonails.
Figure 13D:
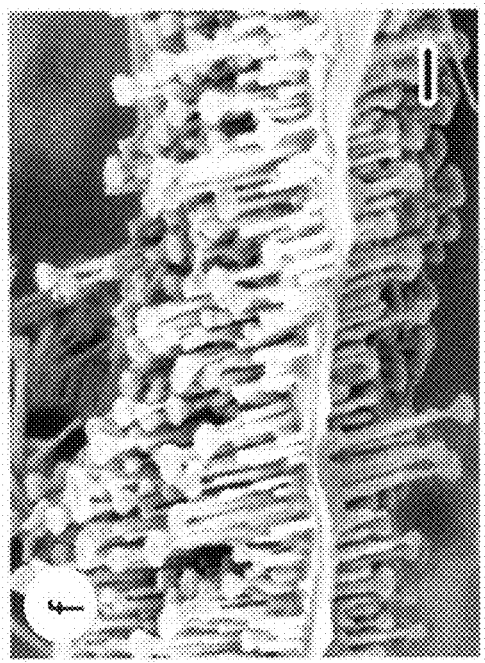
Figure 13E:
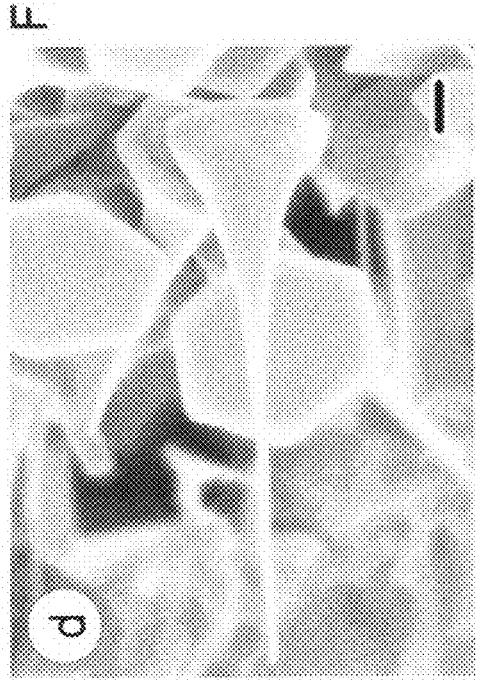
FIG. 13(e) shows Non-hexagon shape nanonails on ZnO rod bases.
Figure 13F:
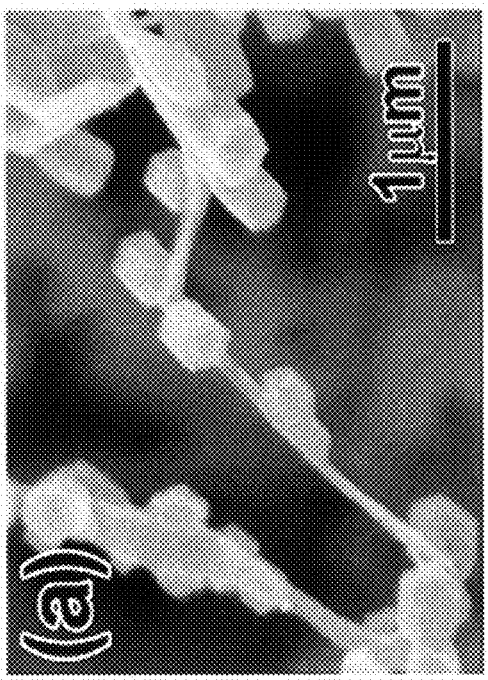
FIG. 13(f) shows nanonails on a ZnO sheet (The scale bar for FIGS. 13(a), (c) and (e) is 1 μm; the scale bars for FIGS. 13(b), (d) and (f) is 200 nm).

The size of the nanonails is variable. Nanonails with cap size are observed as large as 10 μm. FIGS. 13(a) and 13(b) show the small nanonails. These small nanonails grow at different locations on the same sample. The nanonail cap is about 100 nm in diameter, and the nanonail length is about 1 μm. The diameter of the nanonails gradually reduces from the cap to the bottom to about 40 nm. FIGS. 13(c) and 13(d) show another type of nanonails, in which the ratio of the diameter of cap to bottom is big and close to about 20, and the diameter continually reduces from about 800 nm of the cap to about 20 nm of the bottom. The cap shows a hexagonal symmetry. Nanonails without hexagonal shape are also found, as shown in FIG. 13(e). The caps of nanonails are substantially comprised of hexagonal facets. These nanonails can grow either on ZnO rod bases, as shown in FIG. 13(e), or on a ZnO layer. The ZnO rod bases are about 1 μm high and about 1 μm in diameter. These rods show a hexagonal symmetry by 6 facets, and then reduce into a tip at the top to grow the nanonails. Similar to FIGS. 13(c) and 13(d), the diameter of the nanonails change gradually, but the smallest diameter is at the middle of the nanonail shaft, rather than the bottom. ZnO nanonails can also grow on ZnO nanostructures. FIG. 13(f) shows the SEM image of ZnO nanonails growing on nanometer thick ZnO sheet. The nanonails are several hundred nanometers long and with cap of about 100 nm in diameter, and grow on both sides of the sheet.

Figure 14A:
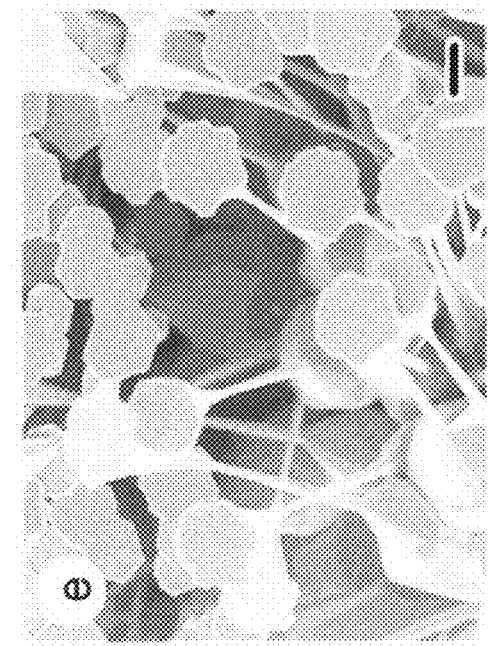
Figure 15C:
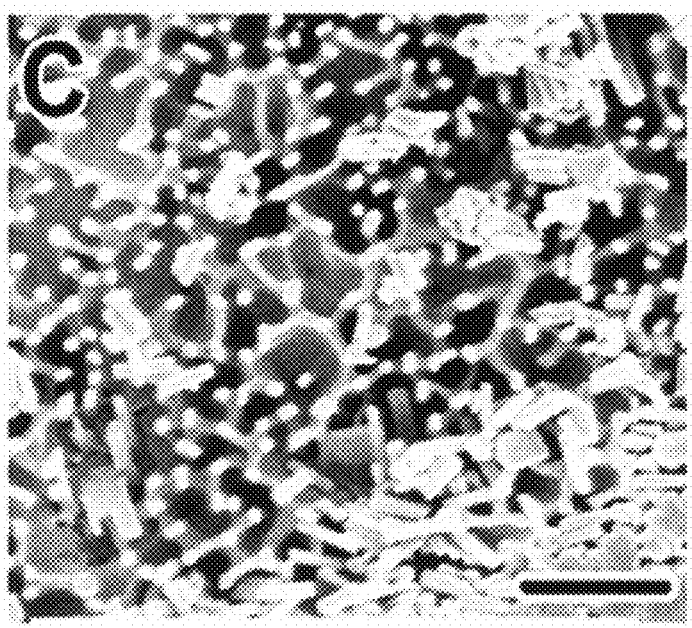
FIG. 15(c) shows a ZnO nanowall where some nanowires grown on the nanowall (The scale bar for FIG. 15(a) is 5 μm; the scale bar for FIGS. 15(b) and FIG. 15(c) is 1 μm).

FIG. 14(a) shows a structure having a combination of nanocrystals and nanowires. FIG. 14(b) shows a small ZnO nanowire decorated with nanocrystals. Several of the nanocrystals are epitaxial to the nanowire. FIG. 14(c) shows a structure wherein a nanorod met the nanobelt during growth and penetrated the nanobelt.

ZnO nanobridge structure formation is favored at low $In_2O_3$ ratio in the source with a 2.0 Torr air pressure and furnace temperature at 1000° C., whereas ZnO nanonails are favored at lower temperature ranging from about 950° C. to about 970° C. and lower pressure ranging from about 0.5 to about 1.0 Torr. The morphology and microstructures of ZnO nanostructures on the graphite foil are examined by JEOL 6340F field emission scanning electron microscopy (SEM), JEOL 2010F field emission transmission electron microscopy (TEM) and Bruker-AXS x-ray diffractometer (D8 GADDS).

Figure 16A:
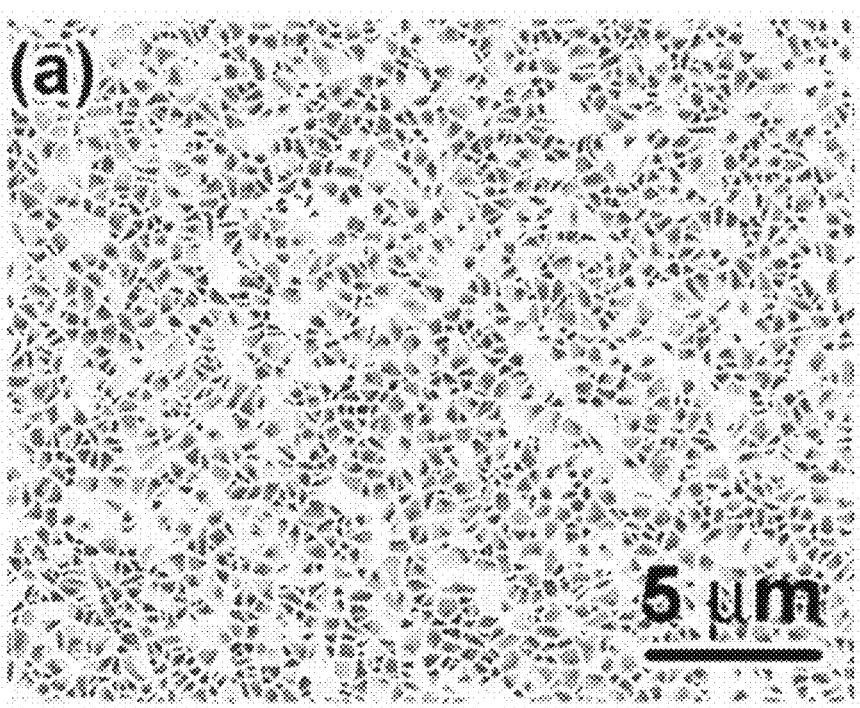
FIG. 16(a) shows a medium magnification SEM image of the small size nanowalls.
Figure 16B:
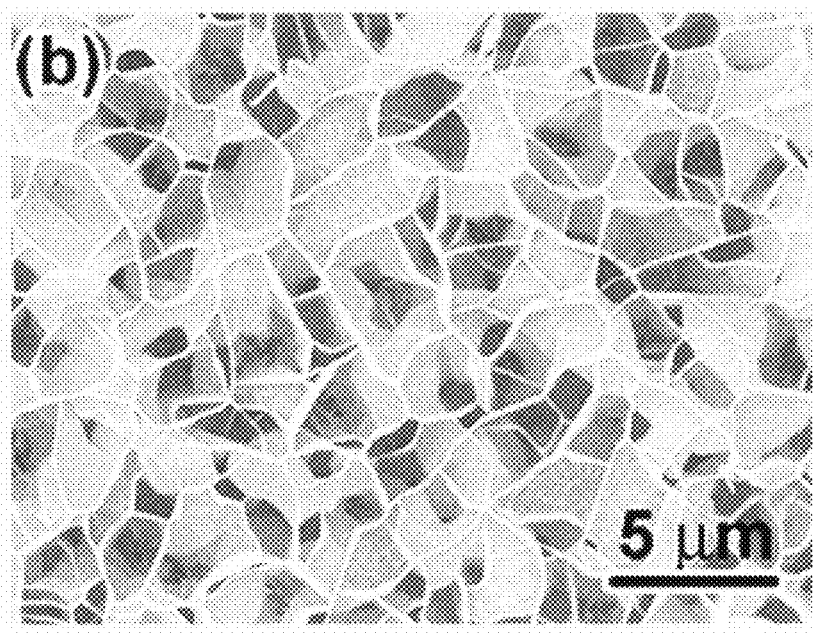
FIG. 16(b) shows a medium magnification SEM image of the large size nanowalls.
Figure 16C:
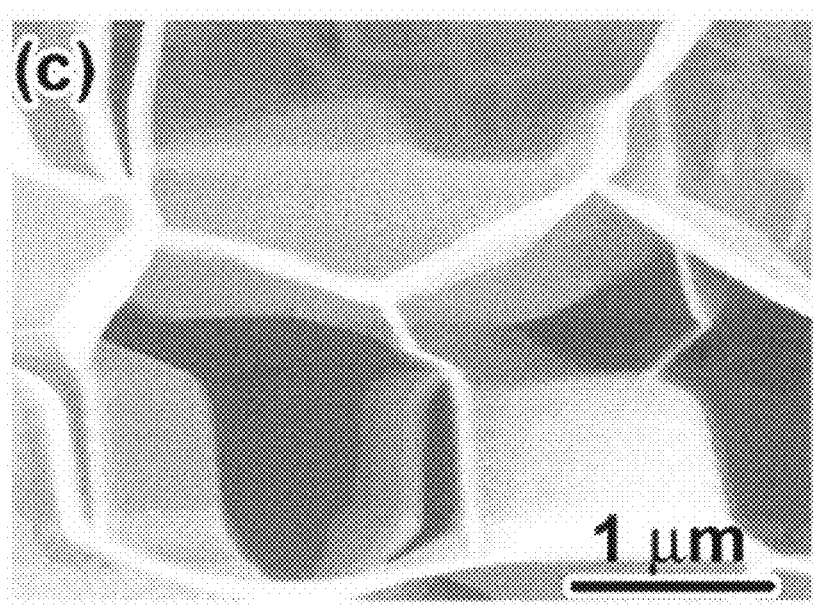
FIG. 16(c) shows a high magnification SEM image of the large size nanowalls.
Figure 17A:
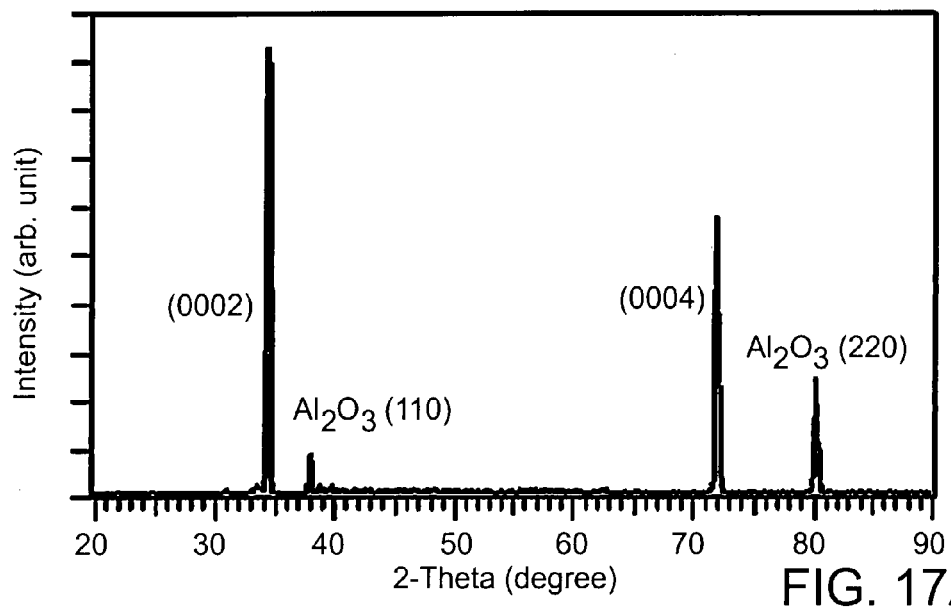
FIG. 17(a) shows a θ-2θ scan.
Figure 17B:
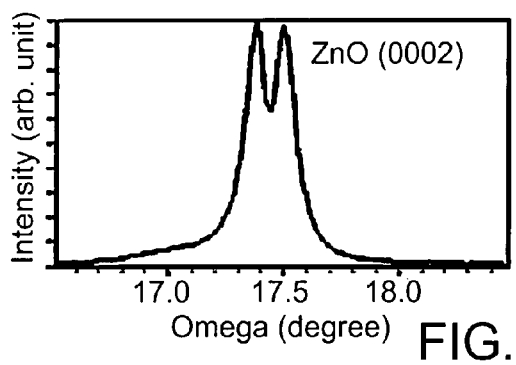
FIGS. 17(b) and (c) show Ω scans of the nanowalls and substrate, respectively.
Figure 17C:
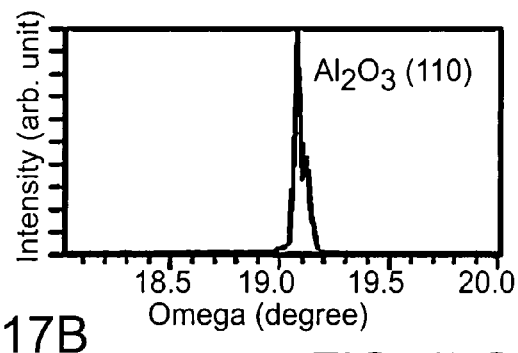
FIG. 17 shows XRD spectra of nanowalls structures.
FIG. 17(d) shows a Φ scan of the nanowalls.
Figure 17D:
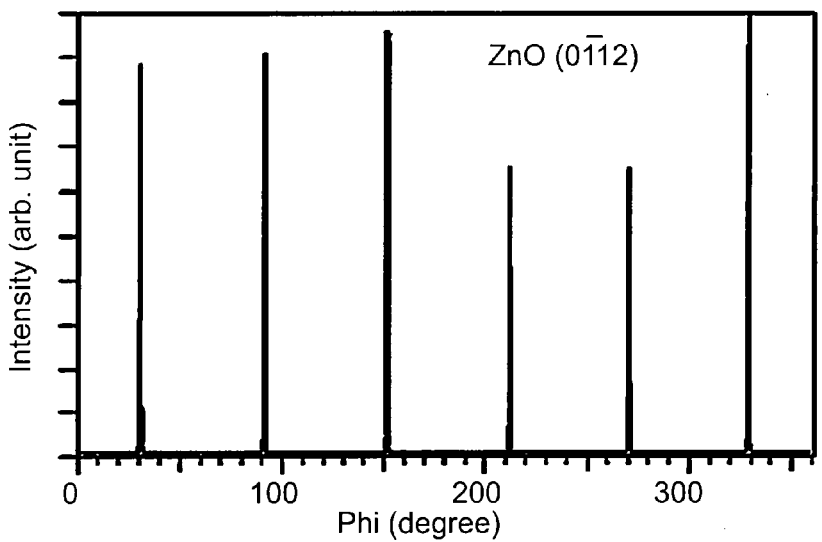
Figure 18A:
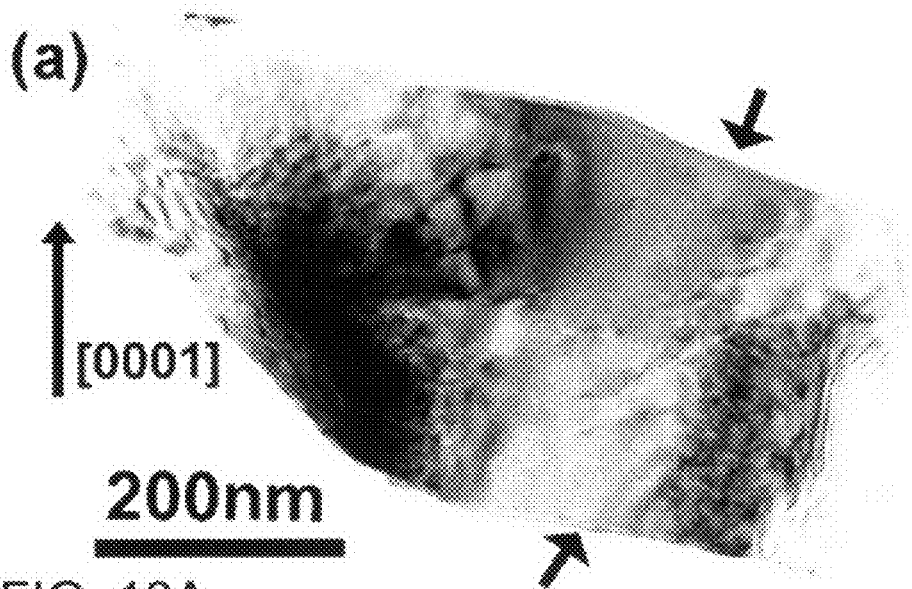
FIG. 18(a) shows a low magnification TEM image of a nanowall flake.
Figure 18B:
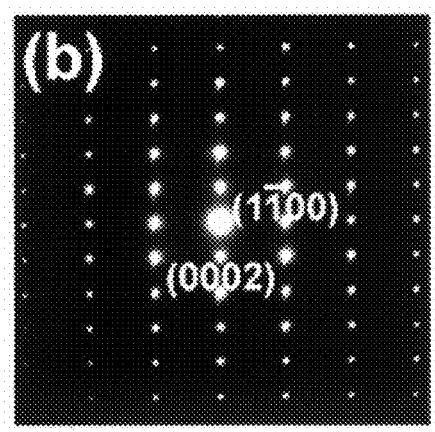
FIG. 18(b) shows an SAD pattern.
Figure 18C:
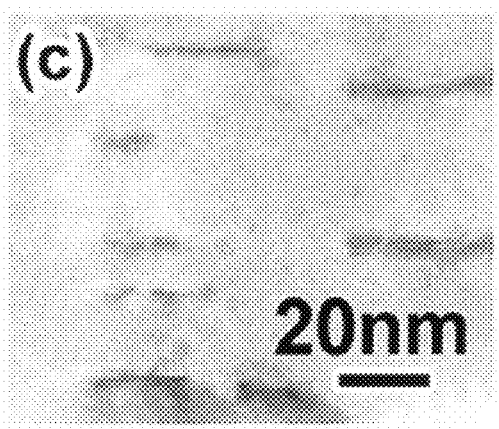
FIG. 18(c) shows a high magnification phase contrast image illustrating the edge dislocation dipoles.
Figure 18D:
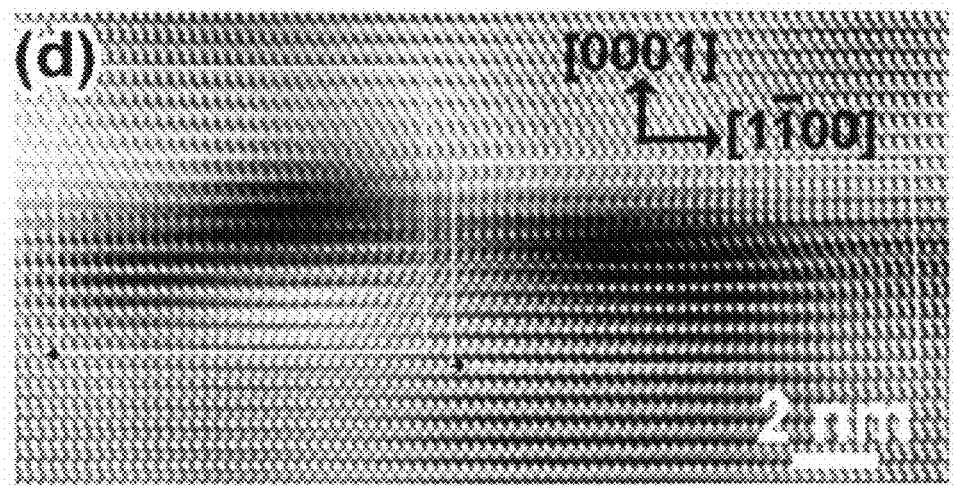
FIG. 18(d) shows a high resolution TEM image of the dislocation dipole.

In yet another embodiment, the invention provides metal oxide materials having a nanowall nanostructural morphology. Based on Scanning Electron Microscopy (SEM) and X-ray Diffraction (XRD) examination, there is little difference between the nanowalls grown at high and low temperatures. FIG. 16 shows the typical SEM image of ZnO nanowall structures at 950° C. The nanowalls interconnect with each other to form a network. The pore size varies from several hundred nanometers to about 1 micron. FIG. 16(a) is the medium magnification view of small nanowalls and FIG. 16(b) shows large size nanowalls. FIG. 16(c) is the high magnification SEM image of the large size nanowalls. Most of the nanowall flakes are perpendicular to the substrate, although some form certain small angles with the substrate. These nanowall flakes do not exhibit a clearly ordered pattern and some pieces are curved. Many of the nanowall flakes are parallel to each other and show a quasi-hexagonal pattern and most of the flakes form angles that are multiples of 30°. FIG. 17 is the XRD 2-Theta diffraction pattern of the white-grey nanowalls. Due to the good epitaxial relation between the c-plane of ZnO nanowalls and the a-plane of sapphire, only the ZnO (0002) and (0004) peaks can be seen. FIG. 17(*b*) shows the Omega scan of the (0002) peak of the sample. The peak splits into two small ones. The FWHM of the peak is 0.24 degree. The peak split has also been found from the substrate (with FWHM of 0.03 degree). FIG. 17(*c*) shows the Phi scan of (0$\bar{1}$12) peak of ZnO nanowall on sapphire. The six peaks, with equivalent distance of 60 degrees, demonstrate the in-plane epitaxial relation of ZnO nanowalls with the a-plane single crystal sapphire substrate.

FIG. 18(*a*) is the Transmission Electron Microscopy (TEM) image of a ZnO nanowall flake. This nanowall flake has the width of 330 mn and length of 800 nm. FIG. 18(*b*) is the associated electron diffraction pattern. The appearance of the extinction diffraction spots such as (0001) and (0003), is caused by double diffraction. The two long edges (indicated by arrows) of the nanowalls are on the high-index plane inclined to the (0002) plane, and they are composed of many steps of small (0002) facets. FIG. 18(*c*) is a higher magnification phase contrast image showing the dislocations in the flake. Several nanowall flakes have dislocations. FIG. 18(*d*) is the high resolution TEM image of a flake. These dislocations, with length of about 20 mn, distribute periodically in the flake. A high resolution image, such as that shown in FIG. 18(*d*) indicates that each dislocation line is associated with two heavily strained areas. A Burgers circuit to enclose each strained area (FIG. 18(*d*)), shows that each strained area is associated a perfect dislocation with a Burgers vector of being either $\frac{1}{3}[2\bar{1}\bar{1}0]$ or $\frac{1}{3}[\bar{2}110]$. The Burgers vectors of these unit perfect dislocations are parallel to the (0002) plane, which are typical mobile dislocations in a hexagonal structure.

Aligned ZnO nanowire arrays are grown on a-plane sapphire substrates. Au catalyst is used to grow the aligned nanowires with either white grey or reddish colors. The subsequent deposition of Zn vapor and oxidation of segregated Zn from supersaturated Au—Zn alloy results in the nanowall structure. Due to the epitaxy of the nanowalls to the sapphire substrate, the nanowalls are both in-plane and out-of-plane aligned.

Figure 19:
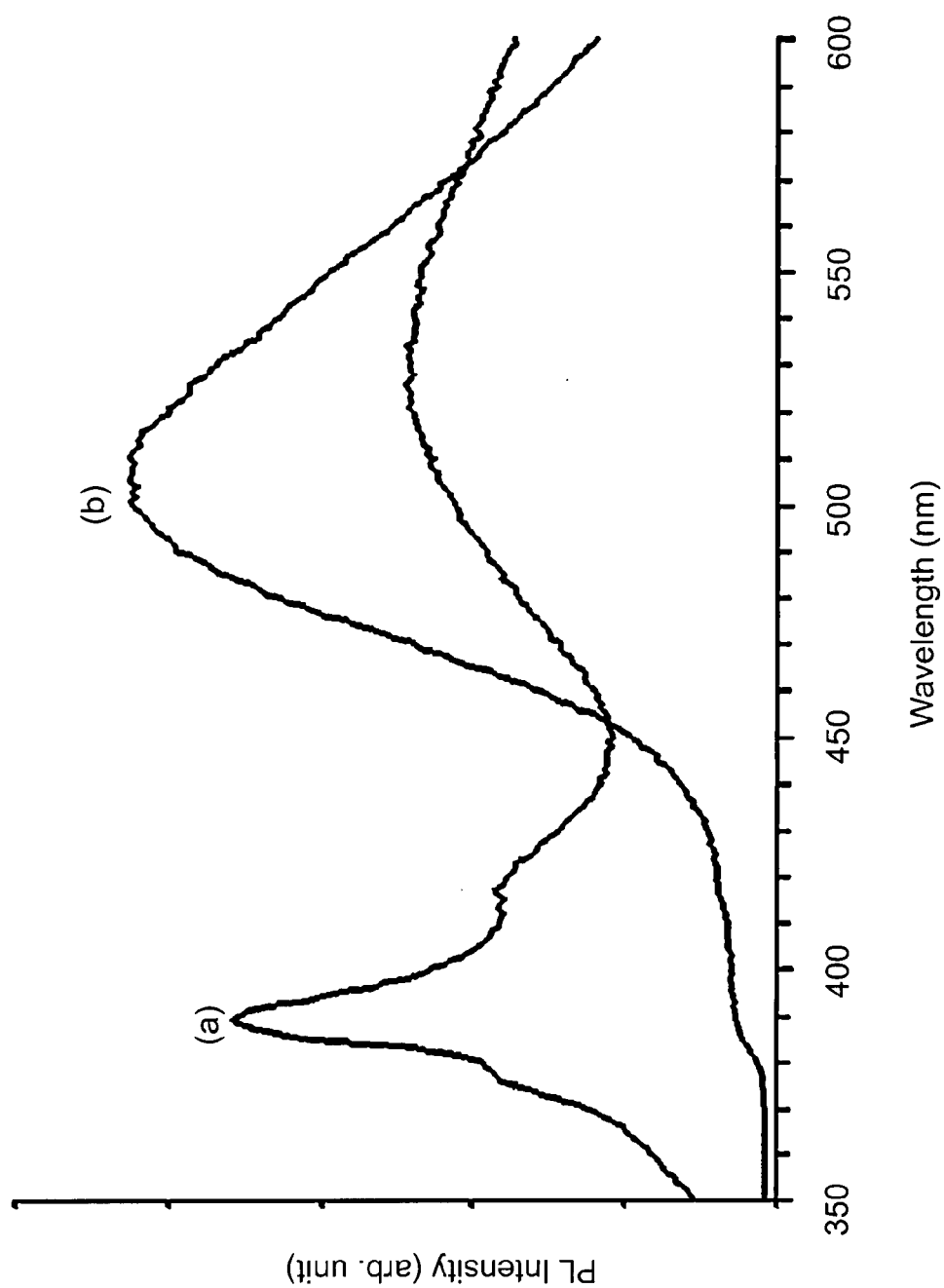
FIG. 19 shows a photoluminescence spectra of the nanowalls. Plot (a) is a spectrum of white-grey nanowalls grown at high temperature and Plot (b) is a spectrum of reddish nanowalls grown at low temperature.

The structure and physical properties such as photoluminescence and field emission of the nanostructures are characterized. For photoluminescence (PL) measurements, the samples are irradiated with an excitation wavelength of 325 nm and emission scanning is performed from about 340 to about 600 nm. FIG. 19 shows the room temperature photoluminescence measured on as-prepared ZnO nanowalls on sapphire substrate. Curve (a) is the spectrum from white-grey nanowalls grown at higher temperature, and curve (b) is that from reddish nanowalls grown at lower temperature. The strong UV emission at 390 nm for spectrum (a) is attributed to the band edge emission of ZnO wurtzite structure. The green-yellow broad deep level emission is not as strong. Spectrum (b) shows big broad green-yellow emissions, but very weak UV emission.

ZnO nanowalls are synthesized by thermal evaporation, condensation method wherein a thin layer of gold is coated on the substrate as catalyst. A mixture of ZnO and graphite powders is used as the source and put into the sealed end of a small quartz tube. A <110> sapphire substrate, coated with 1-3 nm of Au thin film, is placed at the open end of the quartz tube for the ZnO nanowall growth. When the substrate temperature ranges from about 875° C. to about 950° C. and the pressure ranges from about 0.5 to about 1.5 torr, ZnO nanowall structures on the sapphire substrate are observed. The nanowalls grown at high temperature show a milky white-gray color, while the structures grown at low temperature show a reddish color.

ZnO nanowall structures are formed on an a-plane sapphire substrate. The nanowall grows epitaxially from the substrate. Growth temperature has an effect on the nanowalls' color and photoluminescence emission. Oxygen and vacuum annealing also change the PL spectra.

In yet another aspect, the present invention provides the synthesis of freestanding gram quantity ZnO nanowires by vaporization and condensation. Typically greater than 35% of the bulk ZnO powder in the source are converted to nanowires by this method.

The morphology and microstructure are studied by scanning electron microscopy (SEM, JEOL-6340F), transmission electron microscopy (TEM, JEOL-2010F), and Bruker-AXS x-ray diffractometry (G8 GADDS).

Photoluminescence (PL) studies are conducted at room temperature using a dual scanning microplate spectrofluorimeter (Molecular Devices Inc., SpectraMax Gemini XS) with excitation at 325 nm. Large quantity (grams) ID hexagonal ZnO nanowires are synthesized by thermal evaporation of commercial ZnO powder. Fine graphite flakes in the collection zone are the key to yielding the large quantity due to their high surface area. After growth, the graphite flakes are easily removed through oxidation at 700° C. for about 2 hours. SEM and TEM analysis show that the average length and diameter of the nanowires are about 5-10 μm and about 20-50 nm respectively and about 0.5-5 μm and about 60-100 nm for nanorods. These nanowires show a weak UV band (at 380 mn) and green band (520 mn) photoluminescence (PL).

ZnO nanowires and nanorods are synthesized by thermally vaporizing a mixed source comprising of commercial ZnO powder (Alfa-Aesar, particle diameter about 10 μm) and graphite powder (Alfa-Aesar, particle diameter 5 to 10 μm) with an atomic ratio of 1:4 in a horizontal tube furnace. The source materials are located in the higher temperature region (about 1000° C. to about 1200° C.) of a quartz boat covered by another similar boat. In the same boat, graphite flakes (Pennsylvania Micronics, size 5 to 10 μm$^2$) are spread uniformly in the lower temperature region (about 700° C. to about 850° C.) to collect the ZnO nanowires. The sharp temperature gradient (from about 1000-1200° C. down to about 700-850° C. over a distance of about 6-7 cm) are chosen to ensure high quality and yield of ZnO nanowires. During growth, the source is maintained at a pressure of about 1-2 Torr air. After about 30-45 minutes growth, the original black graphite flakes turn a grey color indicating a significant amount of deposition of ZnO on the graphite flakes. Under SEM examination, large quantity ID hexagonal ZnO nanowires (about 5-10 μm in length and about 20-50 nm in diameter) and nanorods (about 0.5-5 micrometers in length and about 60-100 nm in diameter) are observed. A weight increase of hundreds of milligrams vs. the original graphite flakes is achieved.

The samples are studied by SEM. SEM sample specimens are collected from different regions that have different condensation temperatures. The SEM images of the as-made ZnO nanowires and nanorods containing the graphite flakes are shown in FIG. 23. Three kinds of morphologies are observed. In the high temperature zone (about 800° C.-850° C.), close to the source material, long (about 5-10 μm) and thin (about 20-50 nm) nanowires are grown as shown in FIGS. 23(*a*), 23(*b*), and 23(*c*) in different magnifications, respectively. In the medium temperature region (about 700° C.-800° C.), short and large diameter nanorods of about 0.5-5 μm in length and about 60-100 nm in diameter are abundant as shown in FIGS. 23(*d*), 23(*e*), and 23(*f*) in different magnifications, respectively. Generally, these nanorods have prominent hexagonal structure with a blunt head, whereas the nanowires have a sharp tip with a smooth round surface. At the low temperature region (about 600-700° C.), far away from the source, only nanoparticles are observed.

Figure 24A:
FIGS. 24(a) and (b) show the voids left by flakes (indicated by the arrows).
Figure 24B:
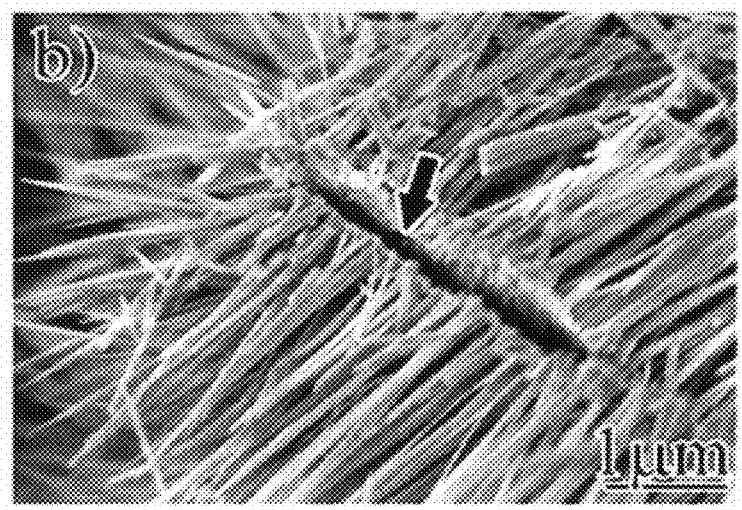
FIG. 24 shows SEM images illustrating morphology of ZnO nanostructures after oxidization.
Figure 24C:
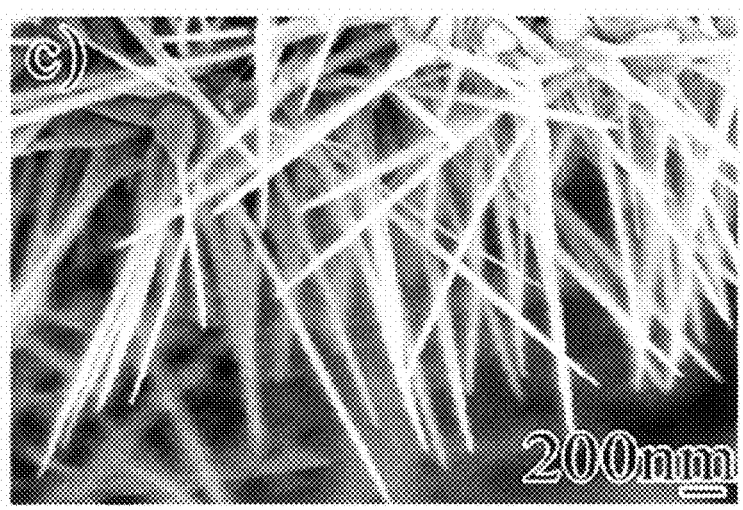

In order to remove the graphite flakes in the as-made ZnO nanowires, the as-made samples are oxidized for 2 hours in a tube furnace with $O_2$ gas using different temperatures. After oxidation, the as-made grey powder turn white, which indicates that the graphite flakes are removed (as indicated x-ray spectra). FIGS. 24(a), 24(b), and 24(c) show the typical morphology in different magnifications of the sample after oxidation. In addition to the electrical conductivity change, the morphology of the nanowires also changes: most of the nanowires and nanorods become sharp at the tip with a diameter of about 2 to about 4 nm after oxidation. Fortunately, the conductivity can be restored by further annealing at about 500° C. in vacuum. Removal of graphite is the observation of voids mimicking the shape of the graphite flakes, is indicated by arrows in FIGS. 24(a) and 24(b).

Figure 25:
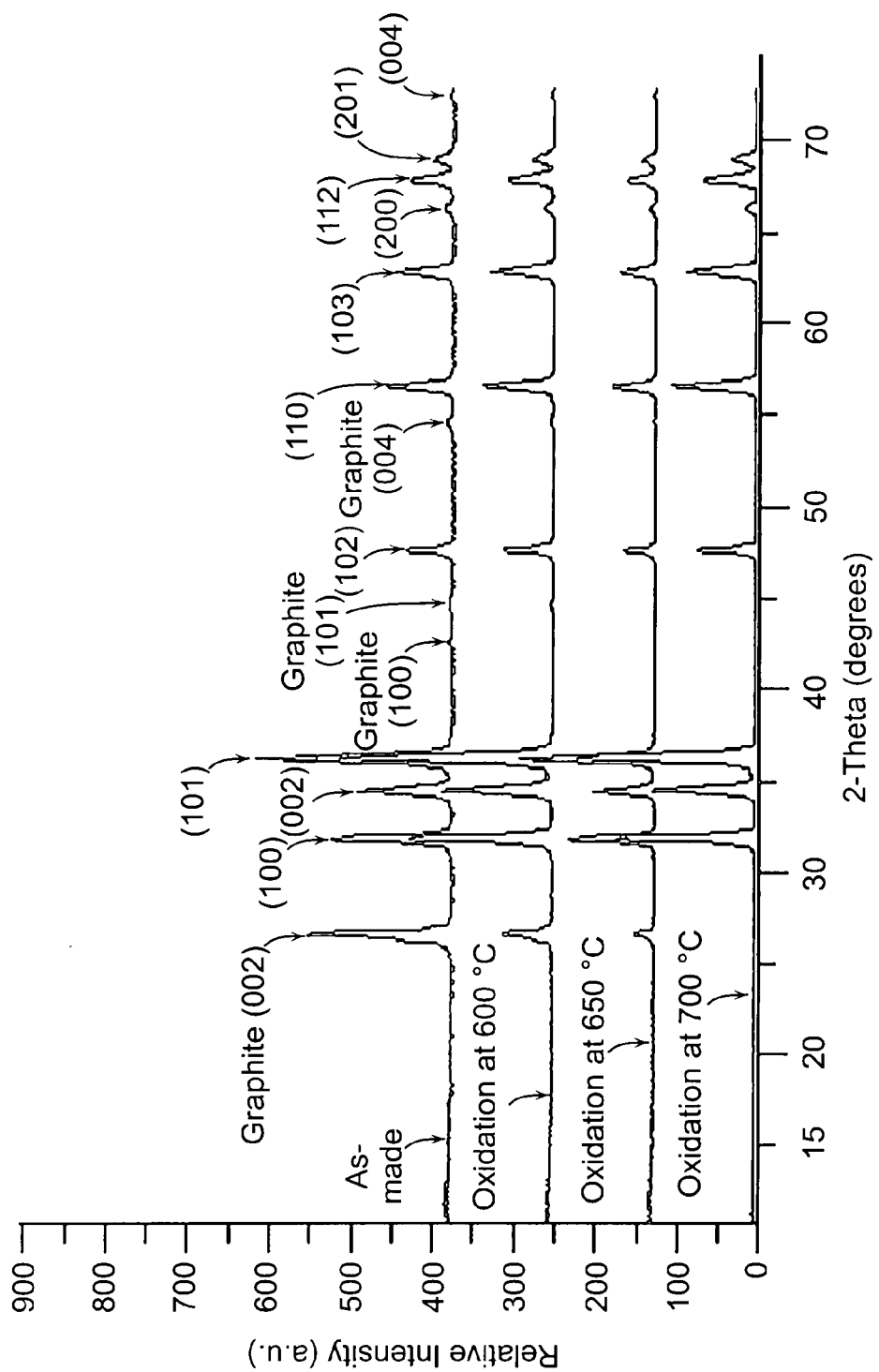
FIG. 25 shows XRD patterns of the as-made large quantity ZnO nanowires and those after oxidation at 600° C., 650° C. and 700° C. (top to bottom). The patterns are typical for wurtzite hexagonal structure like bulk ZnO with unit cell constants of a=3.248 Å and c=5.206 Å.
Figure 26D:
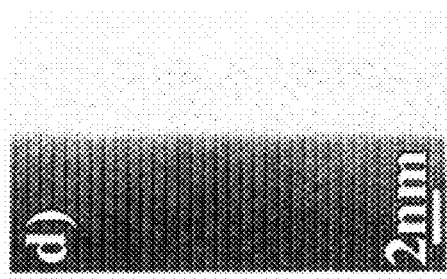
FIG. 26(d) shows the presence of an amorphous graphite shell on the surface of an as-made nanowire.
Figure 26E:
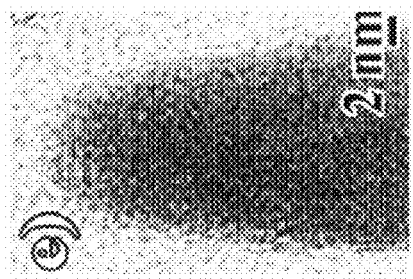
FIG. 26(e) shows the disappearance of the amorphous graphite layer after oxidation.
Figure 26B:
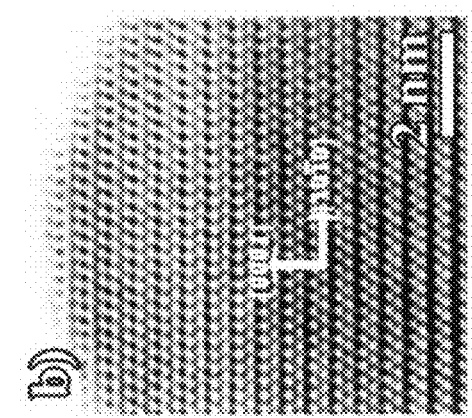
FIG. 26(b) shows an HRTEM image of a tip showing growth direction of [0001], and the surface is enclosed mainly by {1100} facets.
Figure 26C:
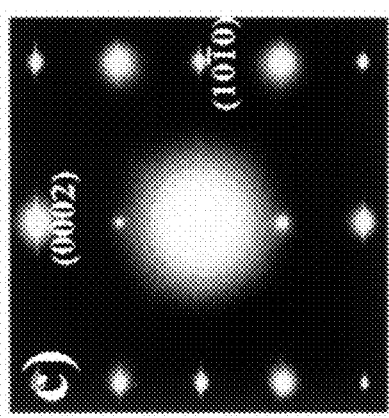
FIG. 26(c) shows a selected area diffraction pattern of ZnO nanowires, illustrating hexagonal structure.
Figure 26A:
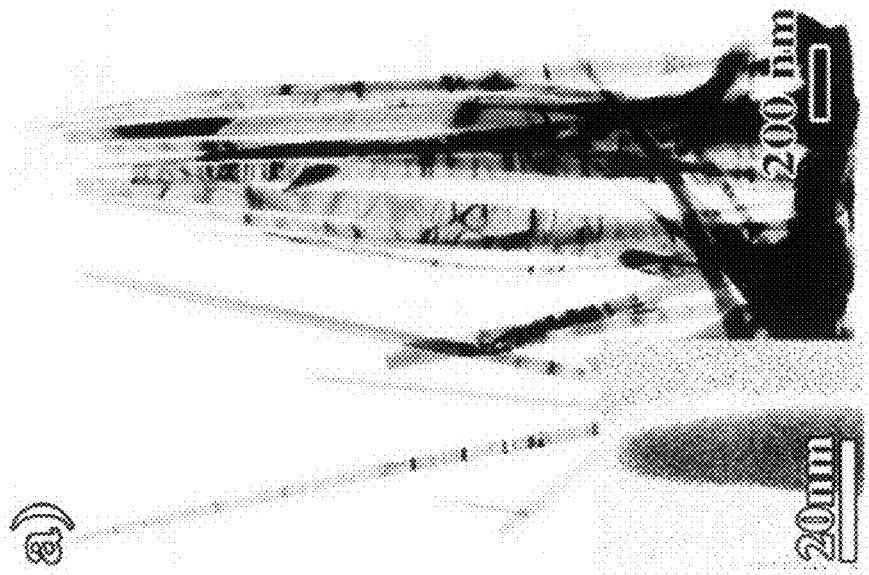
FIG. 26(a) shows a general morphology of the oxidized sample. The inset shows a tip of the nanowire.
Figure 27:
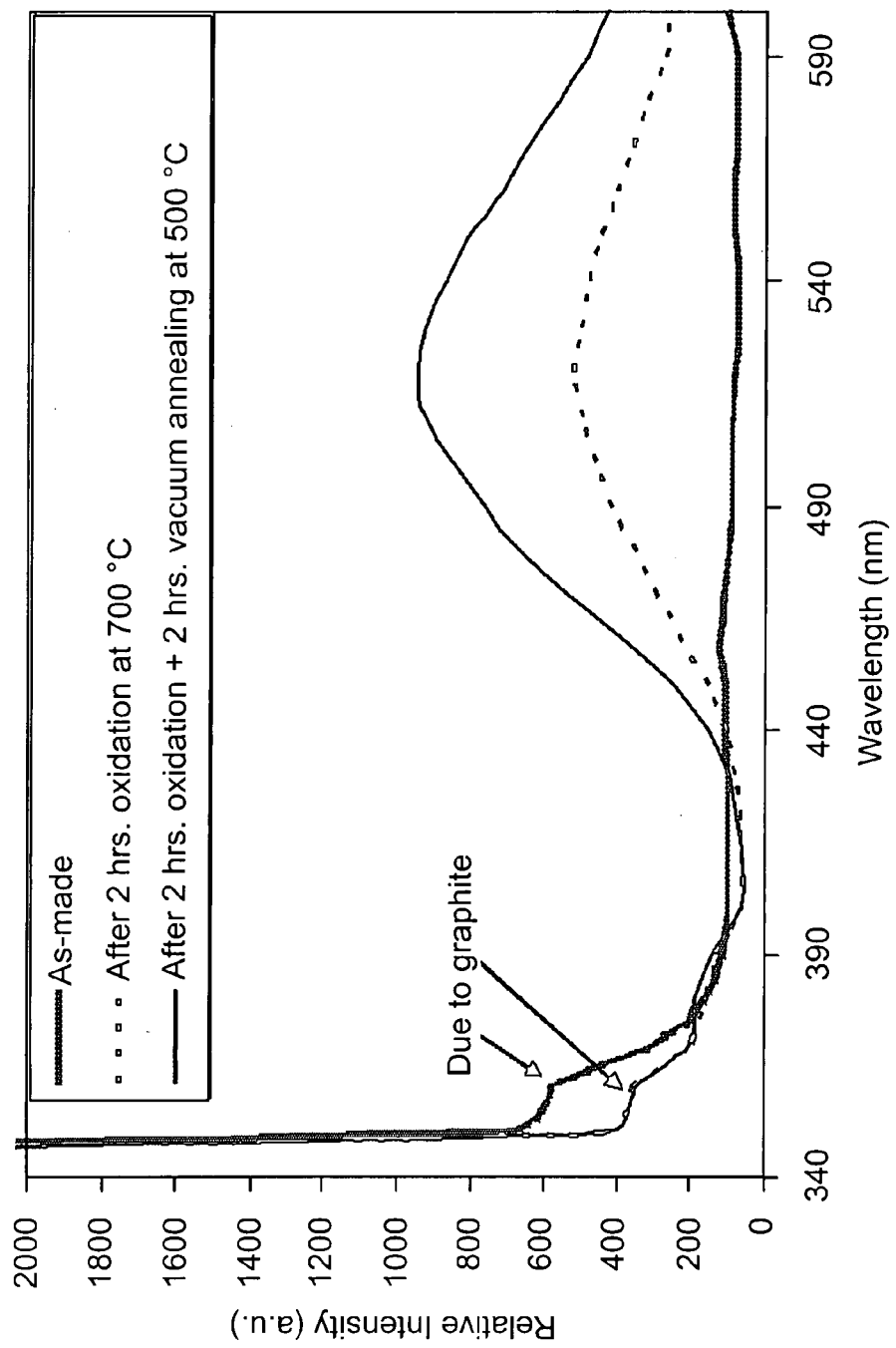
FIG. 27 shows a room temperature photoluminescence spectra of as-made, oxidized, oxidized plus vacuum annealed ZnO nanowires.

The crystallinity of the ZnO nanowires, the existence of graphite flakes in the as-made sample and the removal of graphite flakes by oxidation are studied by x-ray diffraction. The spectra are shown in FIG. 25. The ZnO nanowires are crystallized. In the as-made samples, a graphite peak (002) at 2θ=26.6° is observed indicating the existence of a large amount of graphite flakes. The graphite peak intensity is reduced substantially with oxidation at 600° C. for 2 hours. The graphite peaks are completely removed for samples annealed at about 700° C. From these spectra, it is found that both as-made and oxidized samples show a typical wurtzite hexagonal structure like that of bulk ZnO with unit cell constants of a=3.248 Å and c=5.206 Å

The typical TEM images of the microstructure of ZnO nanowires are shown in FIG. 26. FIG. 26(a) shows is a general morphology of the nanowires. The diameter of these nanowires varies from a few nanometers to about 100 nm, and the length is generally a few micrometers. The nanowires with larger diameter are straight, and their tips can be sharp or blunt, while those with smaller diameter are generally bent and end up with very sharp tips (shown in the inset). The diameter of all the nanowires is gradually reduced from the root to the tip. A ripple-like contrast in the TEM image is caused by strain resulting from the bending of the nanowires. An HRTEM image in FIG. 26(b) indicates that the growth direction is [0001], and the surface is enclosed mainly by {1100} facets. The tip is typically not sharp at the atomic scale. For example, the tip shown in the HRTEM image ends up on a (0002) plane with a diameter of about 4 nm. The surface of these nanowires is clean and free from amorphous shells as shown in FIG. 26(e). This is in contrast to similar samples before oxidation, in which the surface is wrapped by amorphous carbon or turbostratic graphite, as show in FIG. 26(d). The structure of these nanowires is substantially, free from any kind of defects, such as dislocations and stacking faults. An electron diffraction pattern from a nanowire is shown in FIG. 28(c), which exhibits hexagonal structure. The appearance of the extinction diffraction spots such as (0 0 0 2n+1) (n is an integer) is due to a double diffraction effect. For example, the (0001) diffraction spots [between (0002) and the central spot] are results of the double diffraction of (10$\bar{1}$0) and ($\bar{1}$011). The streaks along the (10$\bar{1}$0) diffraction spot series are caused by the shape effect of the nanowires.

ZnO nanowires have a weak UV photo luminescence (PL) peak at 380 nm and a strong green band peak at 520 nm depending upon the processing conditions. It is shown that the deep-band green light emission is due to the radiative recombination of the photogenerated holes with electrons belonging to the oxygen vacancy of the surface.

High surface area of the graphite flakes is the key for the large quantity growth of ZnO nanowires, although the hexagonal structure of graphite also played a role since both the graphite foils and other nano powders such as $Al_2O_3$ did not yield similar quantities. Graphite flakes can be extended to grow many other nanowires in large quantity such as $In_2O_3$, $Ga_2O_3$, $SnO_2$ and CdO.

Figure 20A:
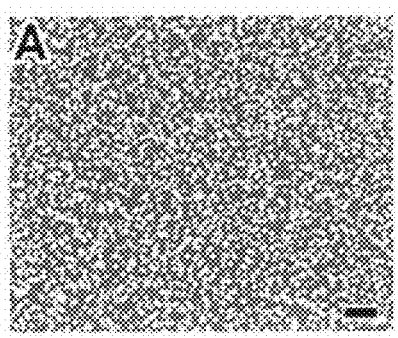
FIG. 20(a) shows a low magnification view of the aligned ZnO nanowires on a-plane sapphire single crystal substrate.
Figure 20B:
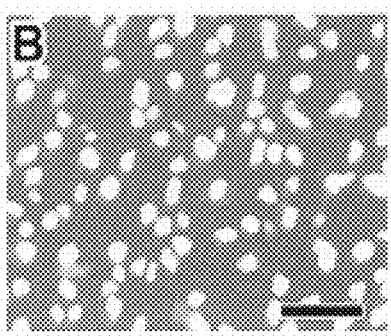
FIG. 20(b) shows a medium magnification view and FIG. 20(c) shows a tilted view (Scale bar for FIG. 20(a) is 1 μm; Scale bars for FIGS. 20(b) and 20(c) is 500 nm).
Figure 20C:
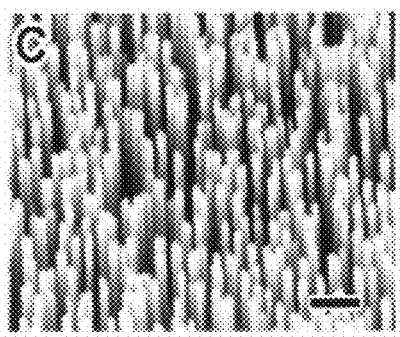

FIG. 20(A) shows the SEM image of large array of the aligned ZnO nanorods and FIG. 20(b) shows the top view at medium magnification. In FIG. 20(b), only the head of the nanorod are visible. The nanorods are in diameter of about 50-120 nm and length of several hundred nanometers to a few microns. FIG. 20(c) shows the tilted view of the aligned ZnO nanorods. The XRD and PL characteristics of the aligned ZnO nanorods are similar to those of nanowalls.

Figure 21A:
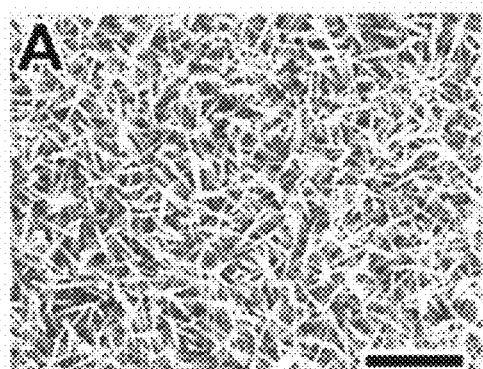
Figure 21B:
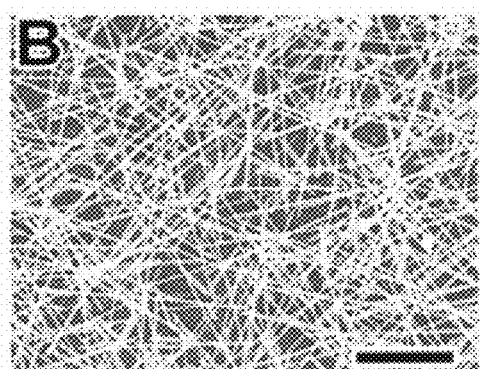
Figure 23A:
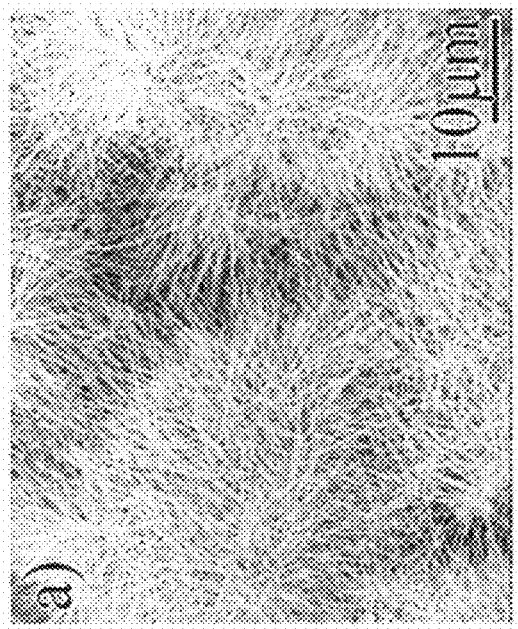
FIGS. 23(a), (b), and (c) show nanowires of length about 5-10 µm and diameter about 20-50 nm in different magnifications, respectively, FIGS. 22(d), (e), and (f) show nanorods of length about 0.5-5 µm and diameter about 60-100 nm in different magnifications, respectively.
Figure 23B:
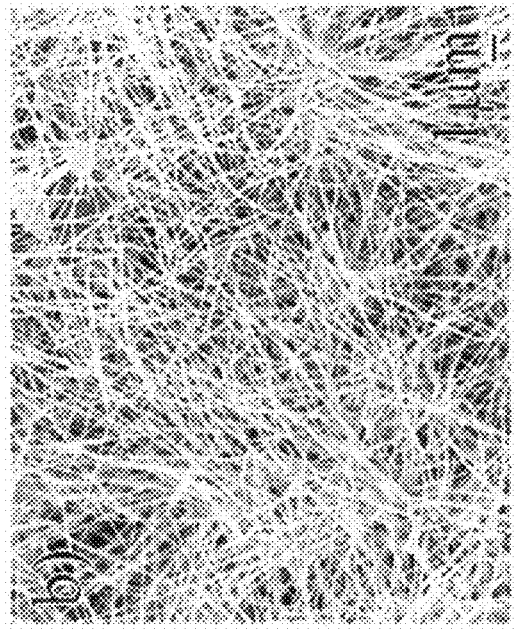
FIG. 23 shows SEM images illustrating morphologies of the large quantity ZnO nanostructures grown on fine graphite flakes.
FIG. 23(c) shows the sharpened tips of the nanorods after oxidation.

FIG. 21 shows the randomly oriented ZnO nanowire thin films with various areal density, which are obtained by controlling the density of 3 nm Au nanoparticle seeds dispersed on the Si substrate from solution. FIG. 21(a) shows the ZnO nanowire thin film on the silicon substrate from the continuous Au film, and FIGS. 21(B-D) show the corresponding ZnO nanowire thin films generated from the Au nanoparticles with areal densities on the Si substrate of $5.6 \times 10^6$, $1.2 \times 10^6$, and $0.4 \times 10^6/cm^2$, respectively. The ZnO nanowires from the continuous Au film have a diameter of about 100 nm on average, and tend to grow perpendicularly to the Si substrate surface. The ZnO nanowires grown from the 3 nm Au nanoparticles have an average diameter of about 60 nm and a length of about 5-20 μm. The measured current densities as a function of the macroscopic electric field are shown in FIG. 21(f). The horizontal line inside the panel corresponds to the current density of about 1 mA/cm$^2$, and the values of electric field required to obtain this current density are 18.77, 18.50, 15.57, 14.96, 12.92, 11.43, 10.16, and 6.46 V/μm for samples A to H, respectively.

Figure 22B:
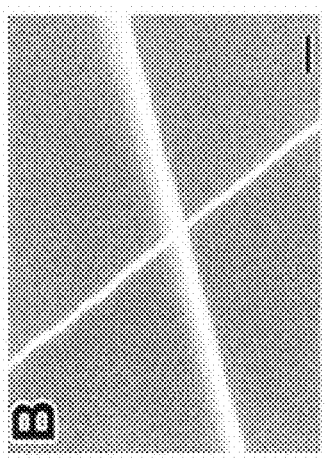
FIG. 22(b) shows a high magnification view of small ZnO nanowires.
Figure 22A:
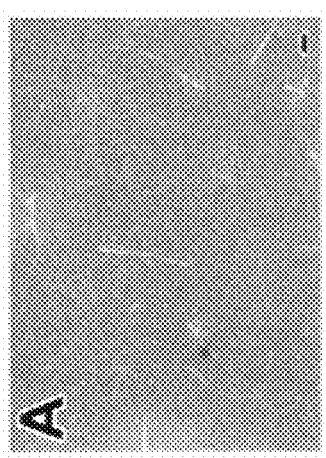
FIG. 22(a) shows a low magnification view of the small ZnO nanowires.
Figure 22C:
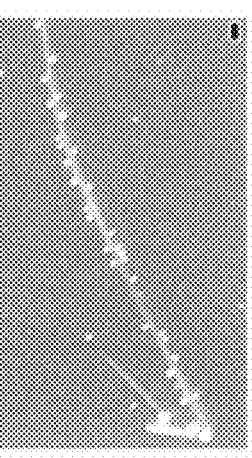
FIG. 22(c) shows aggregated Au nanoparticles (Scale bar for FIG. 22(a) is 1 µm; the Scale bar for FIGS. 22(b) and 22(c) is 100 nm).
Figure 23C:
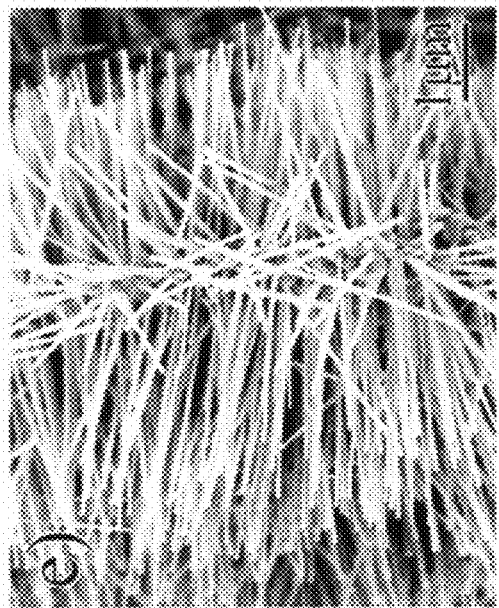
Figure 23D:
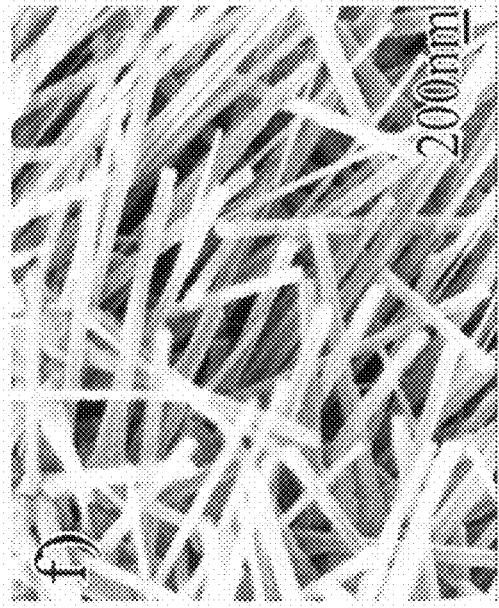
Figure 23E:
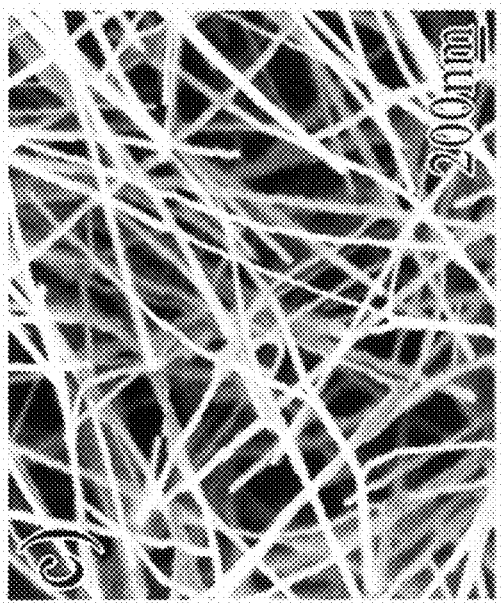
Figure 23F:
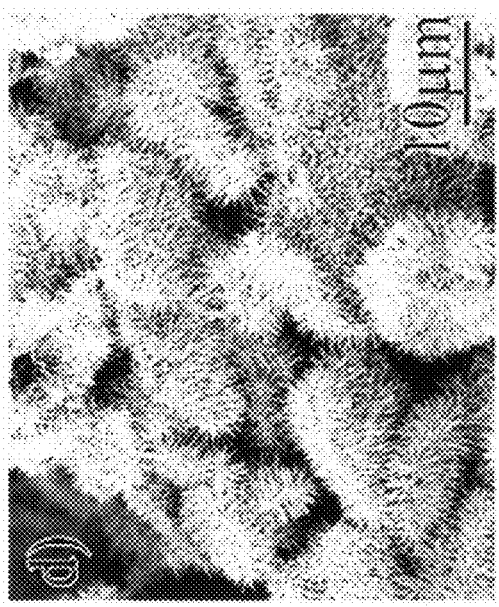

To obtain large amount of small ZnO nanowires for electronic applications and fundamental physics studies, small 3 nm Au nanoparticles are used as the catalyst. FIG. 22(a) shows small ZnO nanowire obtained on Si surface. Typically, nanowires have a diameter of about 10-20 nm and length of several microns. FIG. 22(b) is the high magnification view of such nanowires. Larger nanowires are also visible. The formation of these larger nanowires is due to aggregation of Au nanoparticles. FIG. 22(c) shows the aggregated Au nanoparticles and ZnO nanowires nucleated from these nanoparticles. The Au nanoparticles also aggregated on the side of the nanowire.

In yet another aspect, the invention provides $In_2O_3$ nanocrytal circuits. In one embodiment of the invention, $In_2O_3$ nanocrystal chain and nanowire network circuits are synthesized on $SiO_2$/Si substrates.

The $In_2O_3$ nanostructures are synthesized by a vapor transport and condensation. A thin layer of gold is coated on the native $SiO_2$ covered Si ($SiO_2$/Si) substrates as catalyst except mentioned. A mixture of $In_2O_3$ powder and graphite powder is used as source and put into the sealed end of a small quartz tube. A $SiO_2$/Si substrate coated with about 1-3 nm of Au thin film is put close to the open end of the small quartz tube to collect the $In_2O_3$ nanostructures. The open end of the quartz tube is then loosely sealed. The whole assembly is then put into a quartz tube furnace, pumped, heated to about 1000-1030° C., and held for about 15-30 min. The air pressure inside the tube during growth is controlled by a gauge valve. The substrate temperature is controlled by its distance from the furnace center due to the thermal gradient. When the substrate temperature is at about 875°-950° C. and the pressure is at about 0.1 to 1.0 Torr, $In_2O_3$ nanostructures grow on the $SiO_2$/Si substrate. The morphology and microstructures of the $In_2O_3$ nanostructures on the $SiO_2$/Si substrates are examined by JEOL 6340F field emission scanning electron microscopy (SEM), JEOL 2010F field emission transmission electron microscopy (TEM) and Bruker-AXS x-ray diffractometer (D8 GADDS).

Figure 29A:
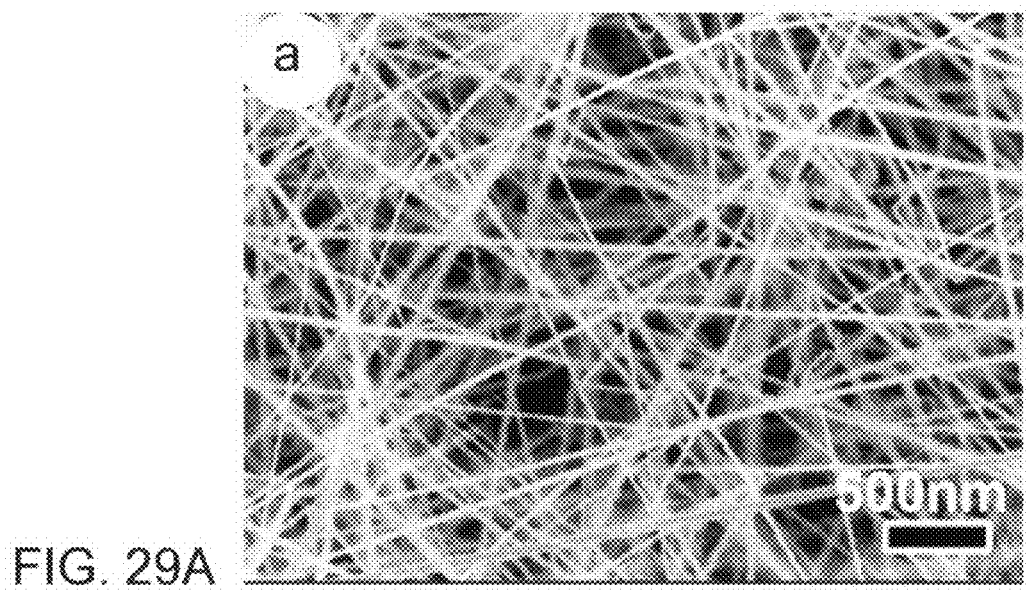
FIG. 29(a) shows a medium magnification SEM image of the nanowires.
Figure 29B:
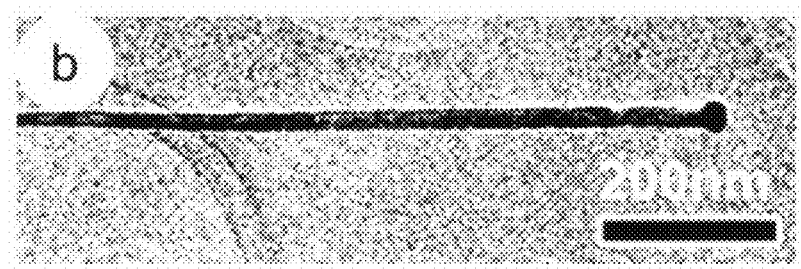
FIG. 29(b) shows a TEM image of the nanowire, and FIG. 29(c) HRTEM image showing the nanowire with an Au catalyst on the tip.
Figure 29C:
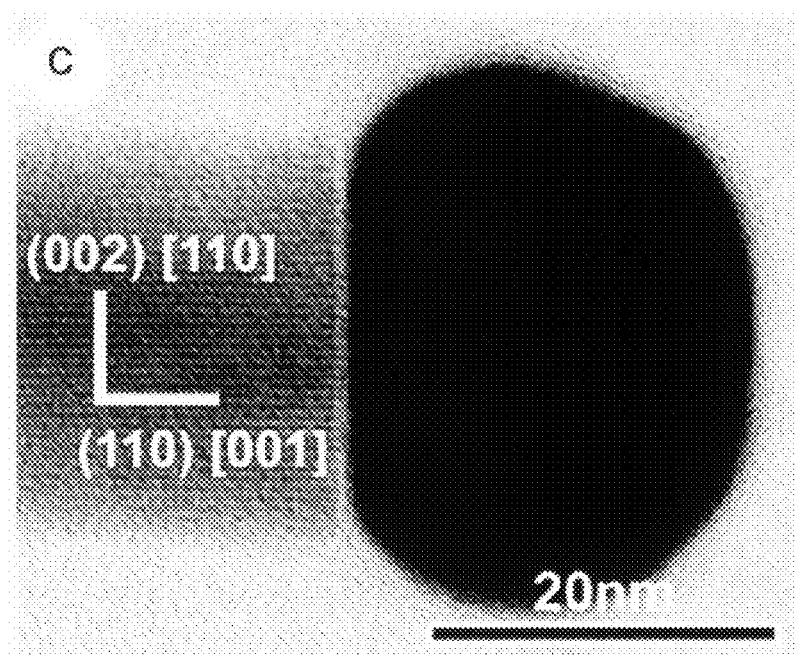
FIG. 29 shows SEM and TEM microscopic images of the $In_2O_3$ nanowires.

The obtained $In_2O_3$ nanostructures are greatly influenced by the air pressure in the growth zone and indium (and/or indium sub-oxide) vapor pressure when air is introduced. In a tight system (no air inlet) with continuous pumping, an increase of pressure is observed from about 0.05 Torr to a peak of about 0.13 Torr because of the generation of In vapor followed by a decline due to the exhaust of the $In_2O_3$ source. Without air inlet, only indium metal and indium suboxide crystals and films are obtained on the $SiO_2$/Si substrates. $In_2O_3$ nanowires can be obtained with air introduced and a pressure of 1.0 Torr maintained from the beginning of heating. FIG. 29(a) shows the SEM images of the $In_2O_3$ nanowires on the $SiO_2$/Si substrate usually obtained at the lower temperature end of the substrate. Larger cubic $In_2O_3$ whiskers are found at the higher temperature end. The $In_2O_3$ nanowires have a diameter ranging from about 15 to 60 nm and length of tens of micrometers. These nanowires typically have a body-centered cubic structure. FIGS. 29(b) and 29(b) shows a TEM image and a high-resolution TEM (HRTEM) image of a nanowire. The nanowire has a growth direction of [001] and the Au particle serving as catalyst is visible on the tip of the nanowire.

Figure 30A:
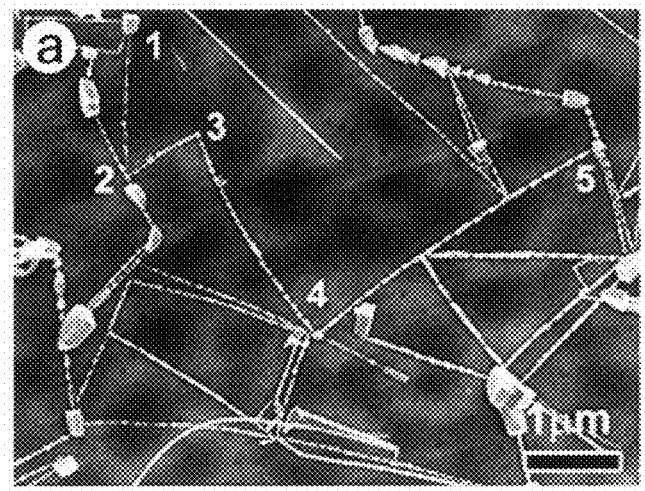
FIG. 30(a) shows a SEM image illustrating the nanocrystal chain circuits.
Figure 30B:
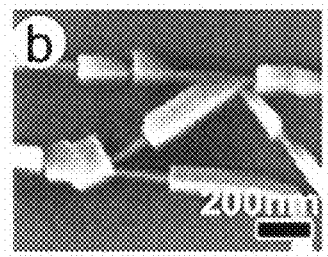
FIG. 30(b) shows a SEM image illustrating the circuit junctions.
Figure 30C:
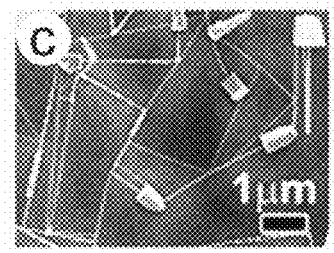
FIG. 30(c) shows a SEM image illustrating the nanowire and nanocrystal circuits.
Figure 30D:
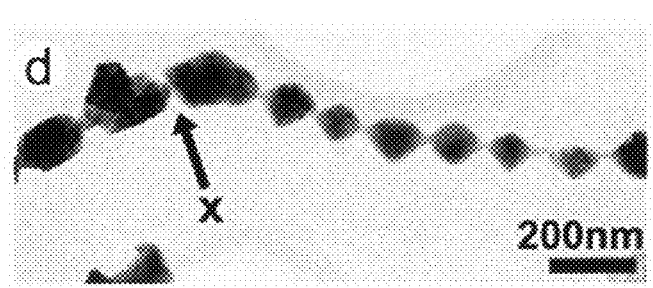
FIG. 30(d) shows a TEM bright field image of part of a nanocrystal chain.
Figure 30E:
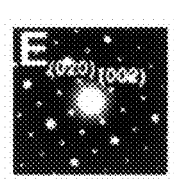
FIG. 30(e) shows a SAD pattern corresponding to the nanocrystal on the left of point X and FIG. 30(f) shows a SAD pattern corresponding to the nanocrystal on the right of point X.
Figure 30F:
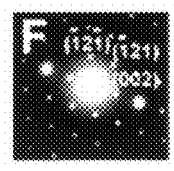
Figure 30G:
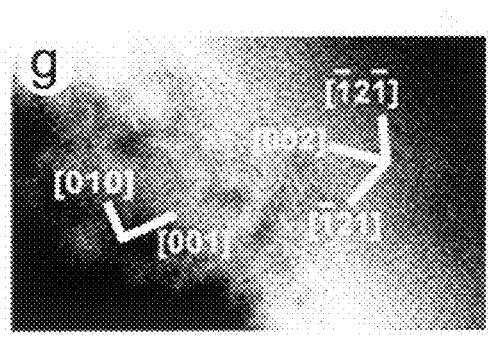
FIG. 30(g) shows a HRTEM showing the domain boundary at point X.
Figure 31A:
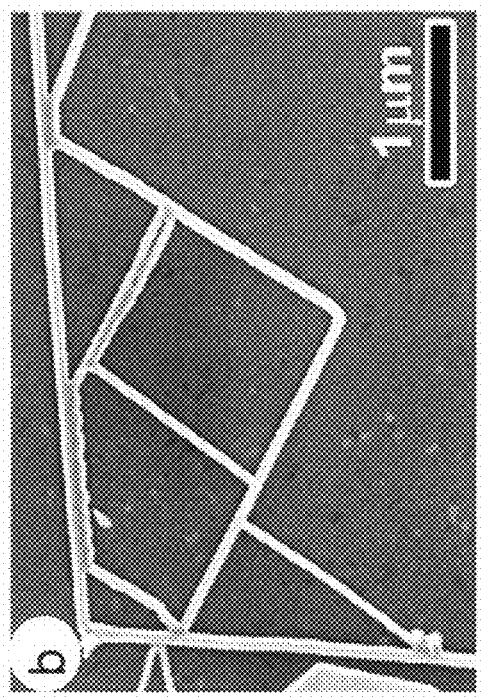
FIG. 31(a) shows a low magnification SEM image illustrating the circuit.
Figure 31B:
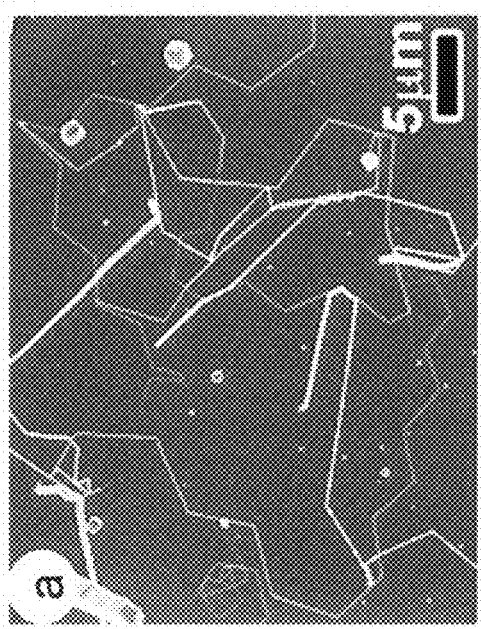
FIG. 31(b) shows a medium SEM image illustrating the junctions.
Figure 31E:
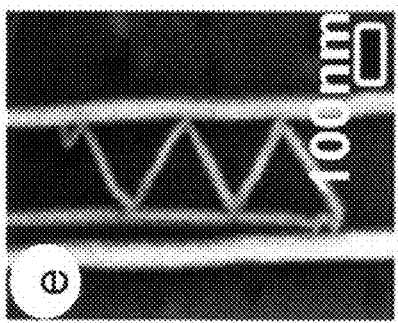
FIG. 31(e) shows a high magnification SEM image illustrating the zigzag growth direction of a nanowire confined between the two parallel nanowires.
Figure 31D:
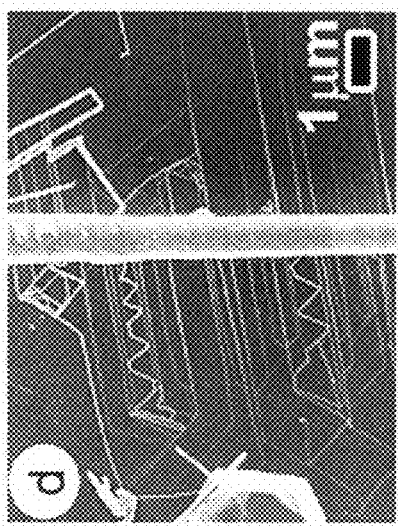
FIG. 31(d) shows a SEM image illustrating the parallel nanowires from a big nanofiber. Nanowires with zigzag growth direction are observed.
Figure 31C:
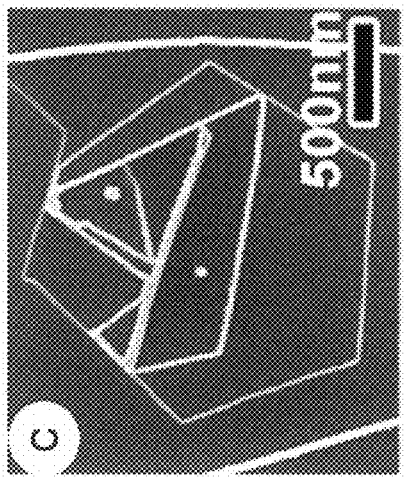
FIG. 31(c) shows a hexagonally shaped circuit.
Figure 33:
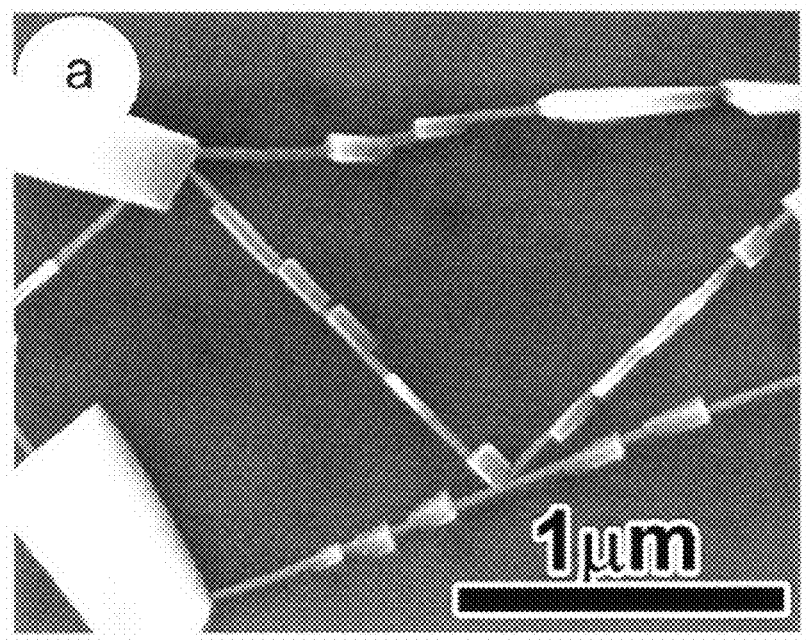
FIG. 33 shows SEM images showing the variety of $In_2O_3$ nanocrystal networks. The nanocrystal chains have preferred starting and termination directions on the big crystal.
Figure 33:
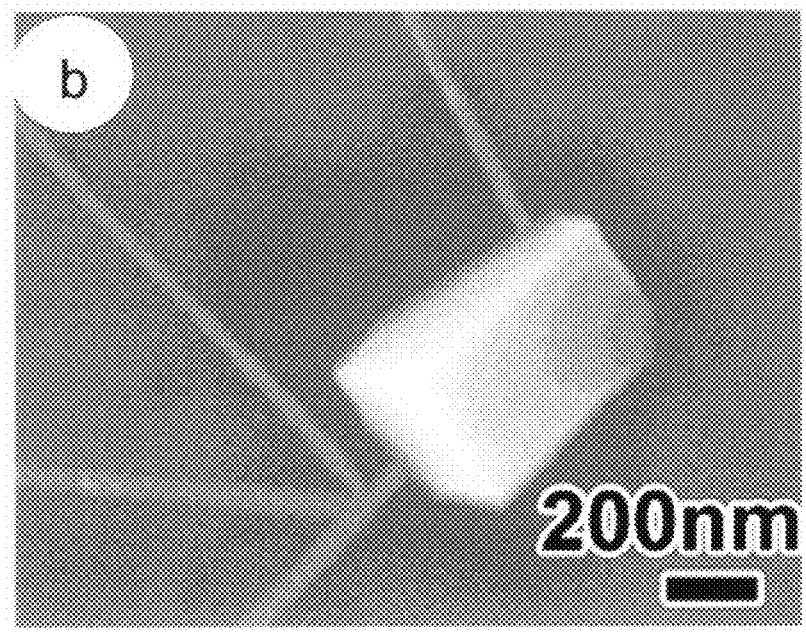
Figure 34A:
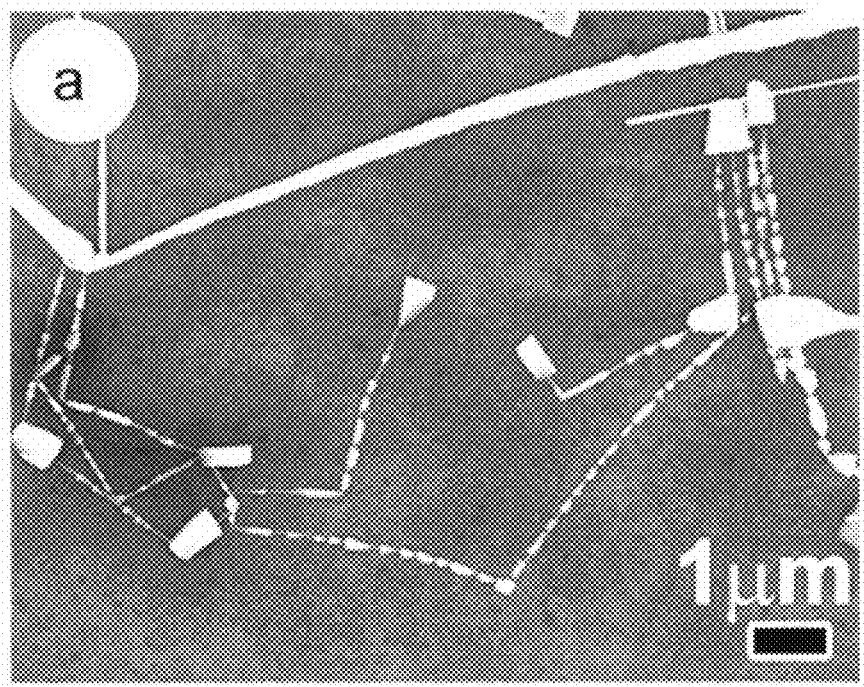
FIG. 34(a) shows the solid connection between the nanocrystal chain and the big crystal and FIG. 34(b) shows the solid connection between the nanowire and big crystal.
Figure 34B:
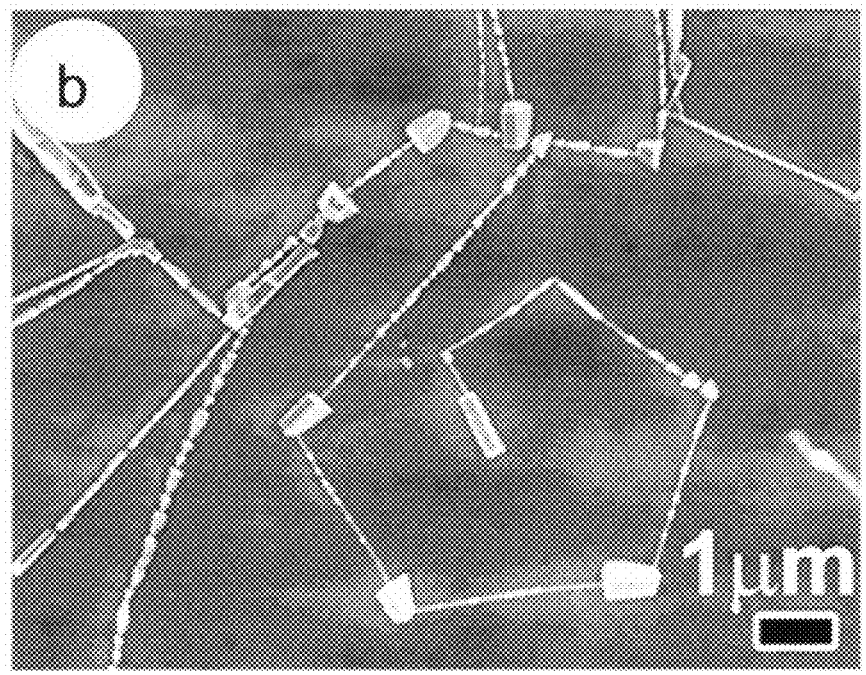

Various nanostructures are obtained if air is introduced at the time when the In vapor pressure already declined from the peak of about 0.13 to about 0.06 Torr. Self-assembled $In_2O_3$ nanocrystal chains and nanowire circuits are obtained by introducing 1.0 Torr air pressure low In vapor pressure (about 0.06 Torr). FIG. 30(a) shows the self-assembled $In_2O_3$ nanocrystal chains and circuits. Typically, the nanocrystal chains have diameters ranging from about 20 to about 100 nm and length of a few micrometers. The nanocrystal chains are connected together as a circuit network. The network junctions can be either the nanocrystals, or the bigger crystals. The big crystals show the cubic facet. Most of the big crystals are part of the network and can be used as the contact lead for the nanoelectronic circuits. Some of the big crystals are the growth starting point of the chains, and some of the crystals are formed as part of the chains during growth. FIG. 30(b) shows the high magnification SEM image illustrating the solid connection between nanocrystal chains. FIG. 30(c) shows the area with the circuits mainly made of the nanowires, instead of nanocrystal chains. The nanostructures grown by vapor-liquid-solid (VLS) mechanism typically have a constant diameter or periodically changed diameter along the growth direction and are not composed by nanocrystals with different sizes. Au catalyst is necessary for the formation of the circuits by the experiment. For one-dimensional (ID) nanostructure growth, VS mechanism requires higher indium vapor pressure than VLS mechanism. The nanowire/nanocrystal chains have preferred starting and termination directions on the big crystal as shown in the FIG. 33. FIG. 30(d) shows the TEM image of part of a nanocrystal chain. The chain is formed by interconnecting individual nanocrystals with a growth direction of [001] in which the nanocrystals are epitaxial with each other. The chain can change geometric direction when it meets with an obstacle. The change of the chain's geometric direction caused by changing of crystal orientation, not by meeting an obstacle. A turning point, X, is indicated by an arrow in FIG. 30(d). The nanocrystals on the right of point X are orientated at [210], but those on the left are [100] orientated. Electron diffraction patterns from right and left of point X are shown in FIGS. 30(e) and 30(f), respectively. The chain crystal growth direction remains unchanged, that is, it is continues along the [001] direction. FIG. 30(g) is a HRTEM image taken from point X, the domain boundary and change of lattice orientation can be clearly seen between two nanocrystals.

FIG. 31 shows the nanowire circuits where not many big crystals exist when about 0.3 Torr of air is introduced at the low In vapor pressure of 0.06 torr. FIG. 3(a) shows the low magnification SEM image of such circuits. These nanowires having diameter of about 20 to about 100 nm and a length of tens of micrometers grow with a zigzag direction. FIG. 31(b) shows the nanowire junctions. After running into another nanowire, the nanowire changes directions and continued the growth. In some cases, the two nanowires almost melt together and separate after a short distance. FIG. 31(c) shows a hexagonally shaped nanowire circuits with nanowires growing inside the hexagon. FIG. 31(d) shows several small nanowires growing along the side of an $In_2O_3$ large fiber. These nanowires are parallel to each other at the beginning and change the growth direction after certain length. Small particles are visible at the tip of several nanowires. Therefore, these small nanowires are nucleated by the aggregated mobile Au nanoparticles at the side of the large fiber. Due to the epitaxy relation, the small nanowires are substantially perpendicular to the large fiber at the starting point. FIG. 31(e) shows a small zigzag nanowire confined between two nanowires. The nanowire bounces back and forth between the two nanowires, which means that the precipitation direction of nanowire from the Au-In alloy is forced to change when the nanowire tip meets with another nanowire.

Figure 4A:
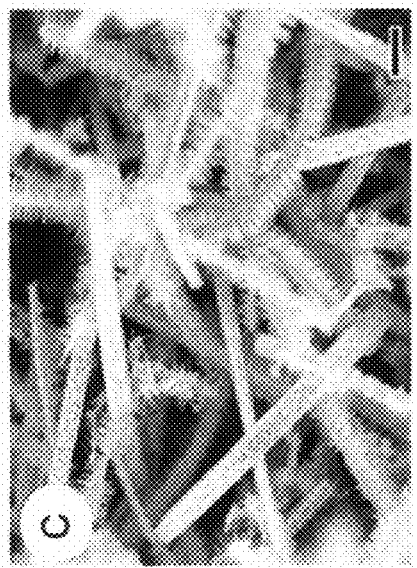
FIG. 4(a) shows a medium SEM image to illustrate the abundance of the 2S-fold symmetry.
Figure 4B:
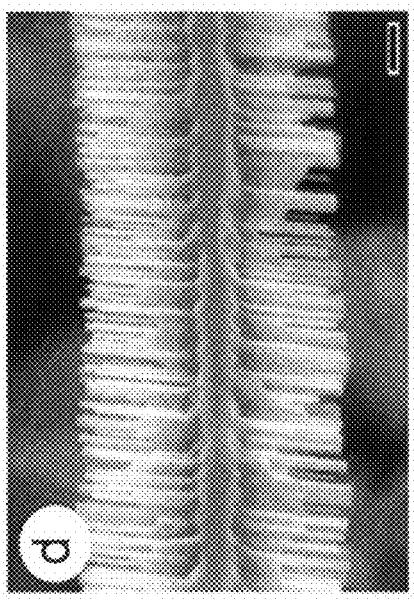
FIG. 4(b) shows a high magnification of a 2S-fold symmetry.
Figure 4C:
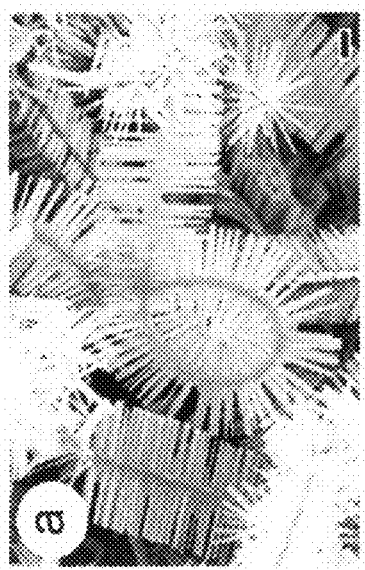
FIG. 4(c) shows a low magnification SEM image to illustrate the abundance of a 2M-fold symmetry.
Figure 4D:
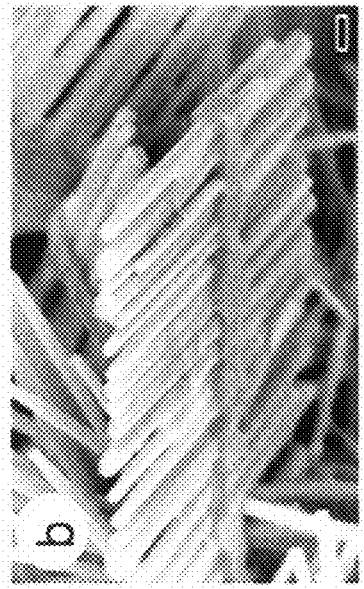
FIG. 4(d) shows a high magnification SEM image of 2M-fold symmetry.
Figure 4E:
FIG. 4(e) shows a low magnification SEM image to illustrate the abundance of the 2S*-fold symmetry.
Figure 4F:
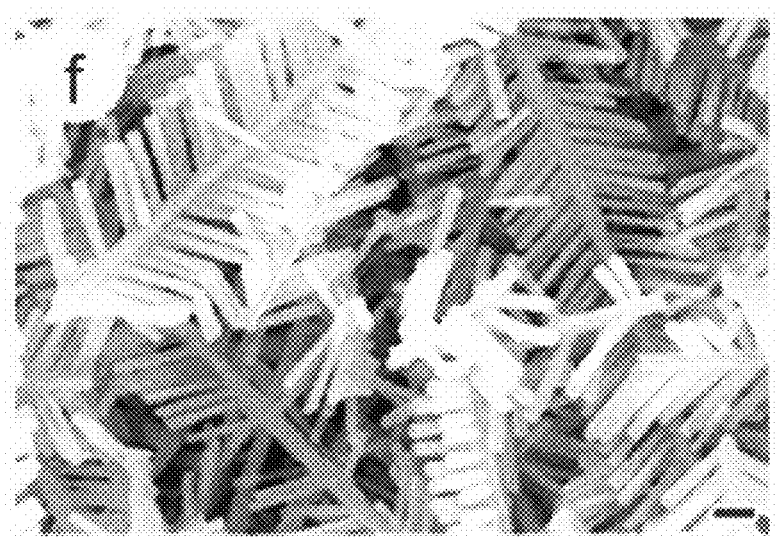
FIG. 4(f) shows a high magnification SEM image of a 2S*-fold symmetry. The scale bar for FIGS. 4(a), (c) and (e) is 1 μm (The scale bar for FIGS. 4(b), (d) and (f) is 200 nm).
Figure 5A:
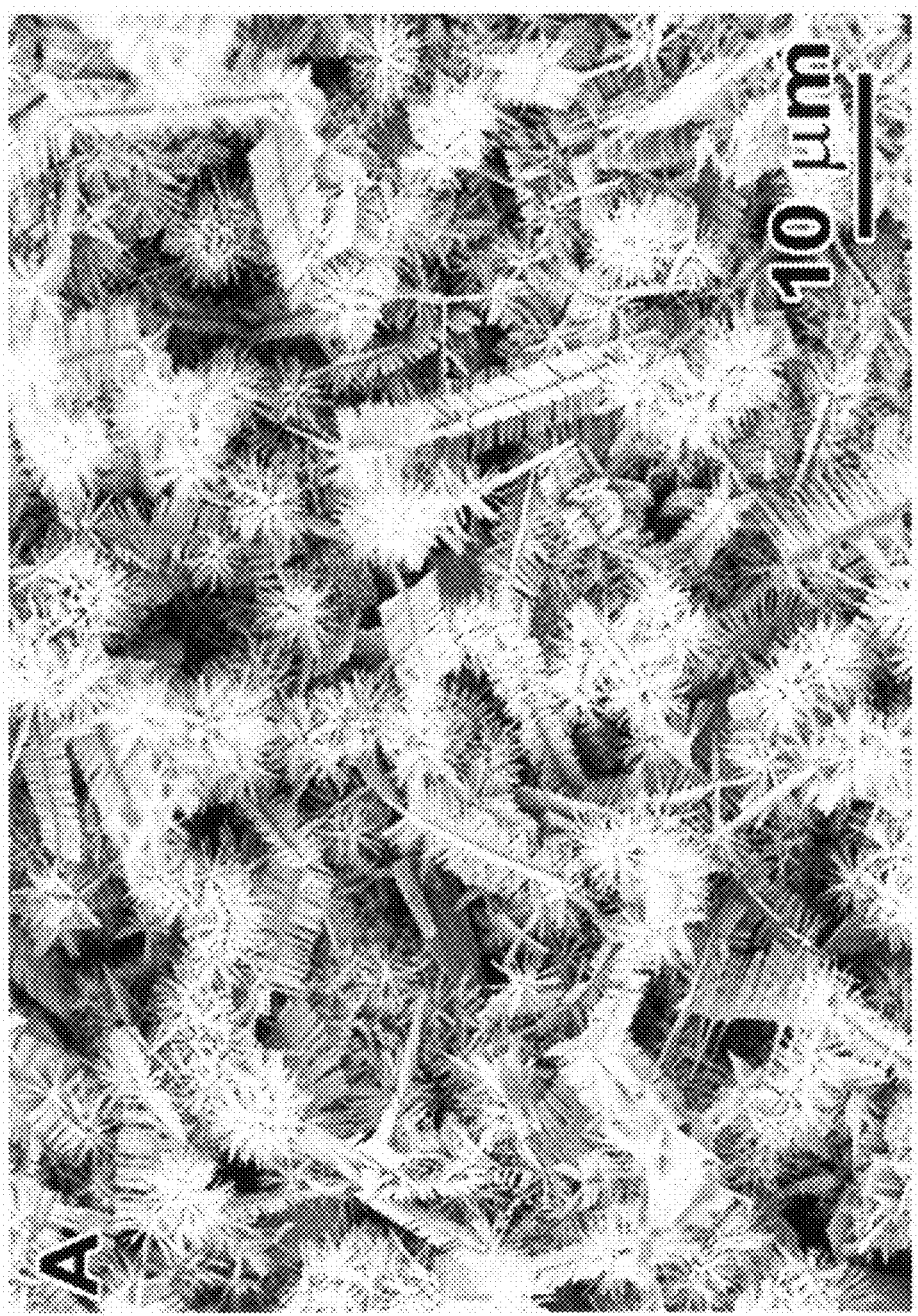
FIG. 5(a) shows a low magnification SEM image of the ZnO hierarchical nanostructures. Scale bar=10 μm.
Figure 5B:
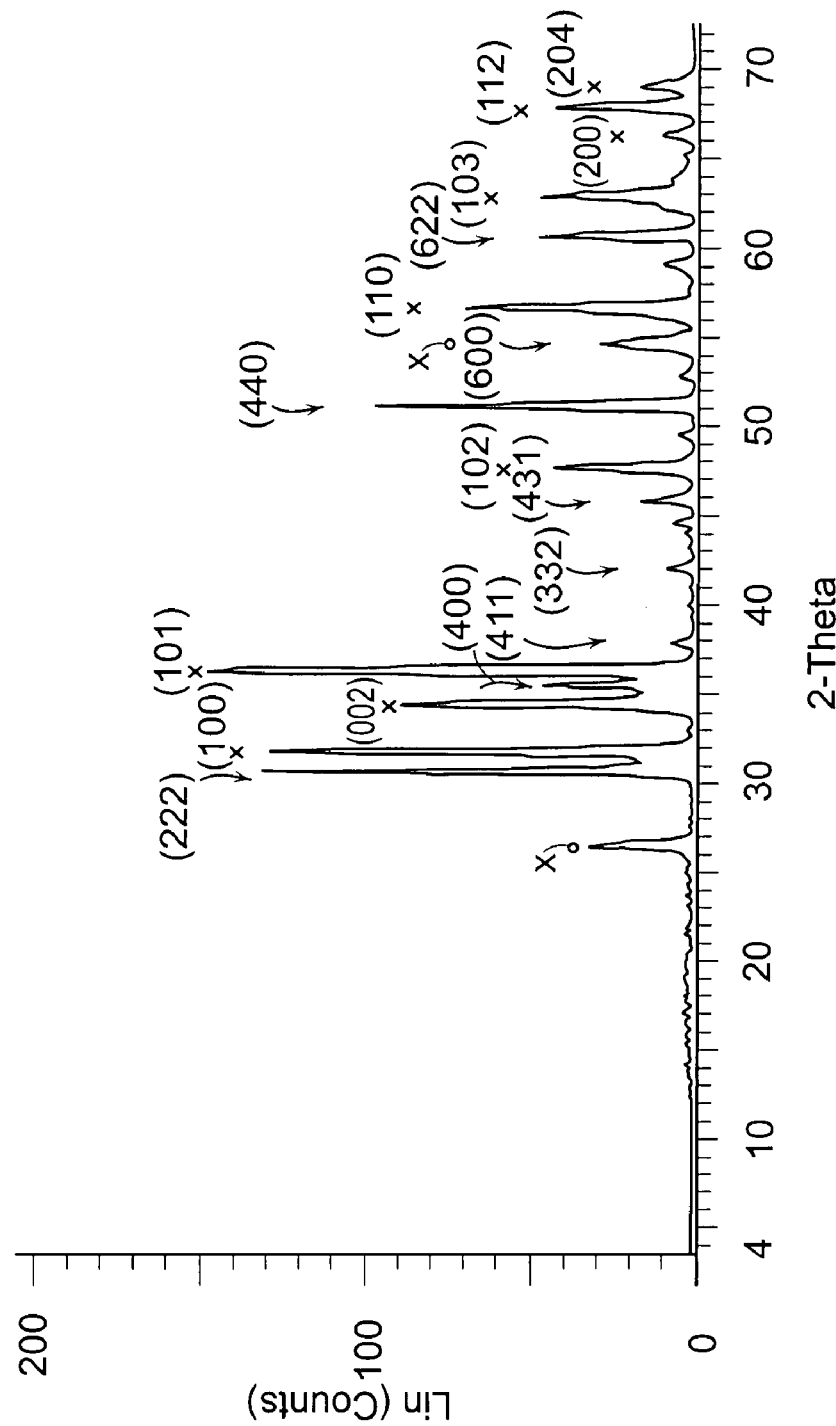
FIG. 5(b) shows a XRD 2-theta scan of the nanobrushes.
Figure 6A:
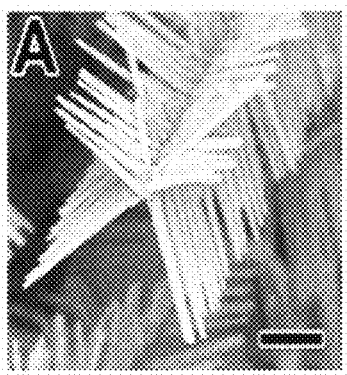
FIG. 6(a) shows a head on view of typical 4-fold ZnO hierarchical structure.
Figure 6B:
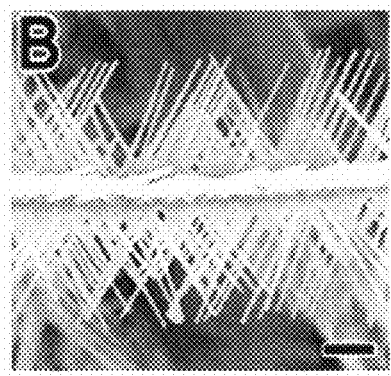
FIG. 6(b) shows a side view of the 4-fold structure with tilted secondary nanorods.
Figure 6C:
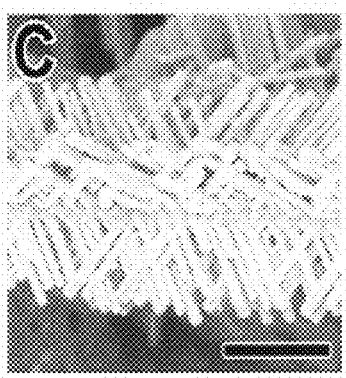
FIG. 6(c) and FIG. 6(D) show a 4-fold structure with multi-row of nanorods on one direction. The scale bar for FIGS. 6(a)-(c) is 1 μm (The scale bar for FIG. 6(D) is 2 μm).
Figure 6D:
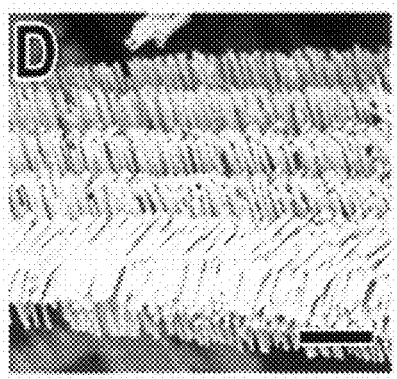
Figure 7A:
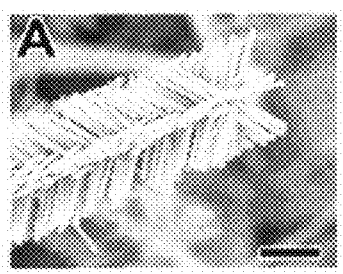
FIG. 7(a) shows one type of 6-fold ZnO hierarchical nanostructure.
Figure 7B:
FIG. 7(b) shows a medium magnification view of another type of 6-fold structure.
Figure 7C:
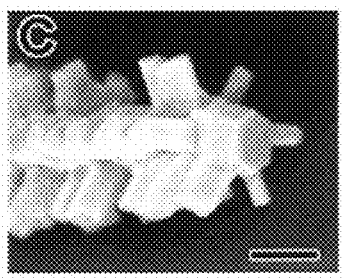
FIG. 7(c) shows a head on view and FIG. 7(d) shows a side of the hierarchical nanostructure. The scale bar for FIG. 7(a)
Figure 7D:
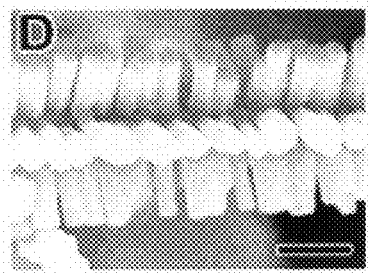
Figure 8A:
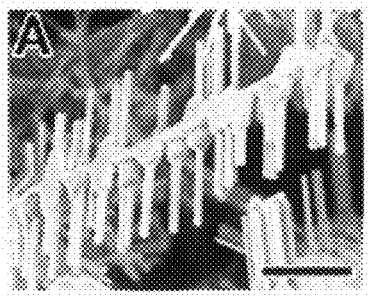
FIG. 8(a) shows a typical 2-fold ZnO hierarchical structure.
Figure 8B:
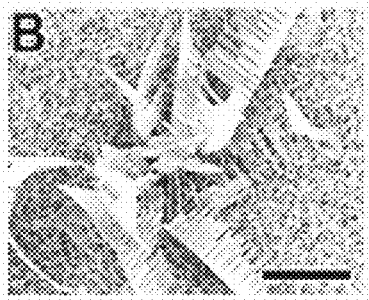
FIG. 8(b) shows a 2-fold structure synthesized from an In-free source.
Figure 8C:
FIG. 8(c) shows a ZnO nanobelt with core.
Figure 8D:
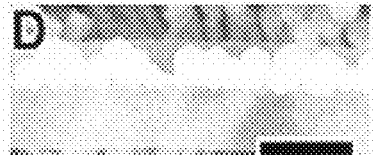
FIG. 8(d) shows a ZnO nanobelt with ZnO secondary nanorods along the core.
Figure 8E:
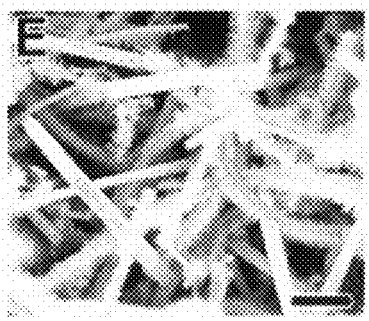
FIGS. 8(e) and (f) show a ZnO nanobelt with secondary nanorods full of the surface (The scale bar for FIG. 8(a) is 1 μm; the scale bar for FIG. 8(b) is 10 μm; the scale bar for FIG. 8(c) is 10 nm; the scale bar for FIG. 8(d) is 1 μm; the scale bar for FIG. 8(e) is 2 μm; the scale bar for FIG. 8(f) is 500 nm).
Figure 8F:
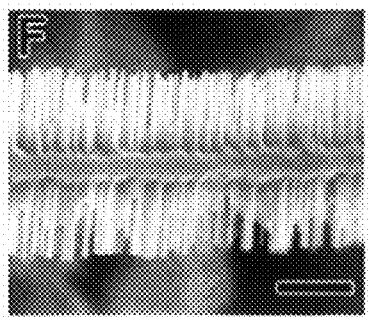
FIG. 8 shows images of various ZnO hierarchical structures.
Figure 9A:
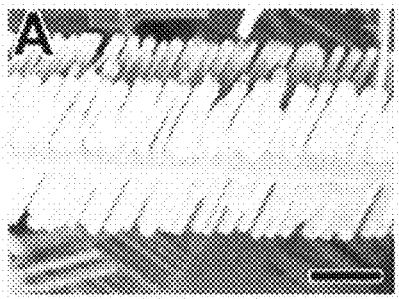
FIG. 9(a) shows a typical ZnO nanobridge structure.
Figure 9B:
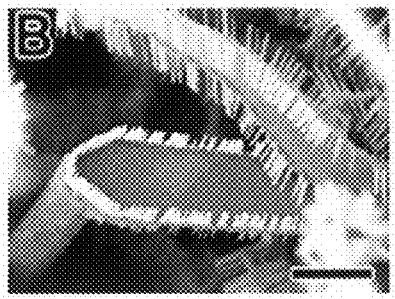
FIG. 9(b), FIG. 9(c) and FIG. 9(d) show a variety of nanobridge structures.
Figure 9C:
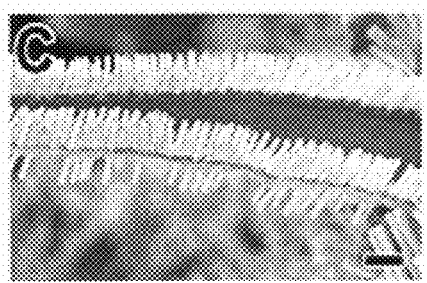
Figure 9D:
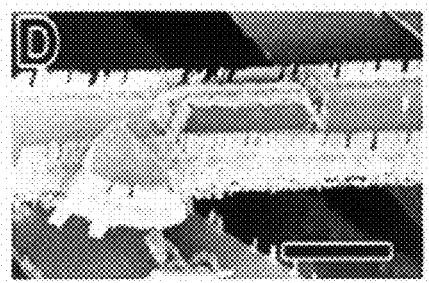
Figure 9E:
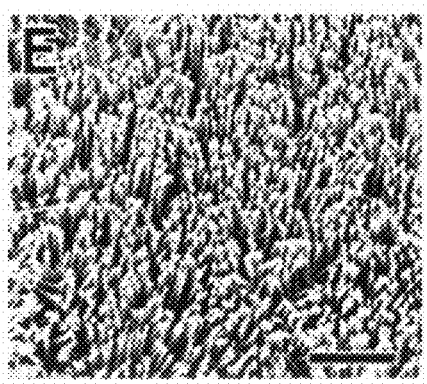
FIG. 9(e) and FIG. 9(f) show ZnO nanonails on a ZnO layer and a nanorod, respectively (The scale bar for FIG. 9(a), FIG. 9(c), and FIG. 9(f) is 1 μm; the scale bar for FIG. 9(b), FIG. 9(d) and FIG. 9(e), is 5 μm).
Figure 9F:
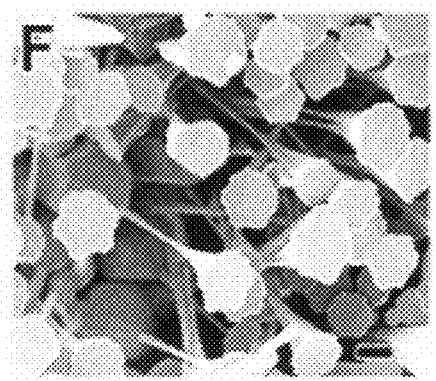
Figure 32A:
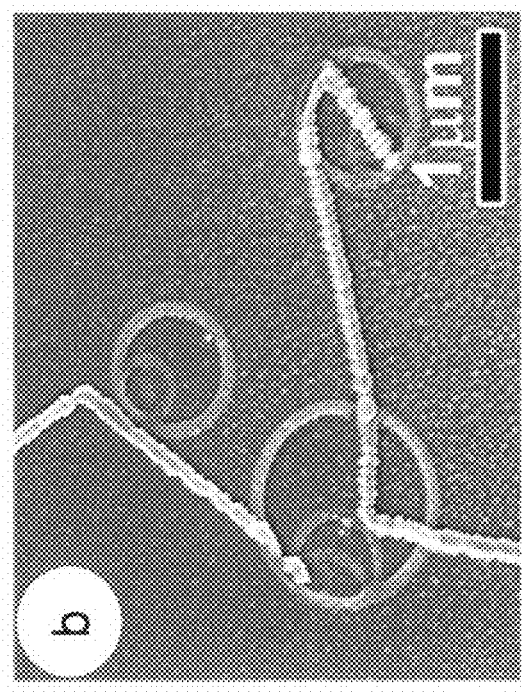
FIG. 32(a) shows a low magnification SEM image. The nanowires are started from the edge of the holes.
Figure 32B:
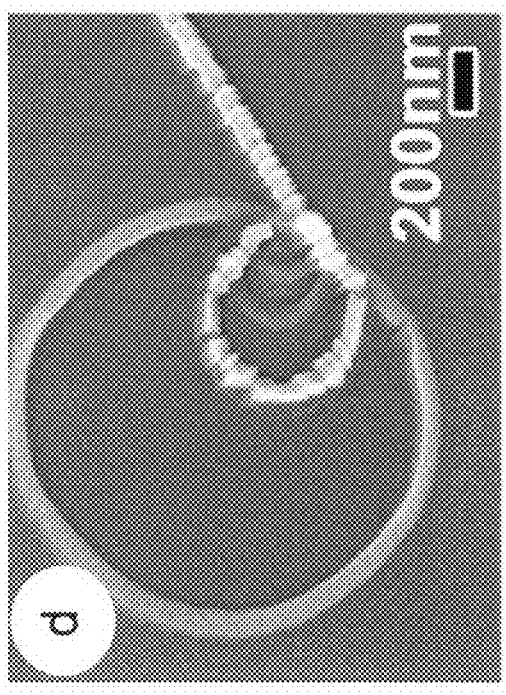
FIG. 32(b) shows a wavy nanowire crossed between two holes.
Figure 32C:
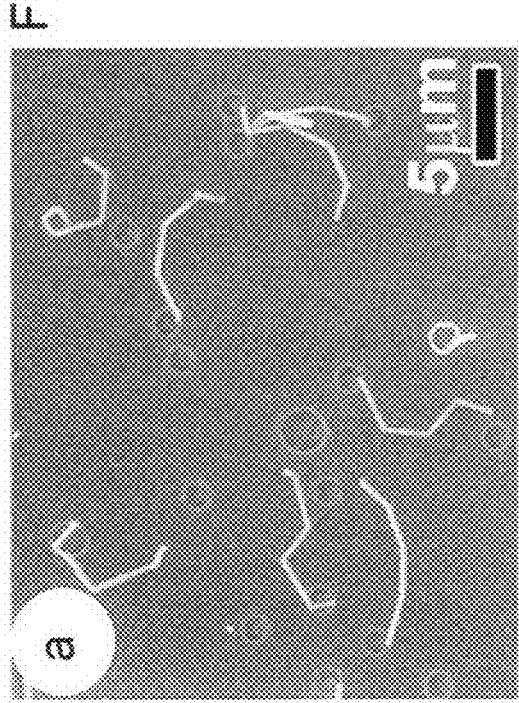
FIG. 32(c) shows a wavy nanowire which changed direction three times in a hole.
Figure 32D:
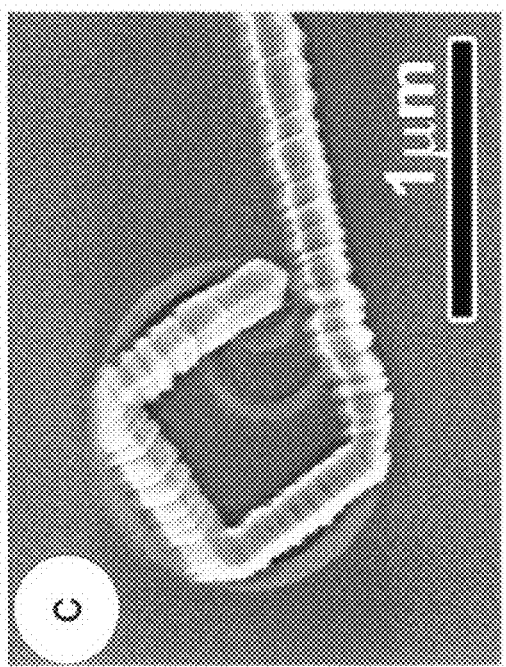
FIG. 32(d) shows a wavy nanowire ring formed along the edge of a hole.

$SiO_2$/Si substrates without Au catalyst layer are also used for the growth at the same condition as that of FIG. 30. Instead of forming nanowire and nanocrystal chain circuits, several $In_2O_3$ microcrystals formed on the substrate. However, a few $In_2O_3$ nanocrystal chains are also observed on areas with $In/In_2O_3$ film formed on the $SiO_2$/Si substrate. FIG. 4A shows wavy nanocrystal chains on the $In/In_2O_3$ film. The nanocrystal chains are nucleated from the edge of the holes in the film. FIG. 32(b) shows one $In_2O_3$ nanocrystal chain growing out of the hole directly. Another chain changes direction after meeting with the hole edge, then grows out of the hole and runs into another hole, then changes the direction after meeting with the edge of the smaller hole, and finally grows out of the hole. FIG. 32(c) shows one nanocrystal chain that changes growth direction three times at the hole edge before growing out of the hole. FIG. 32(d) shows a chain forming into circle confined to the edge of the smaller hole before growing out of the hole.

The force behind for these nanowires and nanocrystal chains' growth is strong so that in most cases the nanowire/nanocrystal chain continues to grow with the direction change after meeting obstacles and even initiated another nanowire/nanocrystal chain growth after the original nanowire/nanocrystal chain merging into the obstacles. In the VS mechanism, it is widely accepted that the deposited molecules on the side of the nanowire will move to the growth front and contributes to the ID nanostructure growth.

The metal oxide nanostructures of the invention can be doped with a metal. In particular, the metal oxide nanostructures of the invention can be p- or n-doped. In one embodiment, the metal oxide nanostructures are doped with tin (Sn)

or germanium (Ge). In another embodiment, the composition of the dopant ranges from about 1 to about 20 atom percent (20% atm). In yet another embodiment, the Sn composition increases from the center to edge of 8% atm.

Figure 28A:
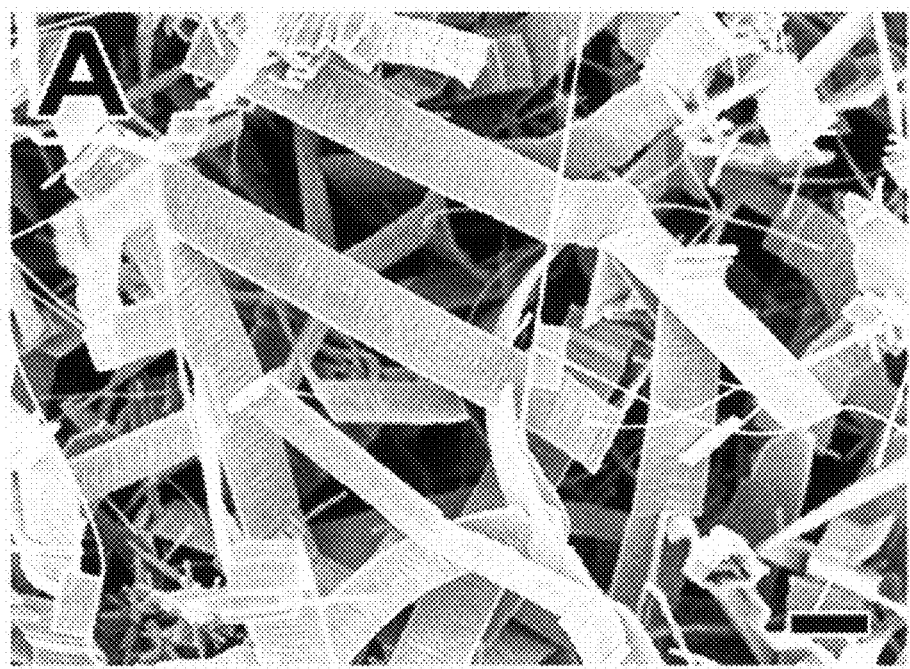
FIG. 28(a) shows a large amount of the Sn-doped ZnO nanobelts.
Figure 28B:
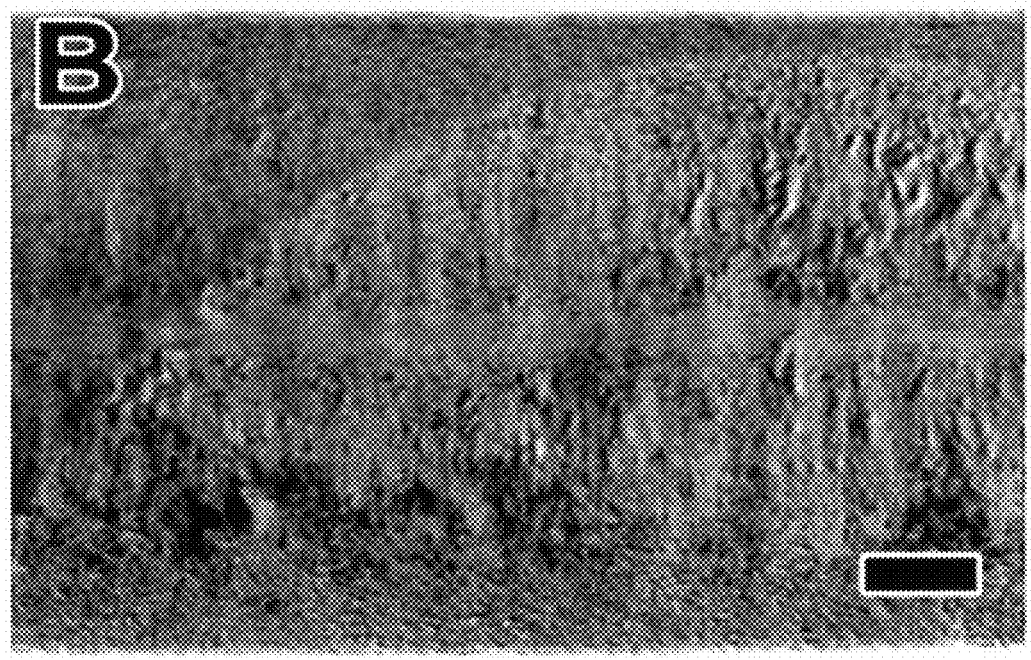
FIG. 28(b) shows a TEM image illustrating the defects. The scale bar for FIG. 28(a) is 1 µm. (The scale bar for FIG. 28(b) is 300 nm).

Sn-doped ZnO nanostructures are successfully synthesized as shown in FIG. 28(a) shows the large amount of such structure. The nanobelt is composed of an array of many parallel nanorods melted together. Probably, every nanorod represents one growth step. Due to the Sn doping, many stacking faults are found on the nanobelt, as shown in FIG. 28(b). The Sn composition increases from the center to edge of 8% atm. The growth direction of the nanobelt is [0$\bar{1}$10].

The present invention also provides a process for the formation of a three-dimensionally periodic nanostructural metal oxide material comprising the steps of: a) crystallizing a first metallic oxideso as to form a thermally stable structure having three-dimensional periodicity; and b) infiltrating said thermally stable structure formed by the first metallic oxide with a second metallic oxide to form a composite structure so as to confer a nanostructural morphology to said composite structure.

In one embodiment, the present invention also the process the formation of a three-dimensionally periodic nanostructural metal oxide material comprises the steps of: a) forming a metal oxide source mixture of a pre-determined ratio comprising at least one metallic oxide; b) placing said metallic oxide source mixture in a reactor cell comprising a closed end and an open end, said open end further comprising a collector; and c) subjecting said reactor cell comprising the metal oxide source mixture contained therein to an elevated temperature under reduced pressure so as to enable formation of crystalline metallic oxide material having three-dimensional periodic nanostructural morphology.

The term "collector" as referred to herein is afforded the meaning typically provided for in the art. In one embodiment, the sample collector is a foil. Currently preferred materials for use as sample collectors include, but are not limited to, graphite, silicon, and LaAlO$_3$ and SrTiO$_3$. In a currently preferred embodiment, the sample collector comprises a graphite foil. A collector is alternatively refered to as a "sample collector".

The term "reactor cell" as referred to herein is afforded the meaning typically provided for in the art. In one embodiment, the reactor cell comprises a tube that is closed at one end and open at the other end. In a presently prefered embodiment, the reactor cell comprises a quartz tube.

The term "heating element" as referred to herein is afforded the meaning typically provided for in the art. In one embodiment the heating element comprises a furnace. In a presently prefered embodiment, the heating element comprises a ceramic tube furnace.

Figure 35:
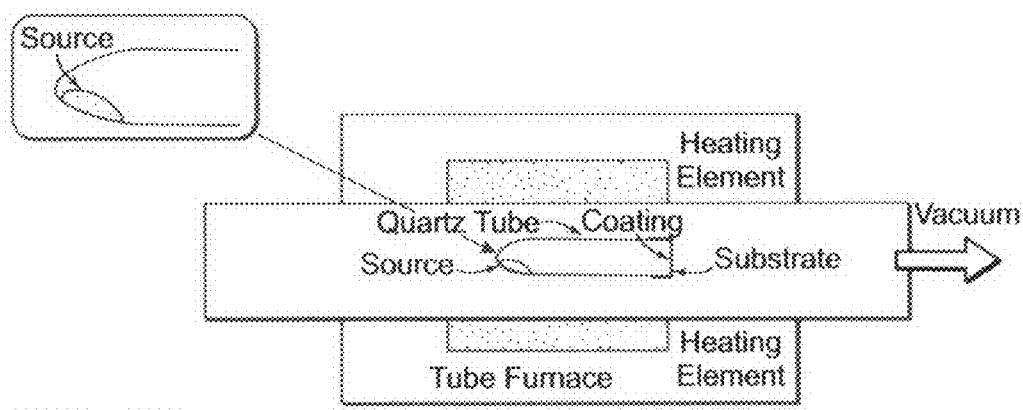
FIG. 35 shows a diagram illustrating an apparatus for thermal vaporization and condensation.
Figure 36A:
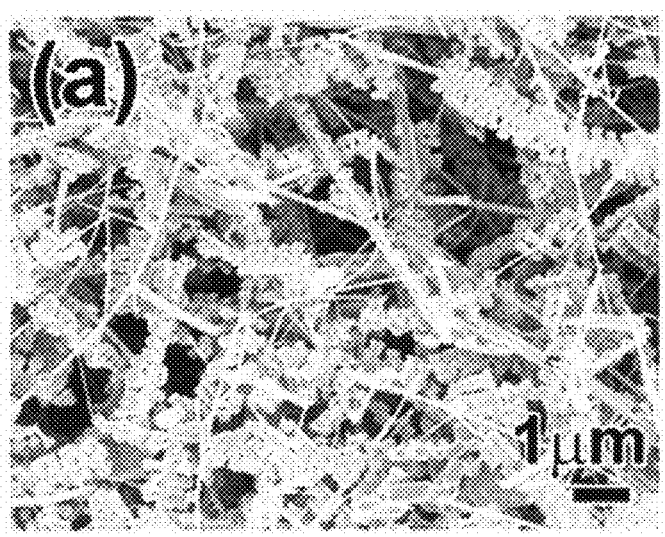
FIG. 36(a) shows a SEM low magnification image and FIG. 36(b) and FIG. 36(c) show high magnification images of a 2-fold nanostructure.
Figure 36B:
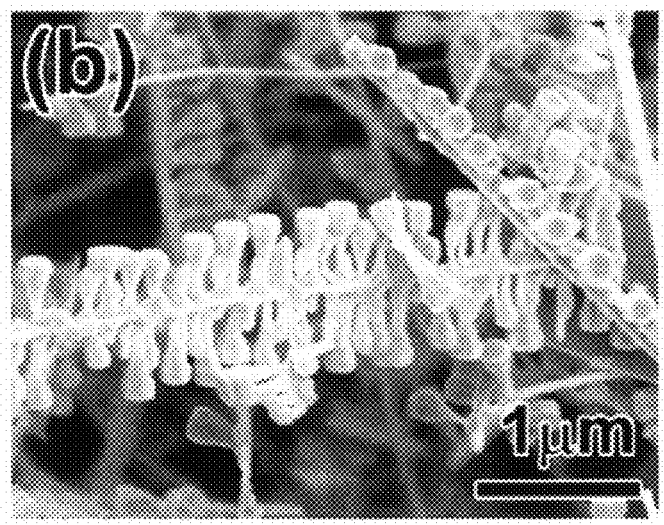
Figure 36C:
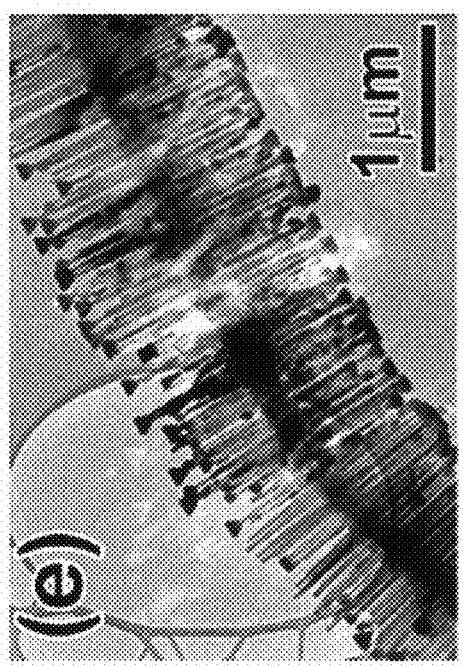
Figure 36E:
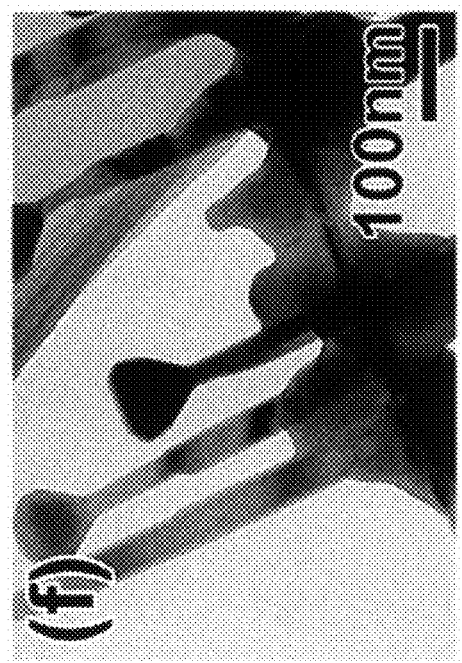
FIG. 36(e) and FIG. 36(f) show la ow magnification and high magnification TEM image of the 2-fold nanostructure. A core contrast is shown in FIG. 36(f).
Figure 36D:
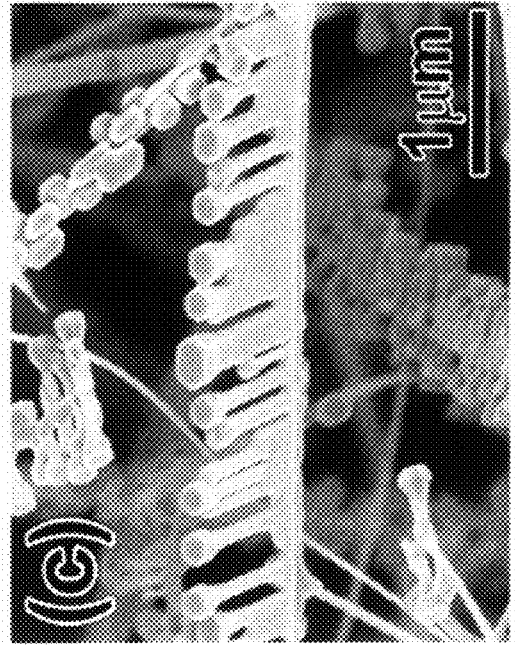
FIG. 36(d) shows a 6-fold nanostructure.
Figure 36F:
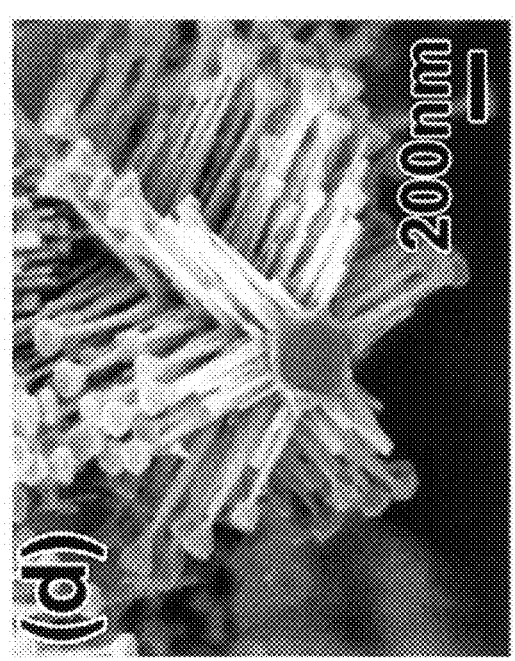
Figure 37A:
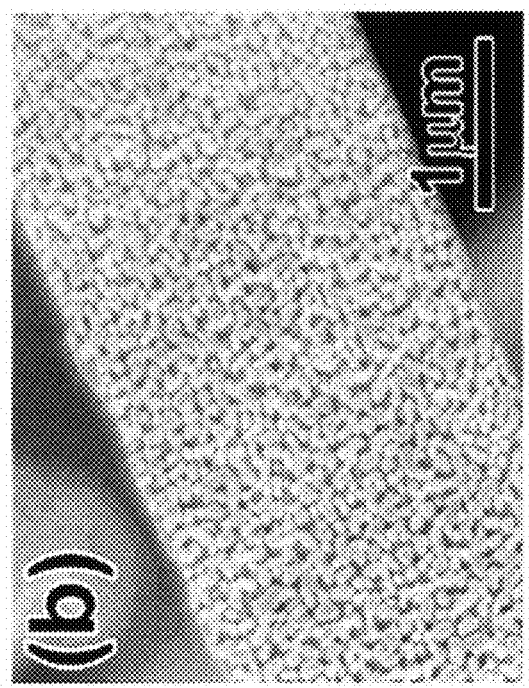
FIG. 37(a) shows a SEM image illustrating the large amount of 2-fold Zn—In—O nanostructures.
Figure 37B:
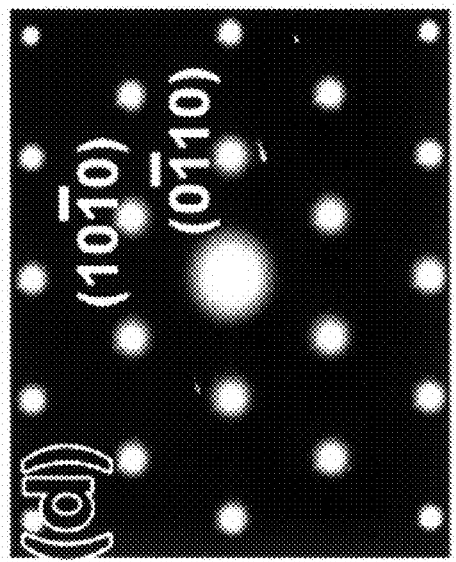
FIG. 37(b) shows a high magnification of 2-fold Zn—In—O nanostructures.
Figure 37C:
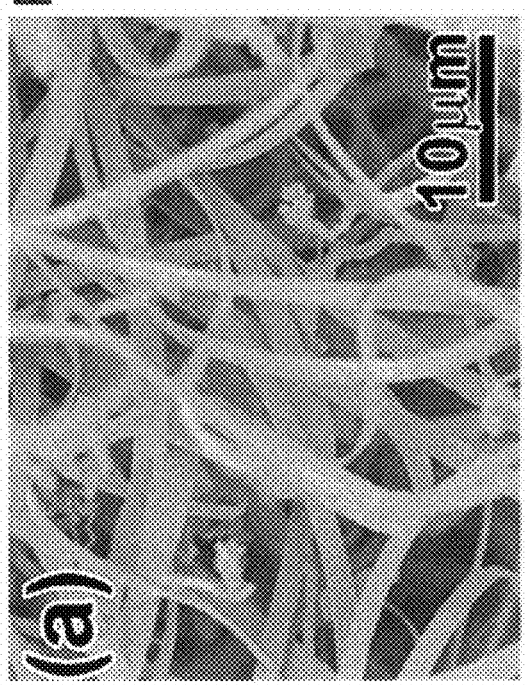
FIG. 37(c) shows a TEM image of 2-fold Zn—In—O nanostructures.
Figure 37D:
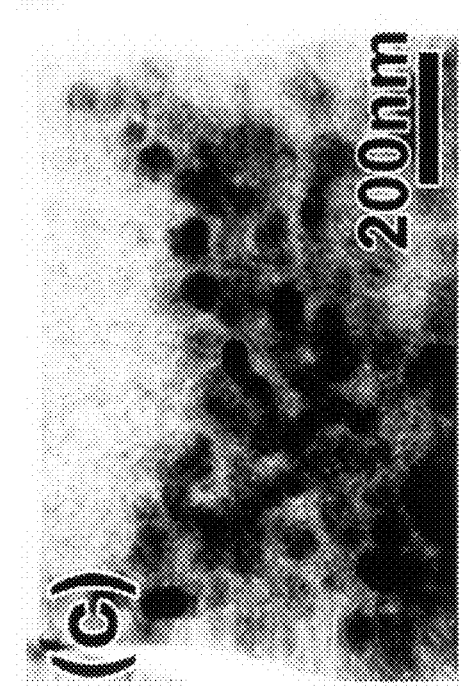
FIG. 37(d) shows an associated diffraction pattern. The zone axis is [0001].
Figure 38A:
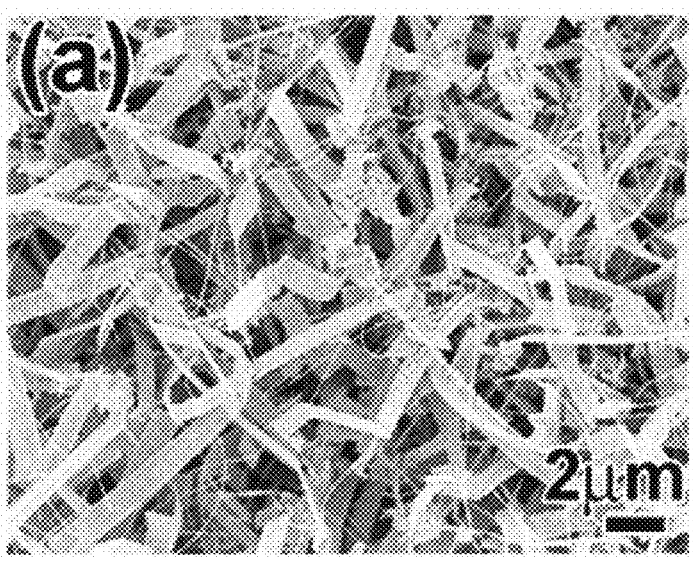
FIG. 38(a) shows a low magnification and FIG. 38(b) shows a high magnification image of nanobelts.
Figure 38B:
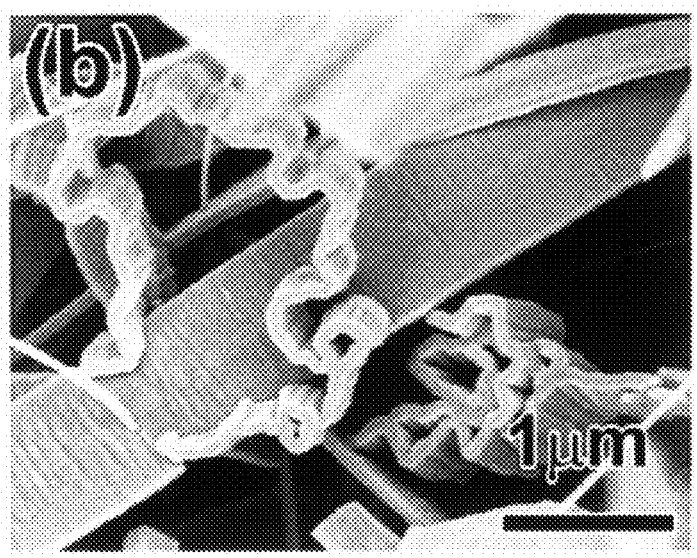
Figure 38C:
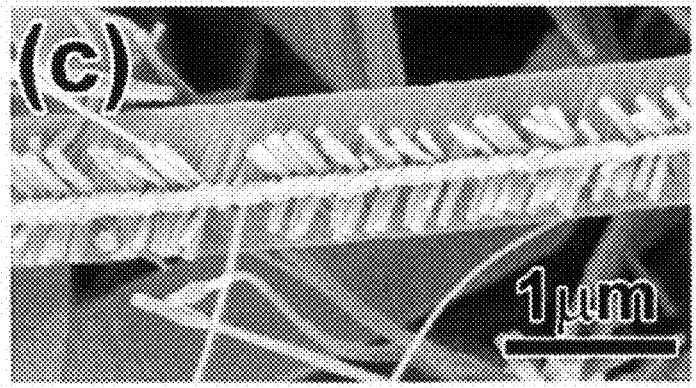
FIG. 38(c) shows an eight fold structure.
Figure 38D:
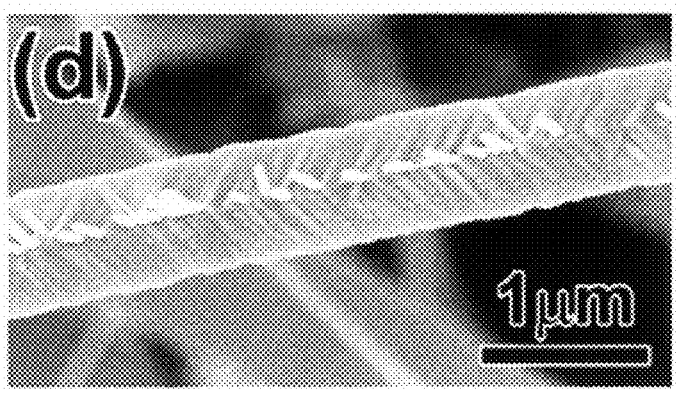
FIG. 38(d) shows a four fold structure.
Figure 38E:
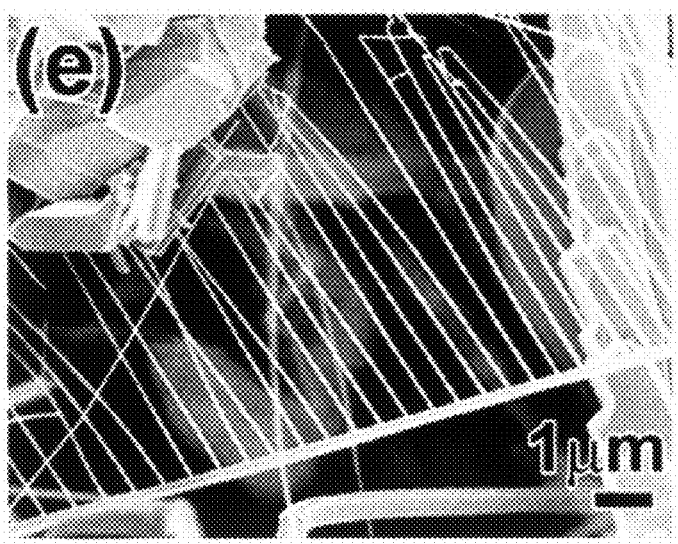
FIG. 38(e) shows a 2-fold structure and FIG. 38(f) shows a leaf-like structure.
Figure 38F:

A schematic diagram of an apparatus for thermal vaporazation and condensation is shown in FIG. 35. An example of a thermal vaporazation and condensation is shown in J. Y. Lao, et al., *International Jounal of Nanoscience*, Volume 2, pages 149-157, (2002), which is hereby incorporated herein by reference in its entirety.

In one embodiment, ZnO, In$_2$O$_3$ and graphite powders are mixed thoroughly to form a metal oxide source mixture. The metal oxide source mixture is placed at the sealed end of a one-end closed quartz tube. A collector is placed at the open end of the quartz tube for collecting the metal oxide. Preferred collectors include, but are not limited to, graphite, silicon, and LaAlO$_3$ and SrTiO$_3$. In a currently preferred embodiment, the collector is graphite foil. The assembly comprising the reactant powder, quartz tube and sample collector, is placed into a ceramic tube of a tube furnace attached to a vacuum source. In one embodiment the vacuum source is a rotary pump. The vacuum in the ceramic tube is maintained at a range of about 0.5 to about 2.5 Torr. The temperature of the furnace is elevated to and maintained at about 950° C. to about 1000° C. Due to the temperature gradient in the ceramic tube, the temperature of the furnace, the open end of the quartz tube having the graphite foil sample collector, is maintained at about 820° C. to about 870° C. such that the nanostructures are grown. The temperature is maintained for a range form about 15 to about 60 minutes. In a currently preferred embodiment, the temperature is maintained for about 30 minutes.

The process provided by the invention for obtaining metal oxide materials, is applicable to several materials such as, for example, metallic oxides, carbides and nitrides.

In yet another embodiment, the present invention provides a process for the formation of a nanostructural device comprising the steps of: a) adherently depositing a catalyst material in a microparticulate form in a predetermined configuration on the surface of a substrate material so as to provide a plurality of catalytic sites on the surface of said substrate material. b) initiating growth of microparticulate crystals of a metallic oxide at the catalytic sites so as to form a plurality of three-dimensional periodic nanostructural crystalline nodes comprising said metallic oxide; and c) allowing continued crystal growth of the metallic oxide so as to render the nanostructural crystalline nodes of the metallic oxide to become connected by three-dimensional periodically aligned nanowire structures comprising the metallic oxide.

The term "substrate" as referred to herein, is afforded the meaning typically provided for in the art. The substrate is a material on the surface of which the metal oxide materials of the invention on the surface are formed. In currently preferred embodiments, the substrate is a silicon, sapphire or graphite. In one embodiment, the substrate can optionally placed on or at the sample collector. In another embodiment, the substrate comprises the sample collector itself.

The term "catalyst" as referred to herein is afforded the meaning typically provided for in the art. Typically, the catalyst is a transition metal catalyst. In one embodiment, the catalyst comprises gold (Au). In a currently preferred embodiment, the catalyst comprises a gold/zinc (Au—Zn) alloy. The catalyst can be in the form of a thin layer on the substrate. The catalyst can also be in the form of connected ripples. In another embodiment the catalyst is in the form of nanoparticles.

In yet another embodiment, the present invention provides a microelectronic device comprising a metal oxide material comprising at least one metallic oxide wherein said metallic oxide is arranged in a three-dimensionally periodic orientation so as to confer nanostructural morphology to said metal oxide material.

The various nanostructures of ZnO reported here have numerous potential applications in a variety of fields such as field emission, photovoltaics, optoelectronics such as blue and ultra-violet (UV) optical devices, transparent conductive films, transparent electronic imaging (EMI) shielding, transparent field effect transistors, supercapacitors, fuel cells, high strength and multifunctional nanocomposites, data-storage, biochemical and chemical sensors, gas sensors, solar cells, photocatalysis, and bulk acoustic waves device.-window heatings, and light emitting diodes. An example of a microelectronic device that includes but is not limited to, an In$_2$O$_3$ field-effect-transistor (FET) with very high sensitivity to toxic gases such as NH$_3$ and NO$_2$.

The invention is illustrated by the following examples which are not intended to be limiting in any way.

EXAMPLES

Example 1

Synthesis of ZnO Hierarchical Nanostructures

A mixture of ZnO and graphite powders are used as the source and put into the sealed end of a small quartz tube. The source is placed at the open end of the quartz tube and covered with graphite foil for the ZnO nanostructure growth. Then the whole assembly is pushed into a ceramic tube of a tube furnace pumped by a rotary pump. The vacuum in the ceramic tube is maintained at about 0.5 to 2.5 Torr. The source temperature was elevated to about 950° C.-1050° C. and maintained for about 15-30 min at pressure of 0.5-1.5 Torr air. After cooling, ZnO nanostructures are observed either on the substrate or graphite cover foils. The samples are analyzed using a JEOL JSM-6340F scanning electron microscope (SEM), a Bruker Analytical X-ray System, and a JEOL 2010 transmission electron microscope (TEM).

Example 2

Synthesis of ZnO, $In_2O_3$ Hierarchical Nanostructures

ZnO, $In_2O_3$ and graphite powders are mixed thoroughly to form a metal oxide source powder. The reactant powder is placed at the sealed end of a one-end sealed quartz tube A graphite foil sample collector is placed at the open end of the quartz tube for collecting the ZnO hierarchical nanostructure samples. The assembly comprising the reactant powder, quartz tube and sample collector, is pushed into a ceramic tube of a tube furnace pumped by a rotary pump as a vacuum source. The vacuum in the ceramic tube is maintained at about 0.5 to about 2.5 Torr. The temperature of the furnace, at the sealed end of the quartz tube containing the metal oxide source powder, is raised to and maintained at about 950° C. to about 1000° C. The temperature of the furnace, at the open end of the quartz tube having the graphite foil sample collector, is raised to and maintained at about 820° C. to about 870° C. The temperature is maintained for about 30 minutes such that the nanostructures are grown.

Example 3

Synthesis of ZnO Nanobridges

The same process as described in Example 1 by varying the parameters. ZnO nanobridge structure formation is favored at low $In_2O_3$ ratio in the source with a 2.0 Torr air pressure and furnace temperature at 1000° C. ZnO Nanobridges can be formed using the process as described in J. Y Lao et al., *Nanoletters*, volume 3, pages 235-238, (2003), the contents of which is hereby incorporated herein by reference in its entirety.

ZnO, $In_2O_3$ and graphite powders are mixed thoroughly to form a metal oxide source powder. The metal oxide source powder comprises a low $In_2O_3$/ZnO ratio. The reactant powder is placed at the sealed end of a one-end sealed quartz tube A graphite foil sample collector is placed at the open end of the quartz tube for collecting the ZnO hierarchical nanostructure samples. The assembly comprising the reactant powder, quartz tube and sample collector, is pushed into a ceramic tube of a tube furnace pumped by a rotary pump as a vacuum source. The vacuum in the ceramic tube is maintained at about 2.0 Torr. The temperature of the furnace, at the sealed end of the quartz tube containing the metal oxide source powder, is raised to and maintained at about 1000° C. The temperature of the furnace, at the open end of the quartz tube having the graphite foil sample collector, is raised to and maintained at about 820° C. to about 870° C. The temperature is maintained for about 30 minutes such that the nanostructures are grown.

Example 4

Synthesis of ZnO Nanonails

ZnO nanonails are formed by the thermal evaporation and condensation as described in Example 1, by varying the parameters. ZnO nanonails are favored at lower temperature of 950-970° C. and lower pressure of 0.5-1.0 Torr. ZnO Nanonails can be formed using the process as described in J. Y Lao et al., *Nanoletters*, volume 3, pages 235-238, (2003), the contents of which is hereby incorporated herein by reference in its entirety.

ZnO and graphite powders are mixed thoroughly to form a metal oxide source powder. The reactant powder is placed at the sealed end of a one-end sealed quartz tube A graphite foil sample collector is placed at the open end of the quartz tube for collecting the ZnO hierarchical nanostructure samples. The assembly comprising the reactant powder, quartz tube and sample collector, is pushed into a ceramic tube of a tube furnace pumped by a rotary pump as a vacuum source. The vacuum in the ceramic tube is maintained at a range of about 0.5 to about 1.0 Torr. The temperature of the furnace, at the sealed end of the quartz tube containing the metal oxide source powder, is raised to and maintained at a range of about 950° C. to about 970° C. The temperature of the furnace, at the open end of the quartz tube having the graphite foil sample collector, is raised to and maintained at about 820° C. to about 870° C. The temperature is maintained for about 30 minutes such that the nanostructures are grown.

Example 5

Synthesis of ZnO Nanowires

ZnO nanowires are formed by the thermal evaporation and condensation as described in Example 1, in which in which the metal oxide source powder is ZnO and the substrate comprises graphite flakes.

Example 6

Synthesis of ZnO Nanowires on Gold Microparticle Substrate

A gold/zinc (Au—Zn) alloy is depositing in a microparticulate form in a the surface of a sapphire substrate material to give a plurality of catalytic sites on the surface of the sapphire substrate material. ZnO nanowires are formed by the thermal evaporation and condensation as described in Example 1, in which the metal oxide source powder is ZnO Example 7

Synthesis of $In_2O_3$ Nanowire Circuit $In_2O_3$ nanowire circuits are formed by the thermal evaporation and condensation as described in Example 1. A gold/zinc (Au—Zn) alloy is depositing in a microparticulate form in a the surface of a Si/$SiO_2$ substrate material to give a plurality of catalytic sites on the surface of the Si/SiO$_2$ substrate material. Microparticulate crystals of In$_2$O$_3$ are grown on the catalytic sites to give nanostructural crystalline nodes. Continued In$_2$O$_3$ growth is allowed so as to render the individual microparticulate crystals of In$_2$O$_3$ connected by a In$_2$O$_3$ nanowire.

Example 8

Preparation of TEM Specimens

The TEM specimen are prepared as follows: as-synthesized nanomaterials are scratched off the graphite foil onto a holey carbon TEM specimen grid, then a drop of acetone is applied to disperse the nanomaterials so that individual nanostructure is easily examined. Because of the projection nature of TEM image and multiple arms of the nanorods, TEM images of these nanomaterials are always complex to study. Furthermore, clear diffraction contrast images of the cores can not be obtained in such a configuration due to their large thickness along the electron beam direction. Cross-sectional TEM along the core nanowire direction are introduced to observe the core structure and the orientation relationship between the arms and the core.

Example 9

Preparation of Cross-Sectional TEM Samples

Samples for cross-sectional TEM were prepared as follows: Given the brittle nature of the nanomaterials, the films are penetrated with M-Bond 610 epoxy resin (M-Line Accessories, Raleigh, N.C.) to provide mechanical stiffness. M-Bond 610 epoxy has very low viscosity and curing is time and temperature dependent. The viscosity of the epoxy is very low, therefore it easily impregnates pores and the structure of nanomaterials can be preserved. The sample is cured at a temperature of 120° C. for 2 hours. The hardened thin foils containing graphite substrate are then cut, glued together following the standard cross-sectional TEM sample preparation technique. Mechanical thinning by a tripod polisher and ion milling (low angle, voltage, and current) were used to thin the sample to electron transparency. Before TEM observation, a low voltage and gun current were used to polish both sides for 10 minutes.

All patents, patent applications, and published references cited herein are hereby incorporated by reference in their entirety. While this invention has been particularly shown and described with references to preferred embodiments thereof, it will be understood by those skilled in the art that various changes in form and details may be made therein without departing from the spirit and scope of the invention encompassed by the appended claims.

What is claimed is:

1. A metal oxide material comprising a first metallic oxide and a second metallic oxide, wherein the first metallic oxide forms a central nanostructural spine having a linear axis and at least three second metallic oxides terminally attached between a first end and a second end of the central nanostructural spine forming three-dimensional periodically oriented linear nanostructural rods, the linear axes of the nanostructural rods being oriented substantially non-parallel to the linear axis of the central nanostructural spine of the first metallic oxide to confer a symmetric nanostructural morphology to the metal oxide material.

2. The metal oxide material of claim 1, wherein the symmetric nanostructural morphology has a pre-determined symmetry.

3. The metal oxide material of claim 1, wherein the first metallic oxide is selected from the group consisting of ZnO, In$_2$O$_3$, and combinations thereof.

4. The metal oxide material of claim 1, wherein the symmetric nanostructural morphology is selected from the group consisting of a nanobridge, nanonail, nanoribbon, nanowire, nanowall, nanobrush and combinations thereof.

5. The metal oxide material of claim 1, wherein the metallic oxide further comprises a dopant material.

6. The metal oxide material of claim 5, wherein the dopant material is tin.

7. The metal oxide material of claim 1, further comprising a third metallic oxide.

8. The metal oxide material of claim 7, wherein the metallic oxides are selected from the group consisting of ZnO, GeO$_2$ and In$_2$O$_3$.

9. The metal oxide material of claim 1, with a pre-determined symmetry consisting essentially of 2-fold symmetry, 4-fold symmetry or 6-fold symmetry or combinations thereof.

10. The metal oxide material of claim 1, wherein the central nanostructural spine consists essentially of In$_2$O$_3$.

11. The metal oxide material of claim 1, wherein the second metallic oxides consists essentially of ZnO, GeO$_2$ or MgO.

12. The metal oxide material of claim 1, wherein the central nanostructural spine has a length ranging between about 0.01 and about 100 μm.

13. The metal oxide material of claim 1, wherein the central nanostructural spine has a length ranging between about 1 and about 20 μm.

14. The metal oxide material of claim 1, wherein the central nanostructural spine has a diameter ranging between about 10 and about 1000 nm.

15. The metal oxide material of claim 1, wherein the central nanostructural spine has a diameter ranging between about 50 and about 500 nm.

16. The metal oxide material of claim 1, wherein the nanostructural rods comprising the second metallic oxides have a length ranging between about 0.01 and about 100 μm.

17. The metal oxide material of claim 1, wherein the nanostructural rods comprising the second metallic oxides have a length ranging between about 0.2 and about 5 μm.

18. The metal oxide material of claim 1, wherein the nanostructural rods comprising the second metallic oxides have a diameter ranging between about 10 and about 1000 nm.

19. The metal oxide material of claim 1, wherein the nanostructural rods comprising the second metallic oxides have a diameter ranging between about 20 and about 200 nm.

20. The metal oxide material of claim 1, wherein the nanostructural rods comprising the second metallic oxides are substantially orthogonal to the linear axis of said central nanostructural spine.

21. The metal oxide material of claim 1, wherein the nanostructural rods comprising the second metallic oxides are slanted to the central nanostructural spine so as to form a finite, non-orthogonal angle with the linear axis of said central nanostructural spine.

22. The metal oxide material of claim 1, wherein at least one of the metallic oxides further comprises a dopant material.

23. The metal oxide material of claim 22, wherein the dopant material is tin.

24. A metal oxide material comprising:
a central three-dimensional nanostructure having a linear axis formed from at least one metallic oxide; and
at least three three-dimensional nanostructures formed from at least one metallic oxide, wherein a distal end of each of the three-dimensional nanostructures is attached to the central three-dimensional nanostructure between a first end and a second end of the central three-dimensional nanostructure.

25. The metal oxide material of claim 24, wherein the metallic oxide is selected from the group consisting of ZnO, $In_2O_3$, $GeO_2$, MgO and combinations thereof.

26. The metal oxide material of claim 24, wherein the metallic oxide further comprises a dopant material.

27. The metal oxide material of claim 26, wherein the dopant material is selected from the group consisting of tin and germanium.

28. The metal oxide material of claim 24, wherein the central three-dimensional nano structure is formed from $In_2O_3$ and the plurality of three-dimensional nanostructures is formed from ZnO.

29. The metal oxide material of claim 24, wherein the three-dimensional nanostructure has a morphology selected from the group consisting of a nanoribbon, nanowire, nanobelt, nanocrystal, nanowall and combinations thereof.

30. The metal oxide material of claim 24, wherein the central three-dimensional nanostructure has a length ranging between about 0.01 and about 100 μm.

31. The metal oxide material of claim 24, wherein the central three-dimensional nanostructure has a diameter ranging between about 10 and about 1000 nm.

32. The metal oxide material of claim 24, wherein the three-dimensional nanostructures have a length ranging between about 0.01 and about 100 μm.

33. The metal oxide material of claim 24, wherein the three-dimensional nanostructures have a diameter ranging between about 10 and about 1000 nm.

34. The metal oxide material of claim 24, wherein the three-dimensional nanostructures are aligned in a direction either perpendicular to the linear axis of the central three-dimensional nanostructure or at a finite non-perpendicular angle.

35. The metal oxide material of claim 24 for use in a microelectronic device.

36. The metal oxide material of claim 35, wherein the microelectronic device is selected from the group consisting of field emission device, photovoltaic device, optoelectronic device, blue optical device, ultra-violet optical device, transparent conductive film, transparent electronic imaging shielding device, transparent field effect transistor, supercapacitor, fuel cell, nanocomposite, data-storage device, biochemical sensor, chemical sensor, gas sensor, solar cell, photocatalysis device, bulk acoustic waves device, window heating device, and light emitting diode.

37. A metal oxide material comprising:
a first metallic oxide in the form of a three-dimensional linear nanostructure; and
at least three second metallic oxides in the form of a three-dimensional linear nanostructure having an end attached to the first metallic oxide between a first end and a second end of the first metallic oxide and extending in a lateral direction from the first metallic oxide.

38. The metal oxide material of claim 37, wherein the first metallic oxide and the second metallic oxides are selected from the group consisting of ZnO, $In_2O_3$, $GeO_2$, MgO and combinations thereof.

39. The metal oxide material of claim 37, wherein the metallic oxide further comprises a dopant material.

40. The metal oxide material of claim 39, wherein the dopant material is selected from the group consisting of tin and germanium.

41. The metal oxide material of claim 37, wherein the three-dimensional linear nanostructure has a morphology selected from the group consisting of a nanobridge, nanonail, nanoribbon, nanowire, nanowall, nanobrush and combinations thereof.

42. The metal oxide material of claim 37, wherein the at least three second metallic oxides are aligned in a direction either perpendicular to the first metallic oxide or at a finite non-perpendicular angle.

43. The metal oxide material of claim 37 for use in a microelectronic device.

44. The metal oxide material of claim 43, wherein the microelectronic device is selected from the group consisting of field emission device, photovoltaic device, optoelectronic device, blue optical device, ultra-violet optical device, transparent conductive film, transparent electronic imaging shielding device, transparent field effect transistor, supercapacitor, fuel cell, nanocomposite, data-storage device, biochemical sensor, chemical sensor, gas sensor, solar cell, photocatalysis device, bulk acoustic waves device, window heating device, and light emitting diode.

45. The metal oxide material of claim 37, wherein the first metallic oxide has a length ranging between about 0.01 and about 100 μm.

46. The metal oxide material of claim 37, wherein the first metallic oxide has a diameter ranging between about 10 and about 1000 nm.

47. The metal oxide material of claim 37, wherein each of the at least three second metallic oxides have a length ranging between about 0.01 and about 100 μm.

48. The metal oxide material of claim 37, wherein each of the at least three second metallic oxides have a diameter ranging between about 10 and about 1000 nm.

49. A metal oxide material comprising a plurality of three-dimensional nanostructures formed from a first metallic oxide and at least three second metallic oxides having an end attached to the first metallic oxide between a first end and a second end of the first metallic oxide, wherein the plurality of three-dimensional nanostructures are interconnected to form a network.

50. The metal oxide material of claim 49, wherein the network of the plurality of three-dimensional nanostructures has a pore size ranging from about 200 nm to about 1 μm.

51. The metal oxide material of claim 49, wherein the plurality of three-dimensional nanostructures are parallel to each other.

52. The metal oxide material of claim 49, wherein the plurality of three-dimensional nanostructures are arranged in a quasi-hexagonal pattern.

53. The metal oxide material of claim 49, wherein the plurality of three-dimensional nanostructures form angles that are multiples of about 30°.

* * * * *